Jan. 1, 1924  
A. V. T. DAY  
1,479,286
RAILWAY TRAIN CONTROL SYSTEM
Original Filed June 4, 1913   18 Sheets-Sheet 1.
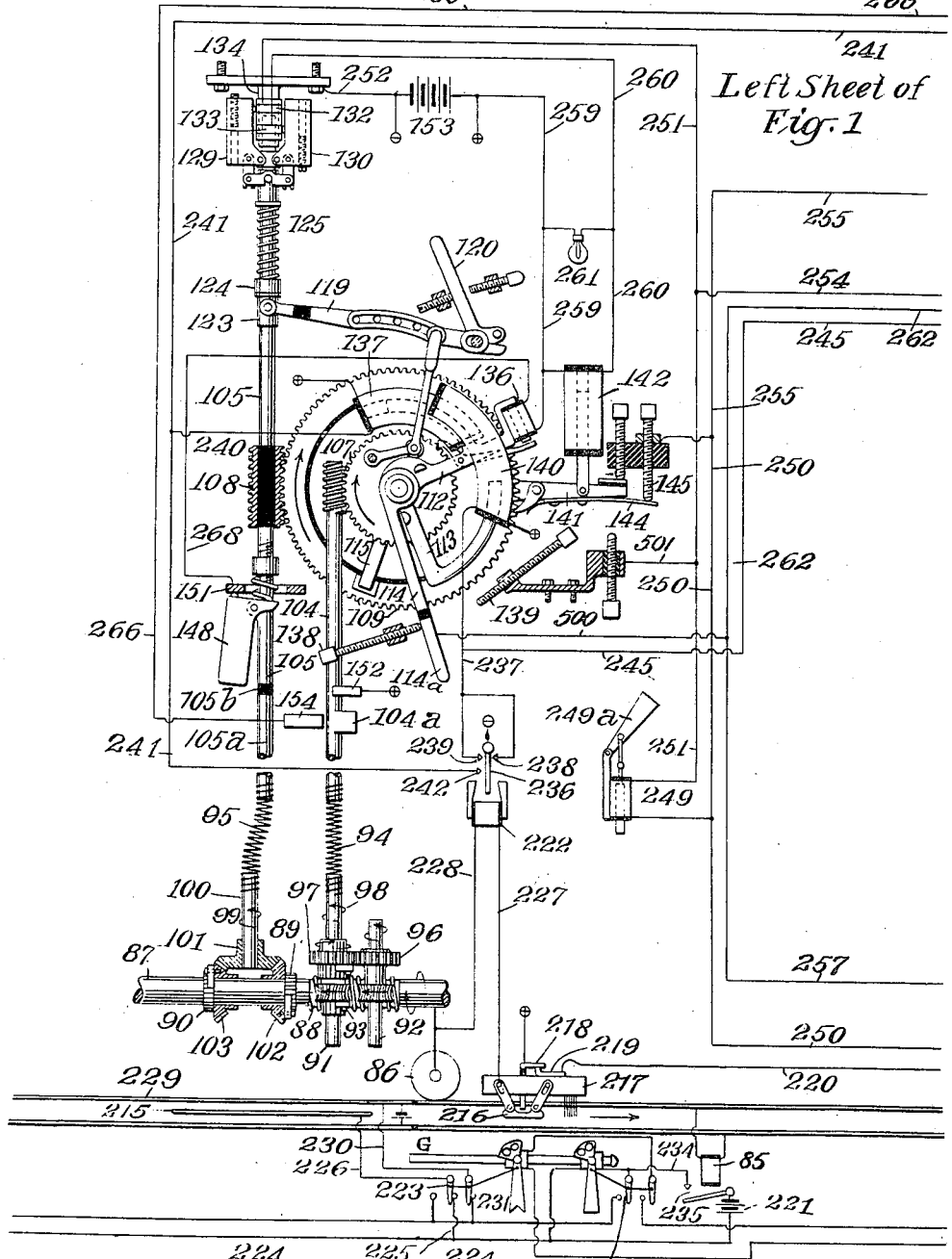
Left Sheet of Fig. 1
Witnesses:  
G. Herman Wagner  
W. T. Holman
Inventor:  
A. V. T. Day  
by Geo. E. Cruse  
His Attorney.

Jan. 1, 1924. 1,479,286
A. V. T. DAY
RAILWAY TRAIN CONTROL SYSTEM
Original Filed June 4, 1913 18 Sheets-Sheet 2
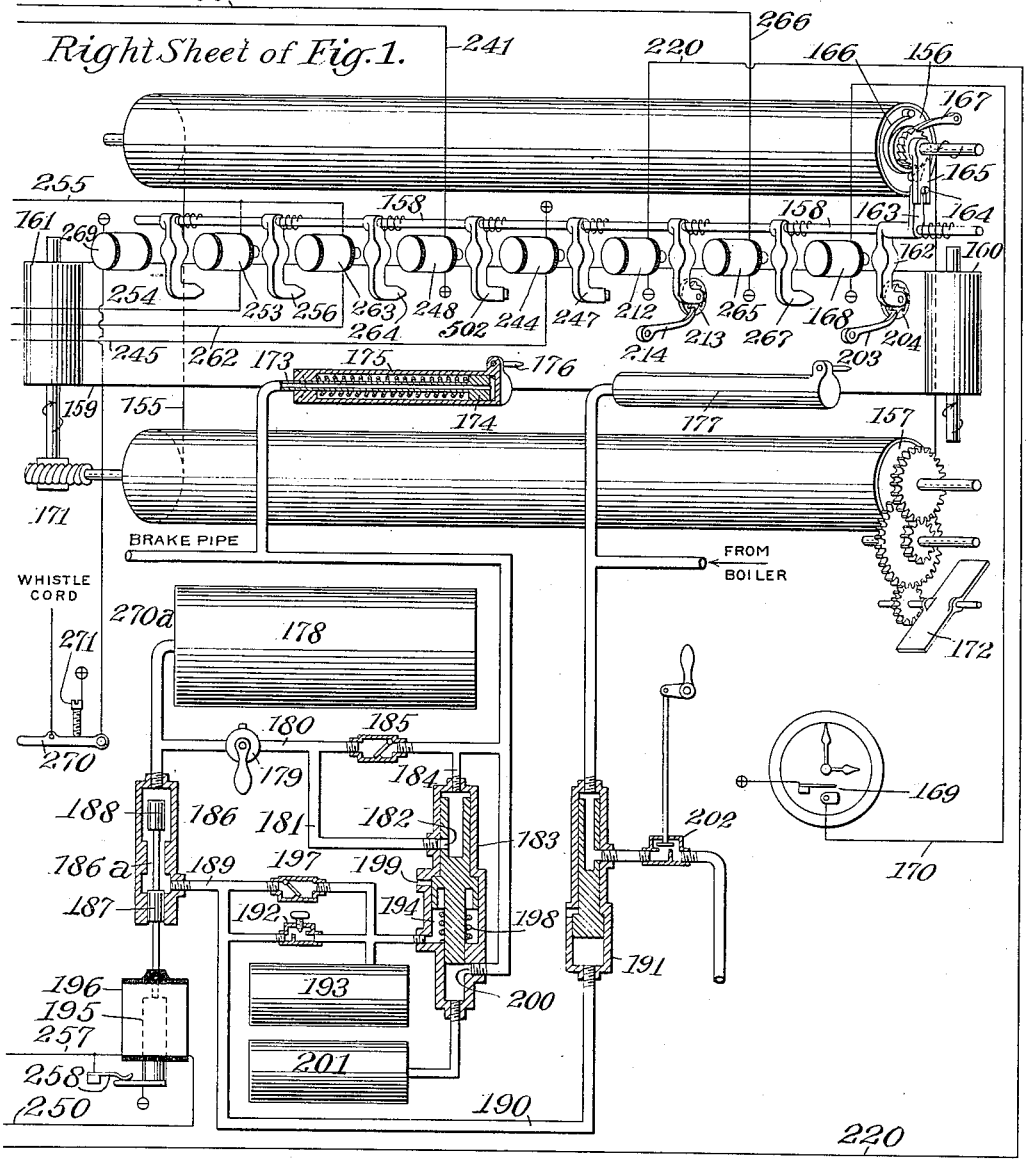
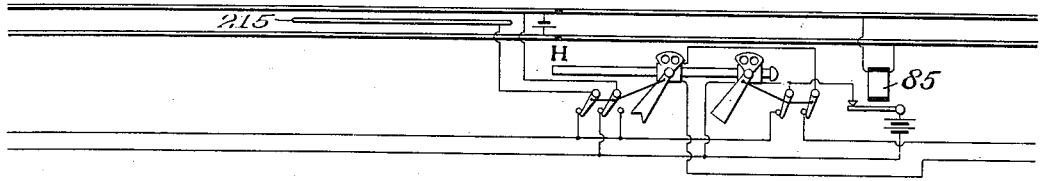

Jan. 1, 1924. 1,479,286
A. V. T. DAY
RAILWAY TRAIN CONTROL SYSTEM
Original Filed June 4, 1913 18 Sheets-Sheet 3

Witnesses:
G. Herman Wegner.
W. T. Holman

Inventor:
A. V. T. Day
by Geo. E. Cruse
His Attorney.

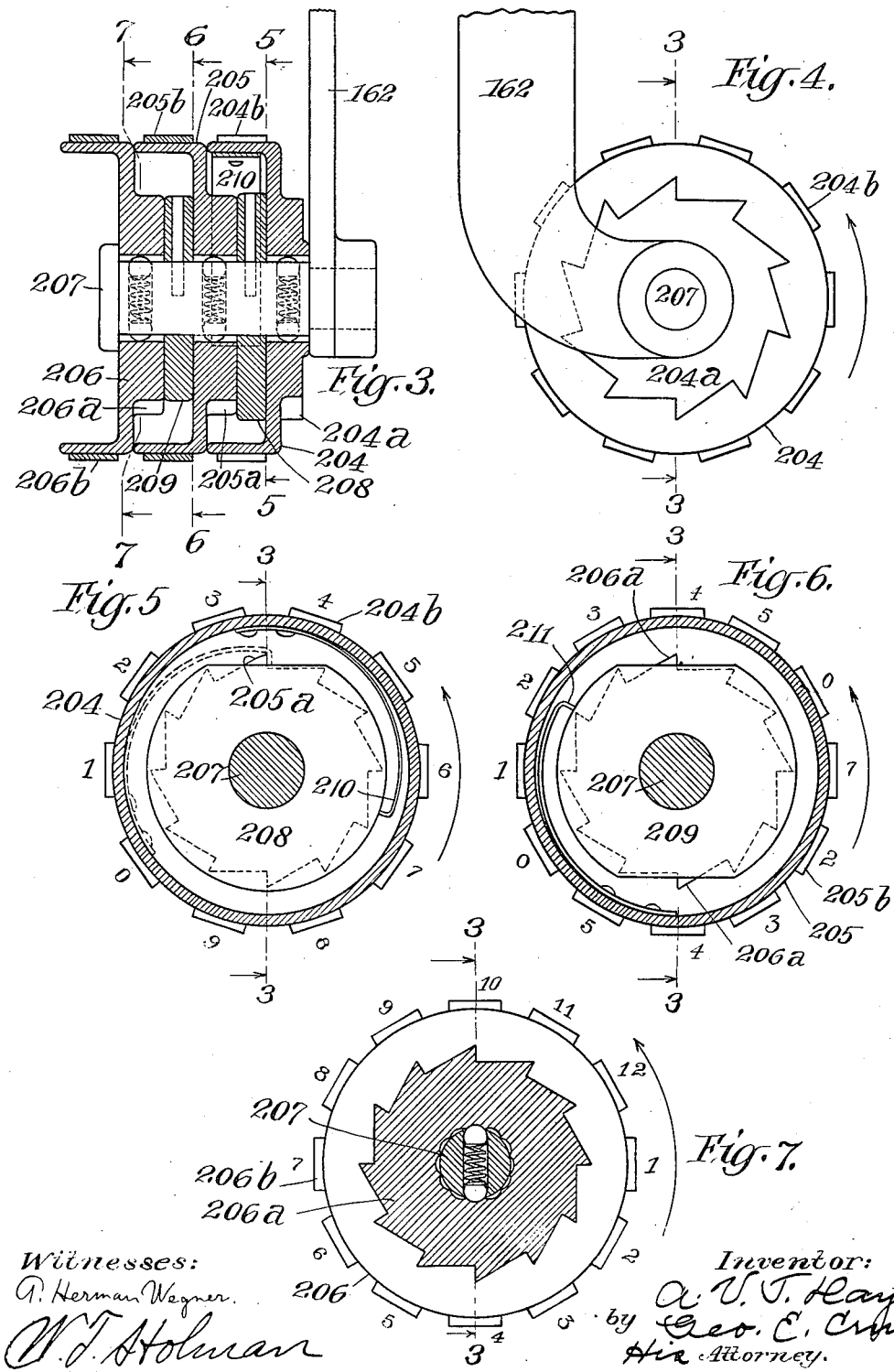

Jan. 1, 1924

A. V. T. DAY

RAILWAY TRAIN CONTROL SYSTEM

Original Filed June 4, 1913   18 Sheets-Sheet 5

1,479,286

Witnesses:
G. Herman Wegner.
W. J. Holman

Inventor:
A. V. T. Day
by Geo. E. Cruse
His Attorney.

Jan. 1, 1924

A. V. T. DAY

RAILWAY TRAIN CONTROL SYSTEM

Original Filed June 4, 1913   18 Sheets-Sheet 6

1,479,286

Fig. 12 — Section A

Witnesses:
G. Herman Wegner.
W. J. Holman

Inventor:
A. V. T. Day
by Geo. E. Cruse
His Attorney.

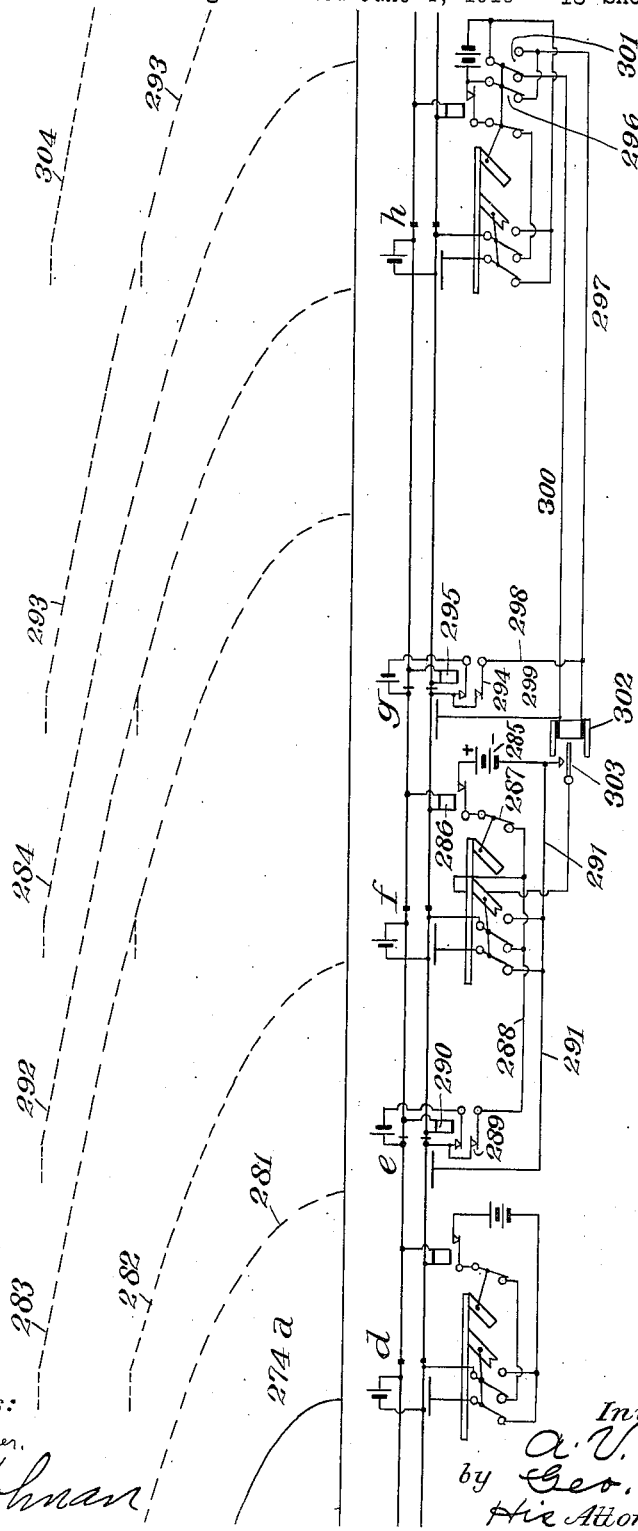

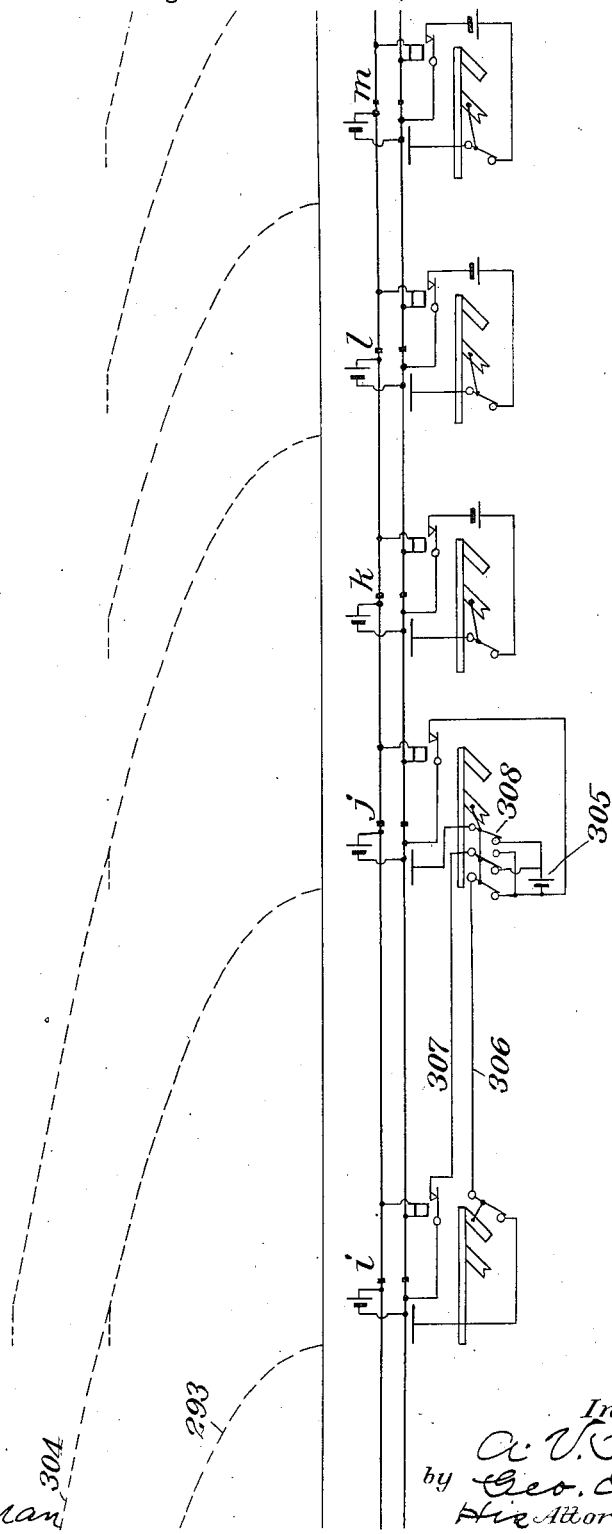

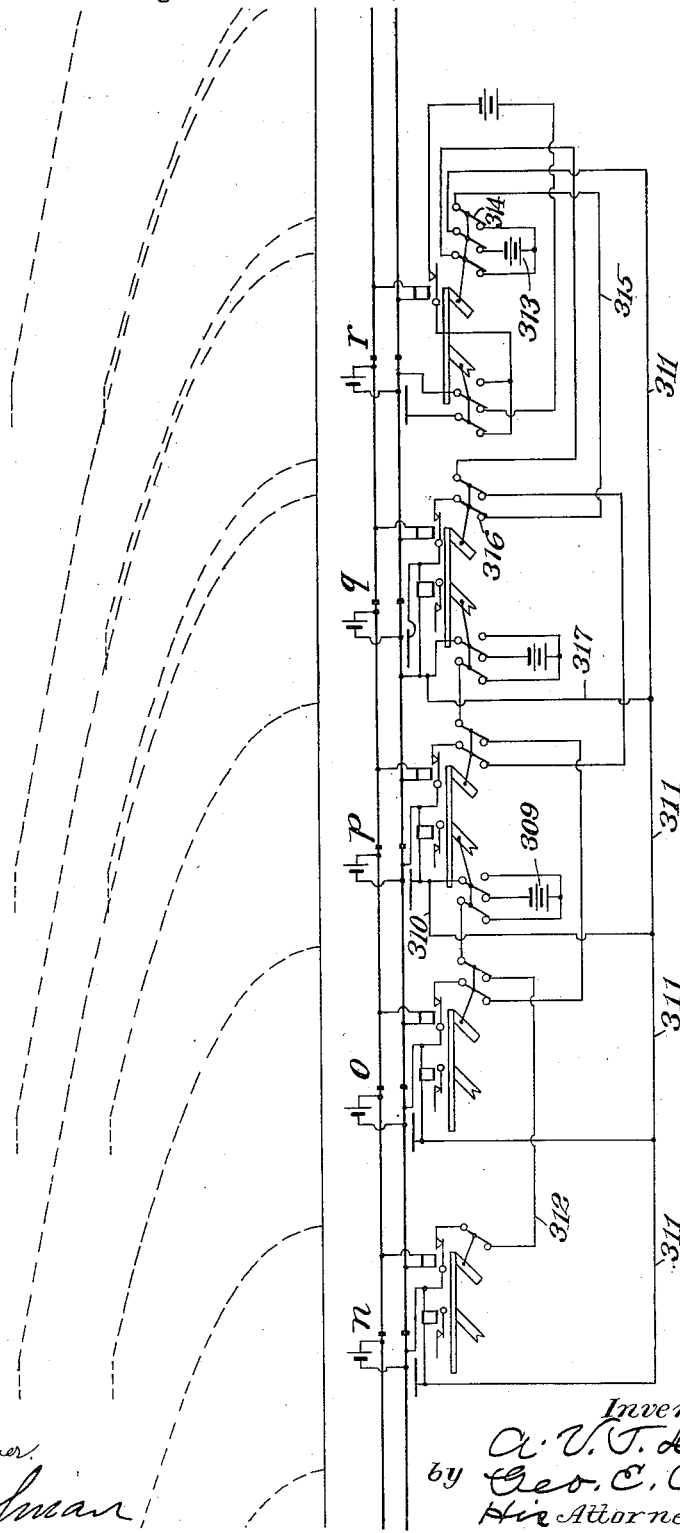

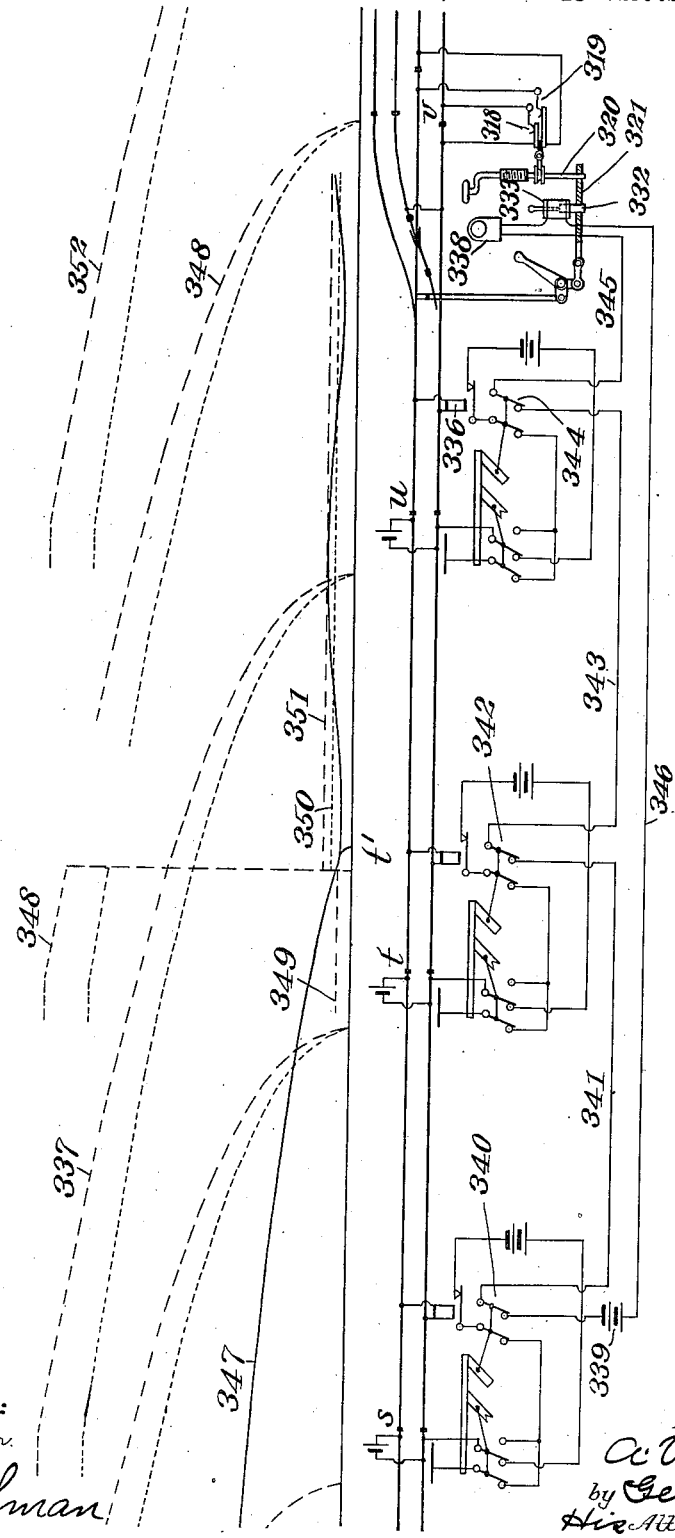

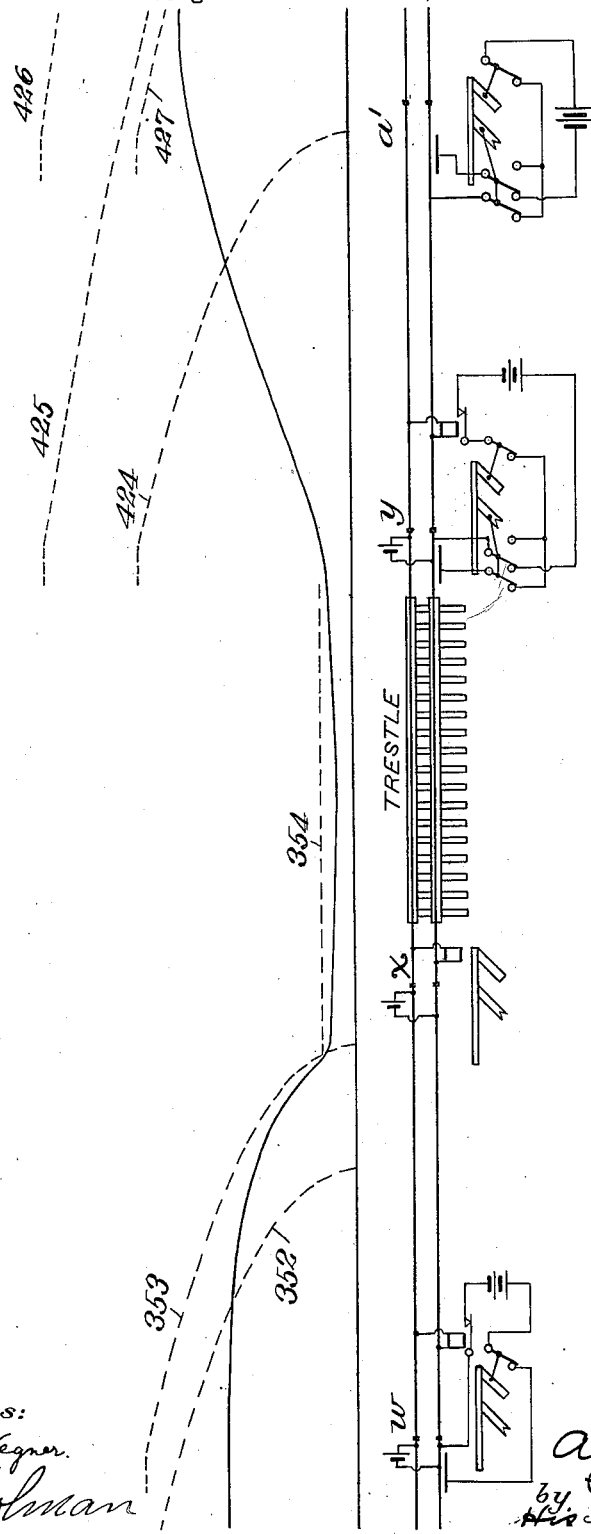

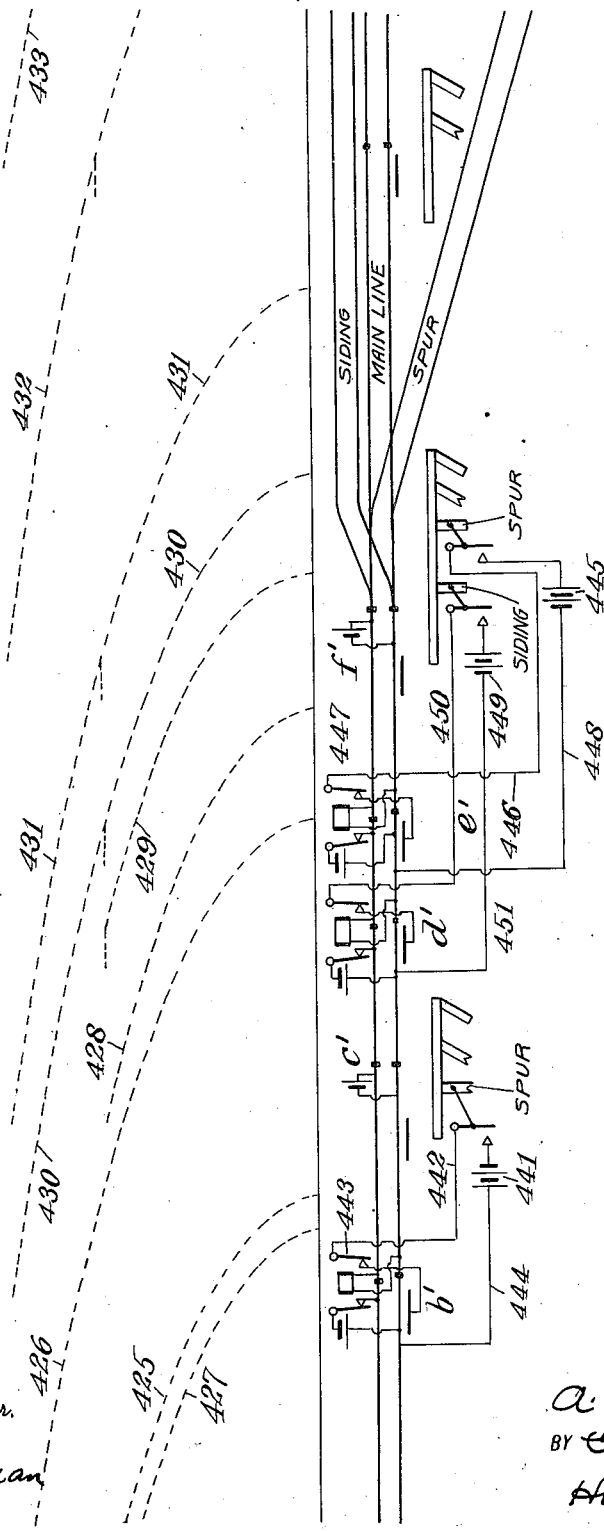
Fig.12-Section G

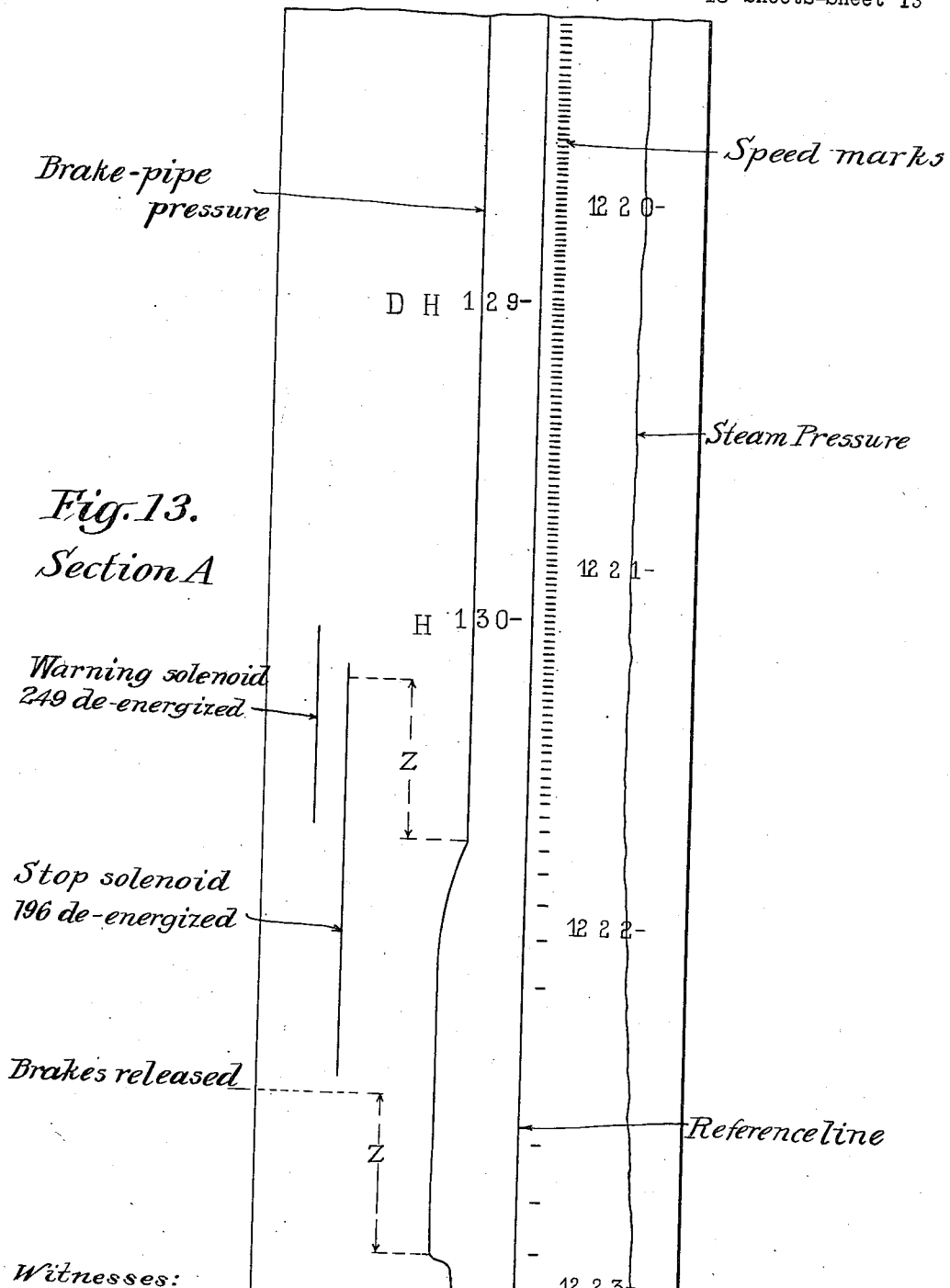

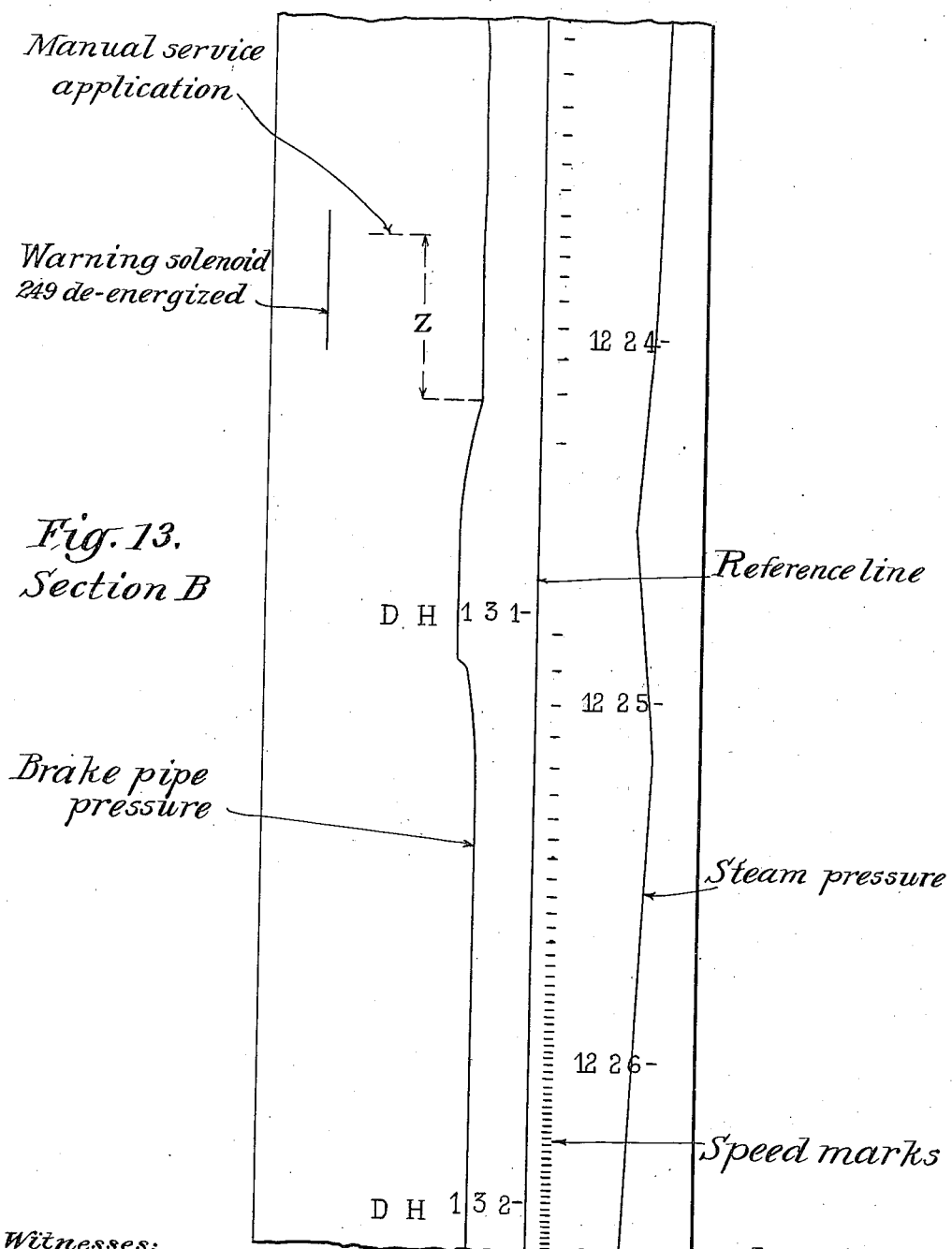

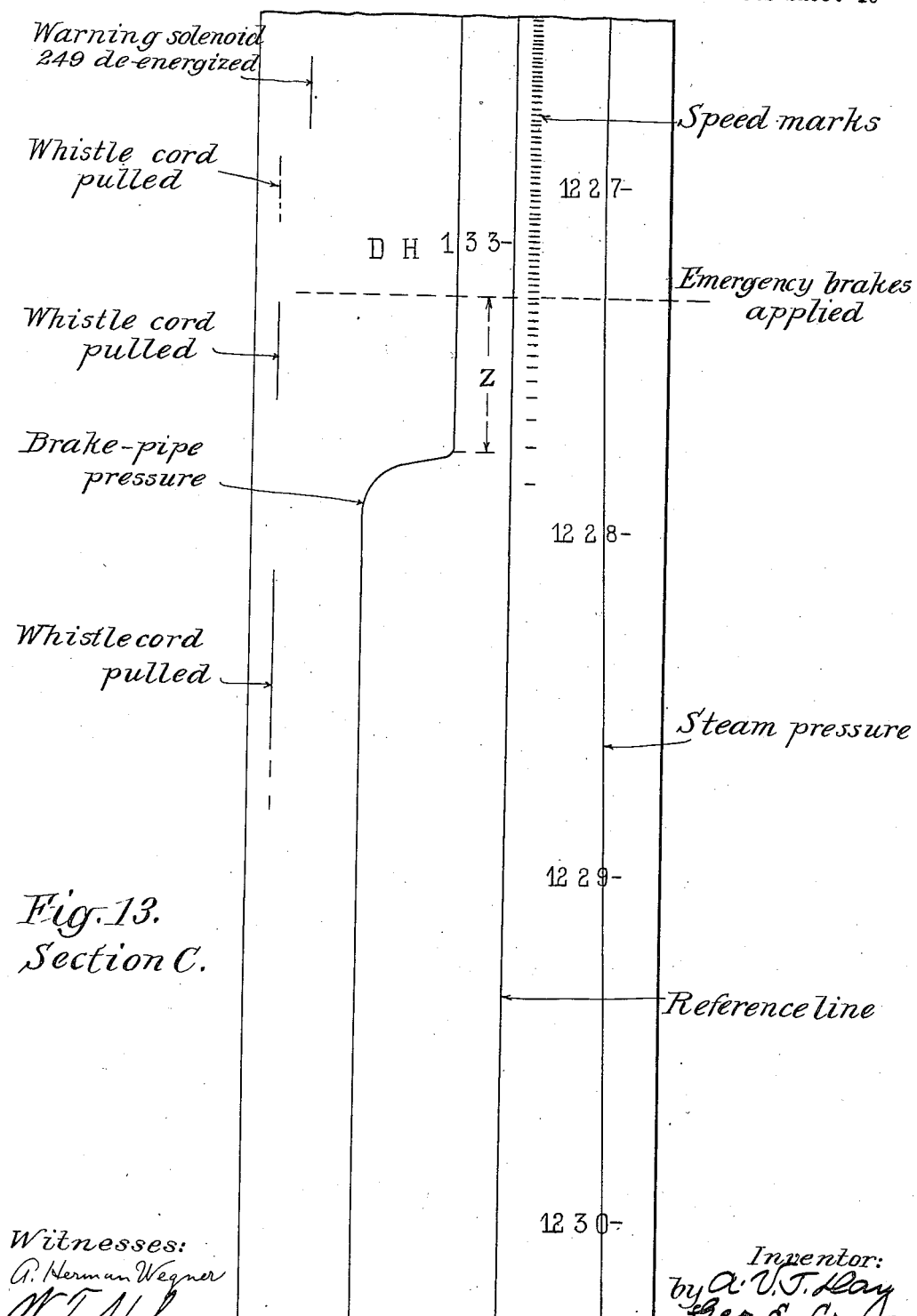

Jan. 1, 1924

A. V. T. DAY

RAILWAY TRAIN CONTROL SYSTEM 1,479,286

Original Filed June 4, 1913    18 Sheets-Sheet 16

| | | |
|---|---|---|
| 276 | 138.4 | O |
| 276 | 138.4 | I |
| 276 | 138.6 | |
| 276 | 137.0 | |
| 276 | 140.2 | A |
| 276 | 156.7 | O |
| 276 | 160.0 | I |
| 276 | 201.3 | A |
| 276 | 230.5 | |
| 276 | 230.0 | |
| 276 | 241.1 | |
| 276 | 241.0 | O |
| 276 | 239.4 | I |
| 276 | 239.4 | |
| 276 | 338.4 | O |
| 276 | 338.4 | |
| 276 | 335.0 | I |
| 276 | 335.0 | O |
| 276 | 335.0 | I |

Witnesses:
A. Herman Wegner
W. T. Holman

Inventor:
A. V. T. Day
Geo. E. Cruse
by
His Attorney.

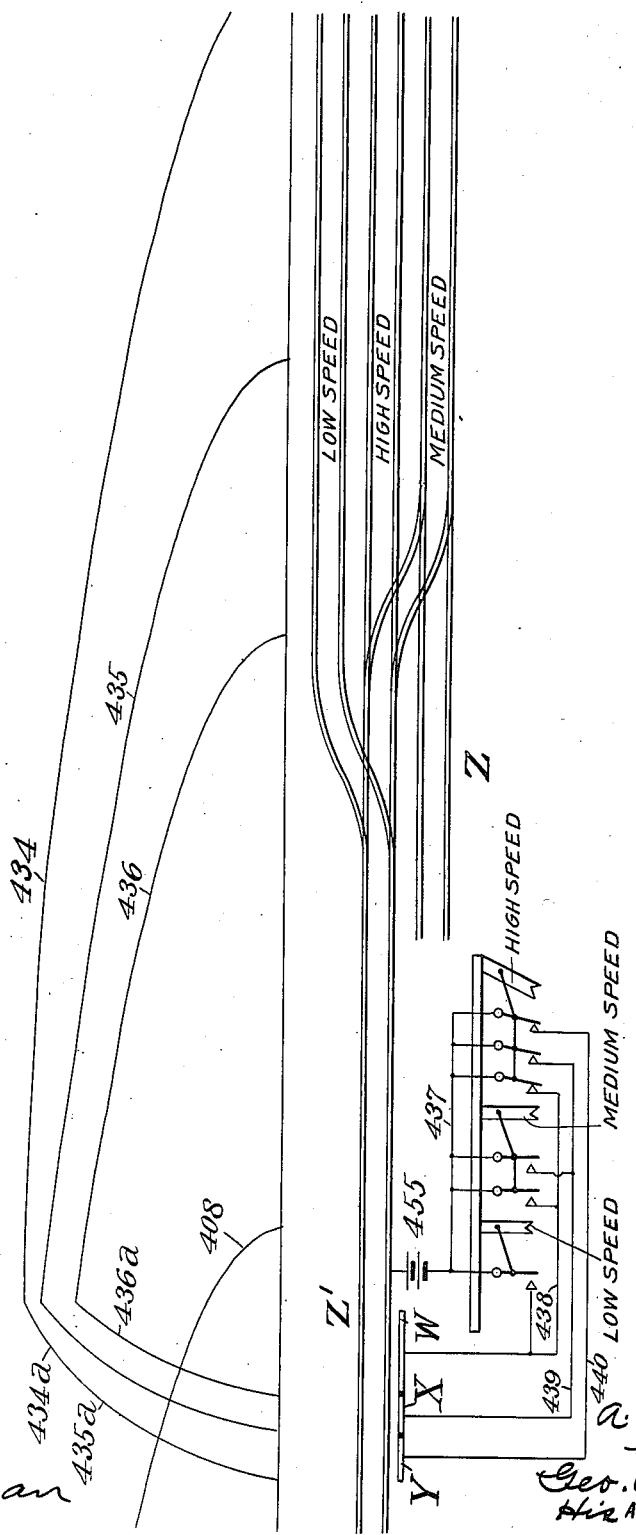

Jan. 1, 1924  
A. V. T. DAY  
1,479,286  
RAILWAY TRAIN CONTROL SYSTEM  
Original Filed June 4, 1913  18 Sheets-Sheet 18
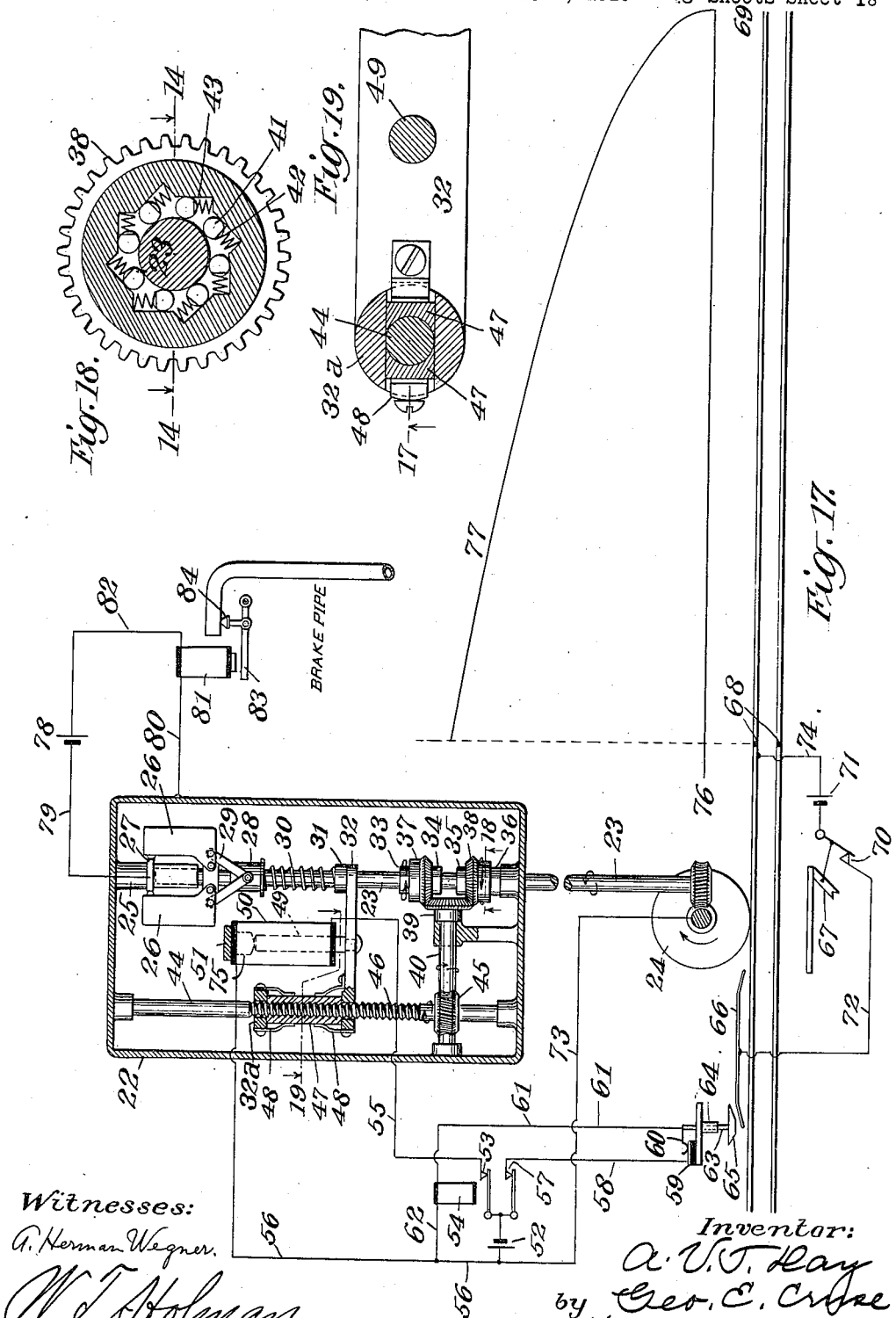

Patented Jan. 1, 1924.

1,479,286

UNITED STATES PATENT OFFICE.

ALBERT V. T. DAY, OF NEW ROCHELLE, NEW YORK, ASSIGNOR TO THE UNION SWITCH AND SIGNAL COMPANY, OF SWISSVALE, PENNSYLVANIA, A CORPORATION OF PENNSYLVANIA.

RAILWAY-TRAIN-CONTROL SYSTEM.

Application filed June 4, 1913, Serial No. 771,650. Renewed March 14, 1922. Serial No. 543,767.

*To all whom it may concern:*

Be it known that I, ALBERT V. T. DAY, a citizen of the United States, residing at New Rochelle, in the county of Westchester and State of New York, have invented certain new and useful Improvements in Railway-Train-Control Systems, of which the following is a specification, reference being had therein to the accompanying drawings, forming part thereof.

My invention relates to that class of train control apparatus and systems in which the movement of a railway train or vehicle is controlled in accordance with a signal, automatic brake, or other suitable train controlling means carried on the train or vehicle and governed by suitable extraneous means or conditions, such as the position of a signal or the condition of a section of the track which the train or vehicle is approaching.

Different embodiments of my broad invention are illustrated in the accompanying drawings. In these drawings:

Figure 1, comprising two sheets, right and left, is a complete diagrammatic representation of one complete embodiment of my invention;

Figure 3 is a vertical sectional view of the time recording type wheels included in the recorder represented on the right sheet of Figure 1;

Figure 4 is a right elevation of the time wheels of Figure 3;

Figure 5 is a vertical section of the parts shown in Figure 3 taken on the plane indicated by the line 5—5 of Figure 3;

Figure 6 is a similar sectional view on the plane of the line 6—6 of Figure 3;

Figure 7 is a similar section taken through points indicated by the line 7—7 of Figure 3;

Figure 12 is a diagrammatic representation of a stretch of railway track showing the adaptation of my train control system to varying conditions of service, and comprises seven sections on seven consecutive sheets designated as Sections A, B, C, D, E, F and G;

Figure 2:
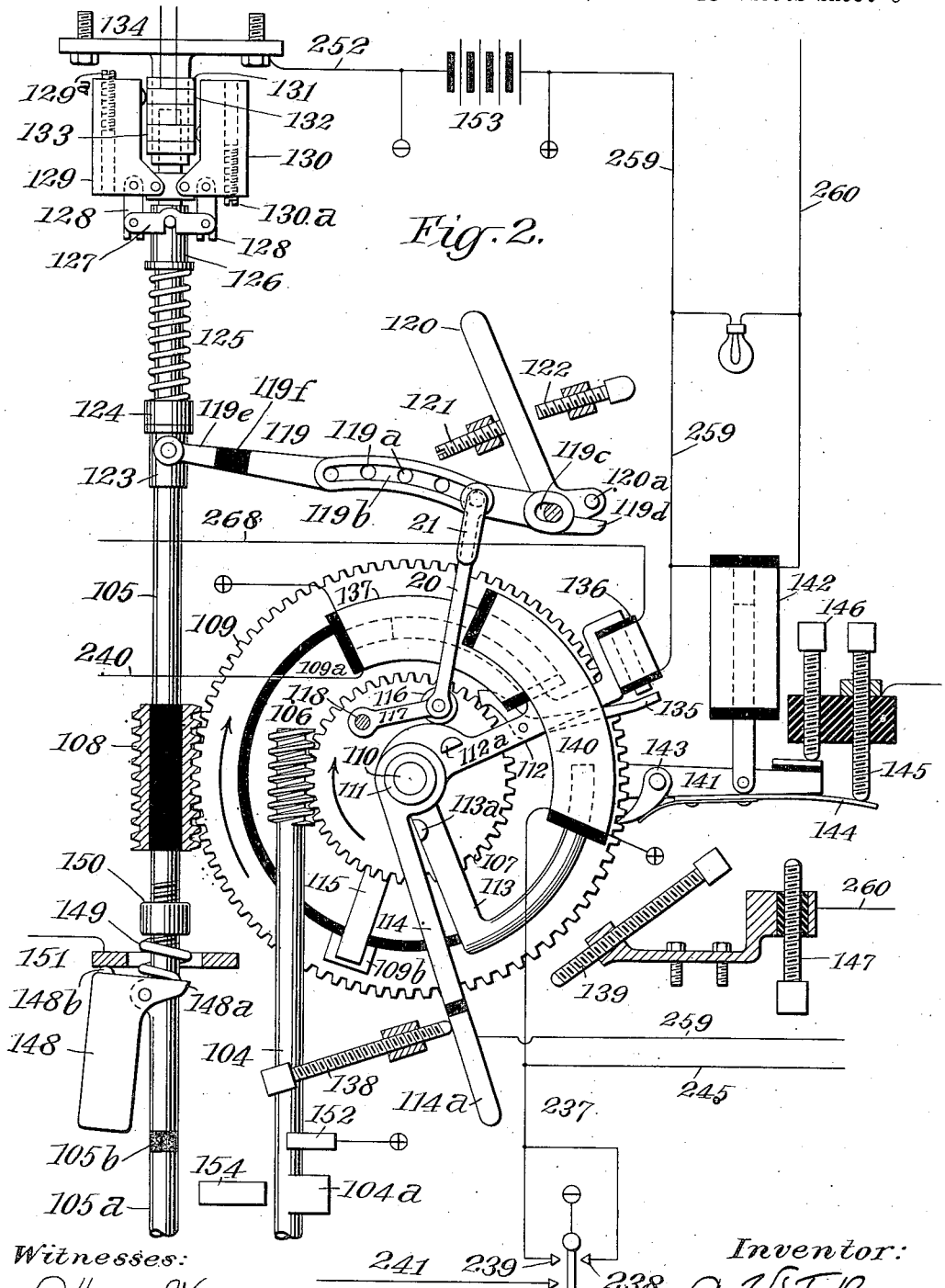
Figure 2 is an enlarged view of the monitor mechanism or co-ordinator included in the left sheet of Figure 1.

Figure 13 comprises three successive sheets marked Section A, Section B and Section C, which together represent a strip of the tape which has issued from the recorder shown in the right sheet of Figure 2;

Figure 14 is a diagram of another embodiment of my invention, and comprises two sections on two consecutive sheets designated as Section A and Section B;

Figure 15 is an enlarged detail of the tape feeding and printing mechanism of the recorder included in Figure 14;

Figure 16 is a representation of a card which has been cut off from the tape printed in the recorder of Figure 14;

Figure 17 is a diagrammatic representation of still another embodiment of my invention;

Figure 18 is an enlarged sectional view of the directional clutch employed in the monitor of Figure 17, the section being taken on the line 18 of Figure 17;

Figure 19 is an enlarged sectional view of the feed clutch and its attached parts included in the monitor mechanism of Figure 17, the section being taken on the line 19 of Figure 17.

I will first describe the system illustrated in Figure 17 since this is the most elemental embodiment of my invention which I have shown in the drawings.

The monitor casing 22 is carried in the locomotive cab or in any other suitable location on a railway vehicle and encloses all the mechanism of the monitor. This monitor I sometimes designate as the co-ordinator since it is the function of this mechanism to co-ordinate the factors of speed and distance in the automatic actuation of the brakes or other train controlling means.

The co-ordinator shaft 23 is geared by any suitable means to the axle of the vehicle wheel 24 and extends vertically upward through the monitor casing, the upper end of the shaft being journalled in the lug or boss 25 formed on the casing. Centrifugal weights 26 are pivoted on an enlargement formed near the upper end of the monitor shaft, the pivotal centers being located at the lower inner corners of the weights so that gravity and centrifugal force both tend to throw the weights outward. Contact buttons formed on the inner edges of the weights near the upper ends thereof, make rubbing contact with a metallic ring 27 mounted on the lug 25 but insulated therefrom. A collar 28 is splined on the monitor shaft and connected by links 29 with the weights 26, the links being pivotally connected to the collar at a common point and pivotally connected to the weights at points just outside their pivotal connections with the monitor shaft, whereby an upward thrust upon the collar 28 will tend to hold the weights up and maintain their contact buttons in contact with the ring 27. A compression spring 30 surrounds the monitor shaft and is compressed between the splined collar 28 and a collar 31 also splined upon the monitor shaft.

The monitor shaft carries two bevel gears 37 and 38 located just above the bottom of the casing. These bevel gears are mounted between collars 33, 34 and 35, 36, respectively, fixed upon the monitor shaft. Each bevel gear is connected to the shaft by a directional clutch such as represented in Figure 18, the effect of which is to transmit motion from the shaft to each bevel gear in one direction only. The interior of each gear hub is cut out to form corners or notches in which are mounted clutch balls 41, and springs 42 each compressed between a ball and the bottom of a pocket. When the monitor shaft turns in one direction, for instance counter-clockwise as appearing in Figure 18, the rotation of the shaft tends to wedge the balls in between the surface of the shaft and the surface of the pockets, thereby locking the shaft to the gear hub and forcibly transmitting the shaft's rotation to the gear. When the rotation of the shaft is reversed, the wedging action of the balls is relieved in the obvious and well known manner, so that in its reverse movement the shaft rotates freely within the gear hub without transmitting its movement thereto.

The monitor shaft transmits movement to the gear 38 in the direction indicated by the arrow around the gear hub, although running freely in this direction in the hub of the gear 37. A reverse rotation of the monitor shaft transmits movement to the gear 37 in the direction of the arrow above this gear, although in this direction the shaft rotates freely in the hub of the gear 38. Hence the gear 39, mounted on the counter shaft 40 and oppositely meshing with both gears 37 and 38 as indicated, will be rotated in the direction of the arrow about the shaft 40, by either rotation of the monitor shaft 23.

A vertical traveller shaft 44 is mounted in the monitor casing and near its lower end carries a worm gear 45 meshing with a worm on the counter shaft 40, whereby the traveller shaft is continuously rotated in the direction of its arrow and at a rate proportionate to the speed of the railway train or vehicle in either direction. A V-worm 46 is cut upon the traveller shaft 44 above the worm wheel 45. A horizontal traveller yoke 32 is provided with a cylindrical upward extension 32$^a$ which is first milled with a clearance hole to receive the traveller shaft 44 and is then milled with an intersecting slot extending throughout the greater part of its length and receiving two clutch dogs 47, the inner cylindrical surfaces of which are cut with a female thread corresponding to the V-thread of the worm 46. The dogs are held against the worm by springs 48 mounted on the traveller. The horizontal arm of the traveller yoke extends to and surrounds the monitor shaft 23, the shaft turning therein with free clearance. The spring collar 31 rests on the upper side of the traveller arm so that the traveller arm supports the pressure of the spring 30.

A solenoid core 49 is screwed to the traveller yoke between the monitor shaft and traveller shaft, and extends upwardly into the solenoid 50 secured to a suitable cross bar 51.

The solenoid is normally energized through a circuit local to the railway vehicle and which may be traced as follows: from the vehicle battery 52 through the contacts 53 normally closed by the relay 54, and thence through the wire 55, solenoid 50 and wire 56 back to the battery. The relay 54 is normally energized by a current flowing from the battery 52 through the contacts 57 also normally closed by the relay 54, and thence through the wire 58, contact plate 59, contact spring 60, wire 61, relay 54 and wires 62 and 56 back to the battery.

The contact spring 60 is mounted on the upper end of the stem 63 which slides in the insulated bearing 64 and carries the contact shoe 65 adapted to engage short ramp rails such as 66 located at successive points along the railway.

It will be noted that, if the local circuit of the relay 54 is once de-energized so as to open its contacts 53 and 57, the local battery 52 will be open-circuited and the relay 54 cannot be re-energized by this battery until it has first been re-energized by extraneous current in order to re-close the contacts which it controls. So long as the relay 54 is de-energized, the solenoid 50 will also be de-energized because its circuit is controlled by the contacts 53 governed by the relay 54.

The signal 67 is a "distant" or "caution" signal which, in any well known manner, will be cleared when the track is clear from the insulated rail joints 68 up to a point some distance in advance of 69. This signal governs the circuit controller 70 so that the same will be closed when the signal is clear and will be open when the signal is in its caution position.

Let it be assumed that the contact shoe 65 engages the ramp rail 66 when the advance end of the train or vehicle reaches the insulated joints 68 marking the rearmost end of the track section which governs the signal 67. Now, if this signal is in clear position when the local circuit of the relay 54 is broken at the contacts 59, 60 by the rise of the spring 60 as the shoe 65 rides up on the ramp rail 66, the relay 54 will not be de-energized by this breaking of its local circuit since this circuit will be replaced by a circuit including the external battery 71, which latter circuit comes into action before the local circuit is broken and which may be traced as follows: from the battery 71 through the semaphore-controlled circuit breaker 70 and thence through the wire 72, ramp rail 66, contact shoe 65, shoe stem 63, wire 61, the relay 54 and wires 62, 56 and 73 to the axle of the vehicle wheel 24, and thence through the track rail to the wire 74 and back to the battery. As the shoe leaves the ramp rail, the contacts 59, 60 in the local circuit are re-established before the contact between the shoe and ramp rail is discontinued, whereby the local battery 52 is reconnected with the relay 54 before the extraneous battery 71 is disconnected therefrom. Hence the act of running over the ramp rail 66 produces no effect upon the relay 54 when the signal 67 is clear, and hence the solenoid 50 is not affected in passing a clear signal. But if the signal 67 is in its caution position when the shoe 65 rides over the ramp 66, the breaking of the contacts 59, 60 in the local circuit of the relay 54, will de-energize this relay and open its contacts 53 to de-energize the solenoid 50; and this relay and the solenoid cannot be re-energized until the shoe 65 comes into contact with another ramp rail included in a circuit similar to that of the battery 71 and adapted to re-energize the relay 54 so as to reclose these contacts.

The springs 48 hold the dogs 47 in engagement with the V-worm of the traveller shaft with a sufficient pressure to support the weight of the entire traveller and solenoid core 49 plus the downward pressure of the spring 30, so that the traveller will not fall when the solenoid 50 is de-energized, but will be moved slowly downward by the screw action of the worm. The springs 48 are, however, sufficiently yielding to permit the traveller to be forcibly moved along the traveller shaft, for instance, by the attraction of the solenoid for its core after the traveller has been carried some distance downward by the action of the screw. That is to say, if the traveller is moved by a sufficient force, the springs will yield and permit the dogs to slip over the V-thread. Since the solenoid is normally energized, the traveller will be normally held in its uppermost position in which the solenoid core 49 stops against the solenoid abutment 75, and the continual down-feeding action of the worm 46 will effect a continual slipping of the clutch dogs 47 on the worm.

The rubbing engagement between the contact ring 27 and the contact buttons formed on the monitor weights 26, normally closes a local circuit leading from the vehicle battery 78 through the wire 79, contact ring 27, weights 26 and metallic parts of the mechanism to the wire 80 which is grounded on the casing, and thence through the magnet 81 and wire 82 back to the battery. The magnet 81 normally holds the armature 83 in attracted position so as to normally close the monitor application valve 84 which controls a vent in the brake pipe and which, when opened, will effect an automatic service application of the air brakes. Hence, when the monitor weights 26 move outward and break contact with the contact ring 27, the local circuit including the valve magnet 81 will be broken this magnet will release its armature 83, and the valve 84 will be opened and apply the brakes.

As has been explained, when the train passes a caution signal the monitor solenoid 50 is de-energized and the traveller begins a downward movement gradually releasing the compression of the graduating spring 30. When the traveller is in its uppermost position, the spring 30 is compressed to a degree which will exert upon the collar 28 a pressure sufficient to hold the weights 26 in contact-making position against the effort of gravity plus the effort of centrifugal force up to a given maximum limit of vehicle speed. As the graduating spring is slowly expanded during the travel of the train beyond the caution signal, the contact-sustaining pressure which the spring exerts upon the monitor weights is gradually diminished until it is just sufficient to hold the weights in contact position against the effort of gravity alone, but insufficient to retain the weights against any additional outward moment due to centrifugal force.

It will now be apparent that the speed limit of the vehicle at any instant is that speed which will develop a centrifugal force sufficient to throw the monitor weights outward and break their contact with the ring 27. Obviously, this speed limit is constant so long as the monitor traveller is held in its uppermost position to maintain a constant compression of the graduating spring 30, but this speed limit will be gradually reduced after passing a caution signal until the graduating spring has been expanded, as above noted, to a point just sufficient to sustain the gravity moment of the weights, at which point the speed limit will be theoretically zero, that is to say, any further movement of the train whatever will develop in the monitor weights 26 a sufficient centrifugal force to break their contacts with the ring 27.

Let us assume that the front end of the vehicle or railway train passes the insulated joint 68 at the instant the shoe 65 rides upon the ramp 66 to initiate the downward movement of the monitor traveller in response to the passing of a caution signal; and assume that said front end will reach the point 69 when the graduating spring is expanded to the zero speed limit. Now, if a curve 77 be plotted on a base line 76 proportionate to the vehicle travel, with ordinates proportionate to the limit speed of the vehicle as determined by the graduating spring at different points in the travel, it will be found that the limit curve 77 is a true parabola.

Since the stress or pressure of the graduating spring is proportionate to its linear compression, and since the spring is linearly expanded in exact proportion to the travel of the train past the joint 68 and up to the point 69, it follows that the excess spring pressure over and above its component necessary to balance the gravity of the weights and their attached parts, will, at any point in the travel of the curve 77, be proportionate to the distance back from the terminus 69 of the curve. That is to say, the spring force available for balancing centrifugal force in the monitor weights will be exactly proportionate to the distance back from the point 69. Now, as has already been explained, the limit curve 77 represents the varying speed at which the centrifugal force of the monitor weights will be continuously equal to the varying sustaining force of the graduating spring, and since the centrifugal force is always proportionate to the square of the velocity while the spring stress opposed thereto is always proportionate to the distance back from the point 69, it follows that the curve 77 must represent a varying velocity, the square of which will be proportionate to the distance back from the point 69. That is to say, the curve 77 represents a varying speed limit proportionate to the square root of the distance back from the ultimate point 69, which, in the ordinary practice of my invention, will be the ultimate stopping point located at, or a short distance in rear of, a stop signal, the position of which will be indicated by the caution signal 67.

Assuming a substantially constant deceleration or braking force such as obtains in a full service application of standard air brakes, the braking distance for a railway train or vehicle is substantially proportionate to the square of its velocity, and hence it will be noted that I have devised a speed limiting monitor which imposes on the vehicle a varying speed limit exactly according with the normal requirements of service, permitting the train or vehicle to pass the caution signal at any given speed below the maximum limit and to proceed at that speed without an enforced application of the brakes up to the minimum distance from the ultimate stopping point which will be safe for the given speed.

It should be noted that any breakage or weakening of the graduating spring 30 will introduce a safe failure or error, since it will cause the monitor weights to fly outward before the traffic conditions require them to do so.

Figure 1 represents a railway track with signal posts located at two successive points thereon, G and H respectively. The home signal on each post is controlled by the track relay 85 of the block extending in advance, and the distant signal on each post is controlled in the usual manner by the position of its co-located home signal and the position of the home signal on the post next in advance.

A locomotive or other railway vehicle passing signals G in the direction of the arrow between the rails, is represented by the wheel 86. A worm 88 and two ratchets 89 and 90 are fixed upon one of the axles 87 of the locomotive. The worm 88 drives two worm wheels mounted respectively on the vertical shaft 91 and the short countershaft 92. Both worm wheels and shafts are rotated by the worm in the same direction. The worm wheel mounted on the shaft 91 carries a pawl 93 which, when the worm wheel is rotated in the direction of its arrow, drives the ratchet fixed upon the shaft 91, propelling this shaft in the direction of the arrow on the worm wheel, that is the direction of the arrow 98 surrounding the shaft just below the flexible transmission spring 94. Meanwhile the countershaft 92 is also rotated in the direction of the indicating arrows, and this shaft carries a spur gear 96 meshing with a spur gear 97, which, therefore, is now driven in the direction of the arrow about its hub. This spur gear 97 carries a pawl engaging a ratchet fixed upon the shaft 91 just below the gear, but when rotating in this direction the pawl slips over the ratchet while the gear rotates freely on the shaft 91 in the direction opposite to the rotation of this shaft. Now, if the travel of the locomotive is reversed, the rotation of the shafts 91 and 92 will both be reversed, the pawl 93 will slip freely over the ratchet which it engages, and the gear 97, being now driven in the direction opposite to the arrow about its hub, will drive the shaft 91 in the direction of its arrow 98, because the pawl carried on the gear 97 will now engage its ratchet in the direction to impel the same. Hence the shaft 91 will always be driven in the direction of the arrow 98, regardless of the direction in which the locomotive is moving. Also the vertical shaft 100 will be driven always in the direction of the arrow 99, regardless of the direction of locomotive travel, since this shaft is driven by the bevel gear 101 fixed upon its lower end and oppositely meshing with bevel gears 102 and 103 loosely mounted on the locomotive shaft 87 and driven in opposite directions by the ratchets 89 and 90 engaging directional pawls mounted respectively on the gears 102 and 103.

The rotations of the shafts 91 and 100 are transmitted respectively through the transmission springs 94 and 95 to the shafts 104 and 105$^a$ respectively. The shaft 104 carries at its upper end a worm 106 meshing with a worm wheel 107, and the shaft 105$^a$ is connected by an insulating joint 105$^b$ with a co-axial extension or shaft 105 which is conductively continuous above the joint 105$^b$ but carries a worm 108 mounted on an insulating sleeve and driving a worm wheel 109. The worm wheels 107 and 109 are mounted on a common shaft 110, the wheel 107 having a hollow projecting hub 111 upon which are mounted the arms 112, 113 and 114, as explained hereinafter.

All the gears of the foregoing transmission systems will be so cut that the worm wheels 107 and 109 will normally be rotated in the same direction, as indicated by their arrows, and at the same velocity. The peripheral portion of the worm wheel 109 is mounted upon but insulated from an inner web portion 109$^a$. A spring brush 115 is secured on the rear side of the gear 107 and projects radially in front of the gear 109, spanning the insulated joint in the gear and normally resting upon a boss 109$^b$ raised upon the face of the outer portion of this gear. Thus the outer portion of the gear 109 is normally in electro-conductive communication with the gear 107 and other metallic parts of the mechanism electrically communicating therewith. Any difference in rotation of the gears 109 and 107 sufficient to wipe the brush 115 off the contact boss 109$^b$, will break the foregoing conductive connection, since the brush 115 will then stand clear of the face of the gear 109.

Figure 9:
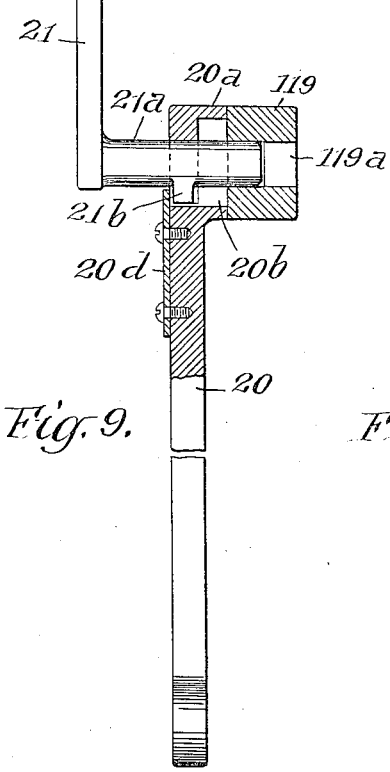
Figure 9 is an enlarged vertical section through the link 20 of the monitor mechanism of Figure 2.
Figure 10:
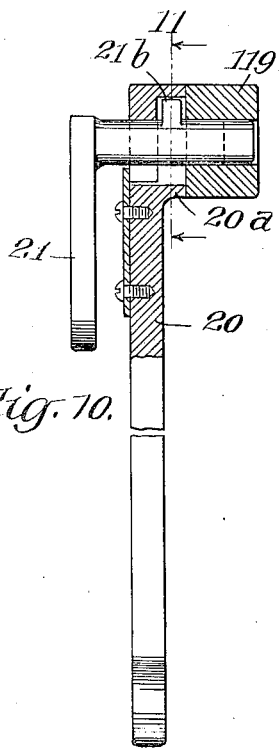
Figure 10 is a similar view showing the shift handle 21 in locking position.
Figure 11:
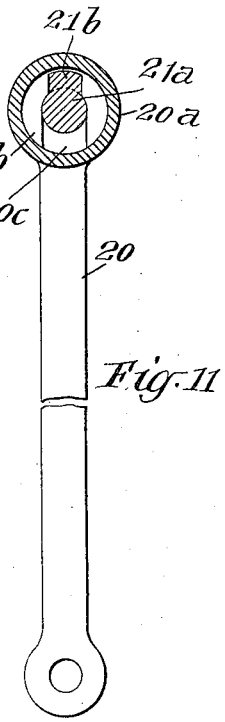
Figure 11 is a transverse sectional view taken through the head of the link 20 on the plane 11 of Figure 10.

Immediately in front of the gear 107 is mounted the traveller arm 112 integrally formed with the traveller cam upon which rests the cam roller 116 mounted on a stud in the free end of the roller arm 117, the opposite end of which is pivoted on a fixed stud 118. The vertical link 20 is pivoted to the roller arm 117 concentrically with its roller, and the upper end of this link is finished in a rounded head 20$^a$ disposed in front of the brake-factor adjusting lever 119. This head is drilled from the rear side about half way through with a large cylindrical recess 20$^b$, and counter-drilled all the way through with a smaller bore fitting the pin 21$^a$. The lower part of the web remaining at the bottom of the recess 20$^b$ is then cut away to form a slot 20$^c$ which may have the same diameter as the counter-drill. The transfer pin 21$^a$ is formed integral with the transfer handle 21, the handle being normally in the dependent position shown in Figures 2 and 10, with the pin 21$^a$ projecting through the link 20, and substantially through one of the holes 119$^a$ drilled through the web at the bottom of the slot 119$^b$ which is cut in the adjusting lever in arcuate form. With the parts in this position, the locking feather or key 21$^b$ which is formed on the pin 21$^a$ projects radially upward in the recess 20$^b$ so that, by engaging the web at the bottom of this recess it will prevent the pin 21$^a$ from being withdrawn from the hole 119$^a$ in which the pin is located. In order to transfer the pin 21$^a$ to another hole 119$^a$, the handle 21 will be swung 180° to its position shown in Figure 9, whereupon the pin 21$^a$ can be withdrawn from the hole 119$^a$ in which it is located, the key 21$^b$ passing into the slot 20$^c$ to accomplish this result and being stopped by the plate 20$^d$, as shown in Figure 9, so as to keep the inner end of the pin 20$^a$ securely in the slot 119$^b$ while the transfer is made to another of the holes 119$^a$.

The right end of the adjusting lever 119 is formed into a pivoting hub with a slot 119$^c$ through which passes a fixed pivot stud as indicated. An integral toe extends rightward from the hub. The manual-hold-out lever 120 is pivoted on the same stud with the adjusting lever 119 and carries a pin 120$^a$ projecting from its face which engages the toe 119$^d$ of the adjusting lever when the hold-out lever is manually swung from its normal stop 121 to its hold-out stop 122, these stops consisting in adjustable screws as indicated.

The left end of the adjusting lever 119 terminates in a fork 119$^e$ insulated from the main body of the lever by a joint 119$^f$, and embracing a collar 123 loosely mounted on the monitor shaft 105 and provided with diametrically opposite trunnion pins to which the fork is pivoted. Resting on the collar 123 is a collar 124 splined on the shaft 105 and acting as the lower abutment for the monitor graduating spring 125, the upper end of which bears against the collar 126 loosely mounted on the monitor shaft and provided with a radial stud which bears the equalizing lever 127, the middle slot of which straddles the stud and the ends of which are provided with pins entering the longitudinal slots in the vertical links 128, the upper ends of which are pivoted to the monitor weights 129 and 130 at points just outside the pivotal connections of these weights with the monitor shaft.

The graduating spring 125 delivers an upward thrust upon the collar 126 which, by the equalizing lever 127, is transmitted equally to the thrust links 128 and thence to the monitor weights, so as to develop in the weights equal retentive efforts tending to maintain their respective contact buttons in rubbing engagement with the contact rings 132 and 133 respectively, mounted upon an insulating sleeve 131 which is slipped over the cylindrical journal box 134 in which the upper end of the monitor main shaft has its bearing.

The monitor weights 129 and 130 are similarly formed and symmetrically mounted, but their differential limit-adjusting screws $129^a$ and $130^a$ are differently adjusted so that with a given rotative speed, the warning weight 129 will be subjected to a greater centrifugal force than the stop weight 130. The adjusting screws are entered in the tapped holes which pass through the monitor weights longitudinally and vertically, so that the gravity moment of either screw about the pivotal center of its respective weight is a constant, regardless of the position of the screw in the weight. Hence, differential adjustment of the screws does not effect any difference in gravity moment upon the weights which therefore, when affected only by gravity, as when the locomotive is stationary or moving at negligible speed, will both overcome the effort of the graduating spring 125 at the same instant in the gradual expansion of the spring resulting from the downward travel of the collars 123 and 124 during the progressive movement of the locomotive, as will be explained.

When the locomotive is proceeding under any appreciable speed, the centrifugal effort developed in each monitor weight will be proportionate to the product of the square of the velocity and a constant determined by the position of the limit-adjusting screw in the weight. The velocity factor being the same in both weights, and the said constant factors being in a constant ratio, it follows that the centrifugal efforts developed in the weights remain in constant ratio to each other with any given setting of the adjustment screws, and regardless of the speed of the vehicle. That is to say, the centrifugal effort developed by the warning weight 129 will always be a definite percentage above that of the stop weight 130 with a given adjustment of the screws, so that with any position of the graduating collars 123 and 124, the speed of the locomotive just sufficient to swing the warning weight out against the retentive effort of the graduating spring, will always be a constant percentage of the greater speed which would be necessary to swing out the stop weight 130 with the graduating collars in the same position. As will be later explained, the automatic train stopping actuation of the air brakes will be effected when the stop weight 130 is swung outward by centrifugal force, but a preliminary warning will be given the engine driver when the warning weight 129 is similarly swung outward. Therefore the engine man will always receive a warning when the locomotive speed attains a definite percentage of the safe speed limit as determined by the varying effort of the graduating spring for any given distance from the ultimate stopping point.

On a stud projecting from the rear face of the traveller arm 112 is pivoted an L-shaped lever 135 called the releasing clutch. The short arm of the lever extends transversely from the traveller arm and is formed into a pawl engaging the periphery of the gear 107, while the other arm of the lever extends toward the outer end of the traveller arm and is formed into an armature normally attracted by the magnet 136 mounted in a frame formed on the outer end of the traveller arm. The magnet normally holds the pawl arm of the lever in firm engagement with the gear 107, thus normally clutching the traveller arm to this gear, the engaging face of the pawl being shaped so that it can be readily forced upward over the periphery of the gear, and will also permit the gear to slip under the pawl when the arm 112 is stopped in a fixed lower position, as will be explained.

An arcuate solenoid core extends upward from the traveller arm 112 and enters an arcuate solenoid 137 disposed concentrically with the traveller shaft 110. This solenoid when energized will attract its core with sufficient force to lift the traveller arm to its uppermost position, slipping the releasing clutch over the gear 107 and rotating the cam formed on the arm 112, thus raising the cam roller 116, the thrust link 20, the brake-cam roller 116, the thrust link 20, the brake-factor adjusting lever 119 and the graduating collars 123 and 124, so as to compress the graduating spring 125 to a maximum limit determined by the setting of the transfer pin $21^a$ in the lever 119.

It will be noted that the expansive effort of the graduating spring 125, together with the effort of gravity on all the parts involved in the transmission from the traveller arm 112 to the monitor weights, tend to forcibly rotate the traveller arm in the same direction in which the gear 107 rotates, the releasing clutch 135 normally preventing the traveller arm from rotating faster than the gear. Thus, after having once been set and clutched to the gear 107, the traveller arm rotates clockwise proportionately to the travel of the locomotive until the semi-circular stud 112ª stops against the right edge of the half-setting arm 113, also mounted on the hub 111 of the gear 107, just in front of the traveller arm 112. This stop stud 112ª engages the edge of the arm 113 when the two arms are in angular register with each other. A similar stop stud 113ª on the arm 113 is stopped against the right edge of the manual re-setting lever 114 also mounted on the gear hub 111 just in front of the half-setting arm 113. Hence both arms 112 and 113 are ultimately stopped when they come in angular register with each other, with their lower or leading edges in register with the right edge of the manual re-setting lever 114. The manual re-setting lever swings between adjustable screw stops 138 and 139, and normally rests against the back stop 138, thus normally determining the ultimate or stopping position of both arms 112 and 113.

Another arcuate solenoid 140 disposed concentrically with the traveller shaft 110, co-acts with an arcuate core formed on the half-setting arm 113 so that, when this solenoid is energized, the arm 113 will be rotated counterclockwise through a limited angle. Hence when both arms 112 and 113 have been stopped in their lowermost positions, they will both be rotated or re-set counter-clockwise by the attraction of the solenoid 140 for its core. When the solenoid is de-energized after this movement, the arm 113 falls back to its initial position, but the arm 112 remains clutched to the gear 107 travelling slowly clockwise with the gear as the locomotive moves.

The foregoing operation of the solenoid 140, however, only carries the arm 112 about half way from its lowermost to its uppermost position. If the solenoids 140 and 137 are simultaneously energized, the solenoid 137 will attract its core after the same has been lifted within magnetic range of this solenoid by the action of the solenoid 140 upon its core, whereby the simultaneous energization of both solenoids will raise the traveller arm 112 to its uppermost position, although the energization of the solenoid 140 alone will raise it only about half of that distance.

A supplemental traveller arm 141 is mounted on the traveller shaft 110 in rear of the gear 109, and is normally held in horizontal position by the attraction of the solenoid 142 for its core which is pivotally connected with the supplemental traveller. A pawl 143 mounted on the supplemental traveller slips over the periphery of the gear 109 while the traveller is held in its normal position by the solenoid, but when the solenoid is de-energized the supplemental traveller 141 travels clockwise with the gear 109, the pawl 143 preventing the arm from falling by gravity faster than the gear rotates. A spring 144 mounted on the lower side of the supplemental traveller breaks contact with an adjustable screw 145 after the traveller has moved through a limited distance determined by the setting of the screw, the spring 144 being normally strained so that it will remain in engagement with the screw while the recoil of the spring is being expended in said limited movement. The uppermost or normal position of the supplemental traveller is adjusted by a stop screw 146 bearing on a plate mounted on the upper side of the traveller, and the lowermost position of the traveller is determined by a stop screw 147 engaged by the spring 144.

A clutch-releasing monitor weight 148 is pivoted on the monitor main shaft below the worm 108, and has an inwardly projecting toe 148ª upon which bears a spring 149 compressed between the toe and an adjustable collar 150 threaded on the shaft. Centrifugal force and the spring pressure tend to maintain the contact button 148ᵇ of the weight in rubbing contact with the underside of the fixed contact ring 151, but action of gravity on the weight tends to swing it out of contact with the ring. By varying the position of the collar 150, the pressure of the spring will be adjusted so that it will alone be insufficient to counterbalance the effort of gravity, and when the monitor main shaft is stationary the contact button will be out of contact with the ring, so that a definite low speed of the locomotive will be necessary to develop sufficient centrifugal force to establish and maintain the contact. Obviously the critical speed at which the contact will be made and broken will be determined by the pressure of the spring regulated by the adjustment collar.

A brush 152 rubs on the shaft 104 and is connected with the positive terminal of the battery 153, whereby the shaft 104 and all parts in conductive connection therewith are connected with this terminal of the battery. A brush 154 makes intermittent contact with a radially extending contact cam 104ª on the shaft 104, the contact being closed once during each revolution of the shaft.

The recorder comprises two parallel paper feeding rollers 156 and 157. The record-receiving paper roll 155 is fed from the roller 157 to the roller 156. Below the roller 156 and parallel therewith is a tappet shaft 158 upon which are pivotally mounted the record-marking levers which mark the record upon the paper roll. These levers are L-shaped, and depend from the tappet shaft with their shorter arms presented horizontally toward the paper roll. An ink ribbon 159 is disposed in a plane parallel with the paper stretched between the rollers 156 and 157, and is interposed between the record-marking levers and the paper, and is fed horizontally from the ribbon roller 160 to the roller 161, by the pulling action of the latter roller which is impelled by a worm wheel mounted on its shaft behind the worm 171 co-acting therewith and formed on the shaft of the roller 157.

Each record-marking lever constitutes an armature which is attracted by a magnet located in front thereof, and, when its magnet is de-energized, is swung forcibly toward the ink ribbon by the effort of a helical torsion spring connected with the lever and anchored to the tappet shaft. The springs of several of the levers are adjusted so that, when passive, they will poise their respective levers with their type just clear of the ink ribbon, but the momentum of the levers will impinge their type forcibly against the ribbon when their magnets are de-energized, thus imprinting a record on the record-receiving paper. Others of the record-marking levers have their springs adjusted to hold the marking ends of the levers continuously against the ink ribbon while their respective magnets are de-energized, thus tracing a continuous line upon the record-receiving paper, the ribbon-engaging points of these line-marking levers being rounded to permit the ribbon to slip smoothly underneath them.

The time-recording type lever 162 is formed integrally on a common hub with a crank arm 163 carrying a crank pin 164 entering a radial slot in the rock arm 165 mounted loosely on the shaft of the roller 156 and provided on its inner face with a rock pawl engaging a ratchet also mounted loosely on said shaft and carrying one end of a spiral spring 166, the other end of which is anchored to the roller. A fixed pawl 167 also engages the ratchet to prevent the same from moving backward after it has been driven forward one step by the rock pawl, which occurs once during each minute when the time-recording magnet 168 is energized through the following circuit: from the positive terminal of the battery 153 through the clock-controlled contacts 169, wire 170 and magnet 168 back to the negative terminal of the battery. When the magnet 168 is de-energized after attracting the type lever 162, the lever is forcibly retracted by its coil spring to imprint a time record, as will be more fully explained hereinafter.

The intermittent winding of the paper feeding spring 166 keeps the same under continuous stress so as maintain a torque on the roller 156, thus developing a continuous pull on the record-receiving paper tending to continuously unwind the same from the roller 157, the rotation of which is resisted by a train of multiplying gears transmitting a rapid rotation to the retard fan 172. It must be understood that in practice the spring 166 will be a very long spring so that its torque will not be appreciably varied by winding or unwinding the same one step, as occurs during each minute that the paper is being fed.

The brake pipe of the air brake system communicates with a stationary hollow piston-rod 173 terminating in a piston 174. A cylinder 175 is mounted on the piston-rod and piston. A compression spring surrounds the piston rod and is compressed between the piston and the opposite end of the cylinder, and tends always to slide the cylinder over the piston and piston-rod until the head of the cylinder engages the piston. The hollow duct through the piston-rod is continued through the piston and communicates with the cylinder space between the piston and cylinder head. A small round pointed pin 176 is carried by a lug on the head end of the cylinder and rubs against the ink ribbon 159 so as to mark a continuous line upon the record-receiving paper 155. Since the cylinder will be longitudinally displaced to a greater or less extent according to the pressure of air in the brake pipe, the lateral position of this line on the record-receiving paper will indicate the air pressure existing in the brake pipe at any instant. A similar pressure-recording cylinder 177 communicates with the steam boiler of the locomotive and carries a similar recording pin marking a record line upon the paper in a position at the right of the cylinder 175.

The main reservoir 178 of the air brake system communicates with the brake pipe or train pipe through the engineer's valve 179, pipes 180 and 181, and thence through the normally opened port 182 of the monitor main valve 183, and thence through the pipe 184 connected with the brake pipe. When the port 182 is closed, it is impossible to transmit air from the engineer's valve to the brake pipe, although air may be taken from the brake pipe through the engineer's valve by way of the check valve 185 which constitutes a return by-pass around the port 182. Hence, when the port 182 is closed, it will be impossible to charge the brake pipe or release the brakes, although the engineer's valve will still be available to make a service or emergency application.

The relay valve 186 consists in a vertically disposed cylindrical valve chamber, the upper end of which communicates with the main reservoir 178 and the lower end of which communicates with the atmosphere, but is normally closed by the valve piston 187 mounted on a common stem with an upper valve piston 188 normally disposed in the upper enlarged chamber of the valve casing with ample clearance for the flow of air past the piston and through the middle smaller chamber 186ª to the pipe 189. The valve stem is secured in the upper end of a solenoid core 195 normally held by a solenoid 196 which normally sustains the valve against the pressure of air tending to force the pistons downward. Normally the main reservoir communicates freely through the relay valve casing with the pipes 189 and 190 leading to the lower end of the throttling cylinder 191 and, also leading through the adjustable pin valve 192 and check valve 197 in parallel with each other, and thence to the timing-reservoir 193 and to the lower end of the middle chamber 194 of the monitor main valve. The upper valve-piston 188 fits the restricted middle bore 186ª of the valve casing so that, when the solenoid 196 is de-energized and drops its core, the piston 188 will close the bore 186ª, thus shutting off communication between the main reservoir and the pipe 189, while this pipe will be opened to the atmosphere through the bottom bore of the valve casing from which the lower piston 187 emerges after the upper piston 188 has closed the bore 186ª.

The casing of the monitor main valve 183 comprises three cylindrical bores, the upper, middle and lower, of different diameters, the middle being the largest, the upper next in order, and the lower bore being the smallest. The piston valve which slides in this casing likewise comprises three piston sections fitting the three respective bores, the middle piston having an annular groove cut into its under side to receive the upper end of the balancing spring 198 which surrounds the lower smallest piston and rests on the bottom of the middle chamber of the valve casing. The balancing spring is a light spring normally expanded to its full length with a considerable clearance between its upper end and the top of the annular recess, so that the piston valve which normally occupies its uppermost position, will travel some distance downward before it engages the spring. The upper piston of the valve is axially bored from its upper end, and the port 182 consists in a radial hole passing through the wall of the piston, communicating with its axial bore, and normally registering with a port in the valve casing which communicates with the pipe 181. A vent port 199 leads from the atmosphere into the middle chamber of the valve casing near the upper end of the chamber. A port 200 leads from the lower chamber of the valve casing at a point just below the uppermost position of the bottom of the piston valve, and communicates with the brake pipe. The lower end of this lower chamber is connected with the balancing reservoir 201.

The throttling cylinder 191 comprises upper and lower cylindrical chambers of different diameters, the lower being the larger, and the piston valve within the cylinder comprises a long and short section fitting these bores respectively. Steam from the locomotive boiler enters the upper end of the throttling cylinder and passes through an axial bore in the upper section of the piston valve and thence through the lateral port, a connecting pipe, and the manually controlled throttle to the locomotive cylinders. The area of the lower end of the piston valve will exceed the area of the upper end sufficiently to insure a total air pressure on the lower end exceeding the total steam pressure on the upper end sufficiently to hold the piston valve in its uppermost position holding its steam port open as indicated. When the air pressure underneath the piston is released or sufficiently diminished, the piston will be forced downward by the steam pressure so as to close the steam port leading from the locomotive boiler to the hand throttle 202.

Each time that the time-recording magnet 168 is energized to attract its armature 162, the time-recording wheel 204 is moved one step by the fixed pawl 203 engaging the ratchet 204ª formed integrally with the wheel, as indicated in Figures 3 and 4. Hence, the time wheel prints different consecutive records as it is successively struck against the ink ribbon by the action of its retractile spring each time that its magnet 168 is de-energized. Figure 1 shows only one time-recording wheel 204, but it will be understood that, in practice, the recorder will include the entire group of time wheels represented in Figures 3 to 7 inclusive.

The time-recording lever 162 carries a stud 207 drilled with three diametric holes, each containing a spring compressed between two steel balls protruding from the opposite ends of the hole and bearing outward against the corrugated surface of a hole bored in one of the type wheels 204, 205 and 206, these type wheels being mounted on the stud consecutively between the lever and the head of the stud. The bore in the type wheel 204 has ten corrugations disposed at equi-angular intervals, and the bores in the type wheels 205 and 206 have twelve corrugations similarly disposed. The character of the corrugations and the arrangement of the spring and balls are represented in Figure 7 showing a section of the time wheel 206. It will be understood that the pressure of the balls will lightly resist the rotation of the type wheels, acting as yielding detents to arrest the type wheels in definite successive angular positions corresponding to equal successive steps serving to bring their respective type successively into printing positions facing the ink ribbon. These type 204$^b$, 205$^b$ and 206$^b$ project slightly from the peripheries of their respective wheels 204, 205 and 206.

As the type wheel 204 rotates step by step in the direction of the indicating arrows, it drags with it the arcuate flat spring 210, the hook end of which rides on the periphery of the disc cam 208 interposed between the wheels 204 and 205 and pinned firmly on the stud 207 as indicated. The wheel 205 carries a similar arcuate spring, the hook end of which rides on the cam 209 similarly mounted between the wheels 205 and 206. The cams 208 and 209 hold the hook ends of the springs 210 and 211 normally out of engagement with the ratchets 205$^a$ and 206$^a$ presented toward these cams and respectively formed on the hubs of the gears 205 and 206. The cams have flat portions permitting the hook ends of their respective springs to engage the ratchets during limited angular movements of the springs.

The characters which are printed by the respective type are indicated by the numbers placed adjacent thereto in Figures 5, 6 and 7. The type on the wheel 204 will print ten units consecutively from 0 to 9, which will indicate the unit minutes of the time record. The twelve type on the wheel 205 will print two similar numerical series in succession, each series comprising six figures running consecutively from 0 to 5, these type serving to print the tens of the minutes of the time record. The type on the wheel 206 will print numbers consecutively from 1 to 12, to indicate the hour of the time record.

After the unit 9 has been printed by the type wheel 204, the spring 210 will rest in the middle of the flat portion of its cam 208 in the position indicated by the dotted lines, where it engages the driving face of one of the teeth of the ratchet 205$^a$. Now, when the type lever 162 is drawn back by the time-recording magnet 168 preparatory to printing another time record. the pawl 203 drives the unit wheel 204 one-tenth of a revolution, bringing its zero type into printing position, while the spring 210 drags the ratchet wheel 205$^a$ one-twelfth of a revolution, thus rotating the type wheel 205 one step and bringing another of its type into printing position. For instance, if the preceding stroke of the time wheels had printed a record indicating 19 minutes on the record-receiving roll, this backward movement of the type lever 162 would move its type wheels into positions to print a time record indicating 20 minutes since, while the 0 unit type moves into the printing position which was occupied by the 9 unit type, the 2 type of the tens wheel assumes the printing position which was occupied by the 1 type thereof. Thus the minutes are consecutively recorded up to 59th minute, following which the next backward movement of the type lever effected by the time-recording magnet brings the 0 type of both the units and tens wheels into printing positions. After the wheel 205 has printed its numeral 5 on the record-receiving roll, its ratchet-actuating spring 211 rests in the middle of one of the flat portions of its cam 209 in engagement with one of the teeth of the ratchet 206$^a$, so that this last movement of the tens wheel bringing its 0 type into printing position, will move the ratchet wheel 206$^a$ through one-twelfth of a revolution, thus rotating the hour printing wheel 206 through one step and bringing its next consecutive hour-recording type into printing position. That is to say, if the last time record printed was 1 59, the next record printed by the forward movement of the type lever would be 2 00. The flat portions on the cam peripheries are so cut that each ratchet-impelling spring wipes off the end of the co-acting ratchet tooth after moving the tooth one-twelfth of a revolution.

The ramp-recording magnet 212 is normally energized, but, as appears hereinafter, will be momentarily de-energized each time the locomotive passes one of the ramp rails 215 included in the train-controlling system.

The diagram represents a type wheel 213 mounted on the type lever actuated by the ramp-recording magnet, and a fixed pawl 214 arranged to rotate this wheel step by step, as in the case of the time-recording type wheels. For simplicity of illustration, I have represented only one ramp-recording type wheel 213, but it will be understood that in practice a group of these wheels, generally three, will be mounted side by side on the same stud, the arrangement being the same as the organization of the time recording wheels, except that the ramp-recording wheels will be adapted to print a regular numerical series, for instance, from 000 to 999. Therefore, each time that the locomotive passes a ramp rail, the ramp-recording wheels will be struck against the record-receiving paper by the effort of their retractile spring, and will thus print a numerical series indicating the different successive ramp rails by consecutive numbers.

The ramp rails will generally be located just in rear of the respective signals, and as the locomotive passes over each ramp rail, the contact shoe 216 rides up on the ramp rail, being thereby raised sufficiently to engage and lift a stem mounted to slide vertically in the block 217 and at its upper end carrying an insulated contact finger 218 normally making contact with the plate 219. Hence, while the shoe is passing over the ramp rail, this contact is broken, thereby temporarily opening the following circuit: from the positive terminal of the local battery 153 carried on the locomotive, through the contacts 218, 219, wire 220 and ramp-recording magnet 212 to the negative terminal of the battery. The momentary breaking of this circuit prints on the record-receiving paper a number indicating the ramp rail over which the locomotive is passing, as before explained.

The block 217 carries a steel brush, as indicated, which serves to clean the ramp 215 for contact with the locomotive shoe 216, and as the shoe rides over the ramp in approaching the signal post G, if the home signal on this post is in clear position, a circuit will be closed from the outside stationary battery 221 through the polarized relay 222 carried on the locomotive, the direction of current flow in this relay being determined by a pole-changer 223 operated by the distant signal. Assuming that only the home signal is clear, this circuit may be traced as follows: from the positive pole of the battery 221, which may be represented by the long line of the battery symbol, through the wires 224 and 225, contacts of pole-changer 223, wire 226, ramp rail 215, shoe 216 and its suspending link, wire 227, relay 222, wire 228, axle and wheel 86, track rail 229, wire 230, contacts of pole-changer 223, wires 231 and 232, contacts 233 closed by the clear position of the home signal, and thence through the wire 234 and the contacts 235 normally closed by the track relay 85, and thence to the negative pole of the battery 221.

It will be apparent that when the distant signal is cleared, the pole-changer will connect the wires 226 and 230 respectively with the wires 232 and 225 included in the foregoing circuit, so that the ramp rail 215 will be connected with the negative pole of the battery 221 instead of its positive pole, while the current from the positive pole of this battery will flow through the wires 224 and 225 to the wire 230, and thence through the polarized relay 222 in the direction reverse to the direction which obtains when the distant signal is in caution position. Therefore, as the shoe 216 wipes over the ramp rail, it will be energized with positive or negative polarity according as the distant signal is in caution or clear position, while the armature 236 of the polarized relay will be swung momentarily from its neutral gravity position either rightward or leftward respectively. The current delivered to the polarized relay by positive energization of the ramp rail 215 when only the home signal is clear, and which swings the relay armature to the right, will, for convenience, be designated as a half-headway current, and the opposite current produced by negative energization of the ramp rail when the distant signal is cleared, will be designated as the full-headway current, the significance of these terms depending on the fact that the half-headway current results in raising the traveller arm 112 from its lowest position half way up to its highest position, while the full-headway current in the relay 222 results in raising this traveller arm fully to its uppermost position. When the relay armature 236 swings rightward, it closes a circuit from the positive pole of the locomotive battery 153 through the half-setting solenoid 140, wire 237, contact 238 and relay armature 236 to the negative pole of the battery, thus energizing the solenoid 140 to raise the traveller arm 112 half way up, as has been explained. When the armature 236 is swung leftward, it closes the same circuit of the half-setting solenoid 140 through its contact 239, and simultaneously closes a circuit leading from the positive pole of the battery 153 through the full-headway solenoid 137, wires 240 and 241, contact 242 and armature 236 to the negative pole of the battery, thus energizing the full-headway solenoid 137 simultaneously with the half-headway solenoid 140, and thereby raising the traveller arm 112 fully to its uppermost position, as explained before.

In the ideal application of this embodiment of my invention, the length of each signal block, for instance from G to H, would be that distance of locomotive travel during which the traveller arm 112 would travel from its half way position to its lowermost position, which, as determined by the stop screw 138, will expand the graduating spring 125 to that degree which will just exactly balance the gravity moments of the monitor weights, so as to impose the zero speed limit or absolute stop requirement when the locomotive reaches the advance end of the block after having passed a home clear and distant caution signal effecting only the energization of the solenoid 140 and the half-setting of the arm 112. Since the passing of the home and distant signals both clear results in raising the arm 112 twice as far as the home clear and distant caution signal, it follows that this full setting of the traveller arm 112 will enable the locomotive to run just twice as far, to wit, two blocks, before the graduating spring 125 will be expanded to its zero speed limit.

After each energization of the half-setting solenoid 140, the half-setting arm 113 falls back to its lowermost position. Obviously, when the locomotive has passed home clear and distant clear signals and proceeded through one block, the traveller arm 112 will have travelled half the distance from its uppermost to its lowermost position, so that the passing of a home clear and distant caution signal at the next post would merely result in idly raising the half-setting arm 113 without affecting the traveller arm 112. Now, as the train proceeds past the caution signal and through the ensuing block, its speed limit is gradually reduced from the maximum safe limit for a full block braking distance to the zero limit or absolute stop limit at the end of the block where the locomotive reaches the stop signal. The traveller arm 112 cannot be re-set at all by passing over the ramp rail in the rear of the stop signal. If the engine driver waits until one or both of the signals is cleared before running over the ramp rail, the traveller arm 112 will obtain a half-set or full-re-set according as the signals indicate one or two blocks clear, as explained before.

The cam surface on the traveller 112 will preferably be designed to effect a substantially uniform travel of the graduating collars 123 and 124 on the monitor shaft, so that, as explained in connection with the system of Figure 17, the speed limit will be proportionate to the square root of the distance from the ultimate stopping point.

When the travel of the locomotive has carried the traveller arm 112 to or near its zero speed limit, as when the locomotive approaches a stop signal, the engine driver may avoid the absolute stopping of the train and proceed at low speed "under control" by grasping the manual re-set lever 114ª and raising the same up to or toward its upper stop screw 139, thereby raising the half-set lever 113 and the traveller arm 112 a short distance, the limit of which is determined by the upper stop screw, which, therefore, determines the speed limit attainable when the locomotive should be proceeding "under control." So long as the manual re-set arm is held against its upper stop, the traveller 112 can not move downward and the graduating collars will remain in a fixed position imposing a constant speed limit which, in the graphic speed diagram, appears as a horizontal line or flat limit as shown at 243 in Section A of Figure 12. It must be noted that this flat limit, however, can only be maintained while the engine driver stays at his post with his hand on the manual reset. If he releases this lever, the traveller immediately resumes its downward travel toward the zero or absolute stop limit. Hence, this arrangement, while permitting the train to pass a stop signal under the so-called "permissive rule," yet imposes a low speed limit which will keep the train substantially under control, and also imposes upon the engine driver the necessity of keeping at his post while proceeding through a block against the stop signal.

If it is desired, the lower stop screw 138 may be advanced to arrest the downward movement of the traveller before it reaches the position imposing the zero speed limit, thereby enabling the engine man to take his train past the stop signal without manipulating the handle 114, although it will still be impossible for the locomotive or train to exceed a flat speed limit, as before mentioned. The upper stop 139 may now be located a short distance from the manual lever 114ª so that the engine man may increase the flat speed limit by raising this lever, so long as he remains at his post, or the stop 139 may be set hard against the lever so as to firmly clamp the lever between the two stops and maintain a single invariable flat speed limit. In this last instance it will be unnecessary for the engine man to manipulate the manual resetting lever, as explained hereinafter, in order to release the brakes after they have been set by the operation of the automatic stop apparatus.

When the manual re-setting arm 114 is movable from a zero-limit position determined by its back stop 138 to a position against its front stop 139 affording a considerable low speed limit, if the locomotive be proceeding at a speed slightly below this limit, the engine man may momentarily release the handle 114ª without immediately incurring a de-energization of the supplemental-traveller solenoid 142, since the travmental-traveller solenoid 142, since the traveller 112 will not immediately fall when the re-setting arm is dropped, but will merely resume its slow clockwise travel tending to slowly reduce the speed limit. This circumstance gives the engine man slight latitude to attend to any momentary duty which might take him momentarily from his post. If it be desired to require the engine man's continuous presence at his post when running slowly through a block against a stop signal, the back stop 138 of the manual re-setting handle may be set for the zero speed limit and its upper stop 139 may be adjusted so close as to prevent any substantial movement of the arm in its re-setting direction. Now the manual re-setting arm is of no avail to raise the stop limit above the zero value, but the engine man may grasp the hold-out lever 120, pull the same against its back stop 122, and thus directly raise the lever 119 and graduating collars 123, 124 to a limited extent, meanwhile lifting the roller 116 from the traveller cam. Thereby a low flat limit is established which will enable the engine man to take his locomotive slowly through the block, but it will be instantly discontinued the moment the hold-out lever is released. Now, should the hold-out lever 120 be released when the train is moving at any appreciable velocity against a stop signal, the warning and stop weights would instantly fly out and the supplemental-travelled solenoid 142 would instantly be de-energized, giving the engine man a latitude of only about 100 feet before the automatic application of the brakes would be incurred.

Each time that the half-headway solenoid 140 is energized as the locomotive passes a home clear signal, the home-signal recording magnet 244 is energized in parallel with this solenoid through a circuit branch as follows: from the wire 237 through the wire 245 and magnet 244 to the positive pole of the locomotive battery. Hence, as the shoe leaves the ramp rail to de-energize the solenoid 140, the magnet 244 is simultaneously de-energized, thus releasing its type lever 247 to imprint a record on the record-receiving roll. The character thus imprinted may be H as shown in Figure 13, indicating that a home clear signal has been passed. Each time that the full-headway solenoid 137 is energized, the distant-signal recording magnet 248 will be energized, through a circuit branch in parallel with the solenoid and leading from the wire 240 through the wire 241 and through the magnet 248 to the positive pole of the battery. Hence, when the shoe wipes off the ramp rail as the locomotive passes a clear distant signal, the magnet 241 releases its type lever 502 to imprint a record on the record-receiving roll, for instance, a D with a horizontal line drawn through it, as appearing in Figure 13, and indicating that a clear distant signal has been passed.

The indicator solenoid 249 is de-energized to give a warning signal when the warning monitor weight 129 swings outward and opens the following circuit: from the positive terminal of the battery 153 through the brush 152, monitor shaft 104, gear 107, contact spring 115, gear 109, supplemental traveller arm 141, contact spring 144, contact screw 145, wire 250, solenoid 249, wire 251, contact ring 132, monitor weight 129, monitor shaft 105, its bearing 134, and thence through the wire 252 to the negative pole of the battery. Simultaneously the warning recording magnet 253 is de-energized, this magnet being included in parallel with the indicator solenoid 249 through a circuit branch which may be traced from the wire 251 through the wire 254, magnet 253 and wire 255, to the wire 250. When this warning-recording magnet is de-energized, its record-marking lever 256 springs against the ink ribbon and traces a line on the record-receiving roll as appearing in Figure 13, designated by the notation "warning solenoid 249 de-energized."

Should the engine driver fail to heed the warning signal and permit his locomotive to continue at a sufficiently high speed to approach near the maximum safe speed limit, the monitor stop weight 130 would be swung outward by centrifugal force, thereby opening the circuit of the solenoid 142 which retains the supplemental traveller arm 141 in normal position, the circuit of this solenoid being traceable as follows: from the positive pole of the locomotive battery 153 through the wire 259, solenoid 142 and wire 260 to the contact ring 133, and thence through the monitor stop weight 130, monitor shaft 105, its bearing 134 and the wire 252 back to the negative pole of the battery. When the solenoid 142 is de-energized, the lamp 261 in parallel therewith is extinguished to give a second warning, and the supplemental traveller arm 141 begins its clockwise rotation with the gear 109 so as to open the contacts 144, 145, after the locomotive has proceeded a short distance, for instance 100 feet or thereabouts, beyond the point at which the stop weight was operated.

The opening of the contacts 144, 145 will open the circuit of the stop solenoid 196, which may be traced as follows: from the positive pole of the locomotive battery 153 through the brush 152, monitor shaft 104, gear 107, contact spring 115, gear 109, supplemental traveller arm 141, contacts 144, 145, wire 250, stop solenoid 196, wire 257 and contacts 258 to the negative pole of the battery. The contacts 258 are closed while the stop solenoid 196 is energized, but when the solenoid is de-energized, for instance, when its circuit is opened at the contacts 144, 145, as above noted, its contacts 258 will be opened so that it cannot be re-energized through the foregoing circuit until the wire 257 has been placed in communication with the negative pole of the battery through another circuit path traceable as follows: from the wire 257 through the wire 500, insulated handle 114a of the manual re-setting lever, its upper stop screw 139 and wire 501 to the wire 251, and thence through the contact ring 132 and warning monitor weight 129, shaft 105, bearing 134 and wire 252 to the negative pole of the battery. Obviously, therefore, when the stop solenoid 196 has been de-energized, it cannot be re-energized until the locomotive speed has been reduced to the warning limit which is a definite percentage below the maximum safe limit, and the engine man is at his post to raise the re-setting arm 114a.

The locomotive axle 87 which drives the monitor shafts 104 and 105 will preferably be an axle of the locomotive drivers in order that it shall be least liable to be locked by the brakes while the train continues in motion along the track. If the monitor stop weight 130 should be swung outward by centrifugal force at a time when the traffic conditions do not require such an actuation to safeguard the locomotive and train, for instance, when the locomotive drive wheels spin on the track rails in the effort to start a heavy train, the speed of the axle 87 and the monitor shaft 105 will be reduced so as to re-establish its monitor weights in contact with their respective contact rings and thus re-energize the solenoid 142 and restore the supplemental traveller 141 before its contacts 144, 145 are opened to de-energize the stop solenoid 196. In this event, the warning signal solenoid 249 will be momentarily de-energized while the axle 87 is spinning, thus giving a warning to the engine man to momentarily close his throttle and arrest the sliding of the drive wheels upon the rails.

So long as the stop solenoid 196 is de-energized, the stop-recording magnet 263 will also be de-energized, permitting its record-marking lever 264 to be swung forward by its retractile spring, so as to press the ink ribbon against the record-receiving roll, thus marking on the roll a line indicating the time and duration of the de-energization of the stop solenoid. This control of the stop-recording magnet 263, concurrently with the control of the stop solenoid 196, is accomplished by including the recording magnet in parallel with the stop magnet through the following circuit branch: from one terminal of the solenoid 196 through the wires 250 and 255, recording magnet 263, and wires 262 and 257 to the other terminal of the stop solenoid.

The gear ratio between the axle 87 and the monitor shaft 104 will be such as to bring the contact cam 104ª on this monitor shaft into contact with the brush 154 once for about each 100 feet of the travel of the locomotive. Each time that this contact is established, the speed-recording magnet 265 is energized through the following circuit: from the positive pole of the locomotive battery 153 through the brush 152, monitor shaft 104, contact cam 104ª, brush 154, wire 266 and speed-recording magnet 265 to the negative pole of the battery. Each time this circuit is broken, as the cam leaves the brush 154, the speed-recording lever 267 strikes a horizontal mark on the record-receiving paper, as appearing in Figure 13 where these marks are designated "speed marks."

The traveller arm 112 and the graduating collars 123 and 124 are half re-set or fully re-set to permit the half-headway speed limit or the full-headway speed limit, each time the locomotive passes a home clear and distant caution signal, or a home-and-distant clear signal. Now, having accepted and passed either the home clear or the home-and-distant clear signal indication, it is permissible and safe for the engine man to take his train forward through the ensuing block at any speed within the limit fixed by the monitor, provided the train proceeds without undue delay. However, should the train stop or slow down for a considerable period after accepting and passing either of such indications, particularly when approaching an interlocking point, there will be a possibility that the indication of the next ensuing signal, or the interlocking route may be changed during the delay in advance, may be changed during the delay in the train's movement, wherefore, after such a considerable delay, it would not invariably be safe to take the train through the ensuing block at the full speed limit predetermined by the monitor in accepting and passing the last signals. Therefore, I provide means for automatically releasing the traveller arm 112 to reduce the speed limit determined by the monitor, when the train has been unduly delayed after the traveller arm has been half re-set or fully re-set in passing the signal. After having passed any signal, the locomotive must proceed continuously throughout the ensuing block at a speed exceeding a certain minimum, else, if the speed goes below that minimum, the clutch-releasing monitor weight 148 will fall by gravity out of contact with the contact ring 151, thereby breaking the following circuit: from the positive pole of the locomotive battery 153 through the wire 259, the clutch-releasing magnet 136, wire 268, contact ring 151, clutch-releasing monitor weight 148, and thence upward through the monitor shaft 105 to its bearing 134, and thence through the wire 252 to the negative pole of the battery. When this circuit is opened at the contact ring 151, the clutch magnet 136 is de-energized and drops its armature formed on the outer end of the releasing clutch, thus releasing the clutch and permitting the traveller arm 112 to drop until it is arrested, as heretofore explained, by the half-setting arm 113 bearing against the manual resetting arm 114. Thereby the speed limit is reduced to the value determined by the position of this manual resetting arm, as before explained, and the locomotive cannot thereafter attain a greater speed until it has passed over another ramp rail at a home clear or home-and-distant clear signal, thereby again half-resetting or fully-resetting the monitor traveller arm 112.

Each time that the whistle cord is pulled by means of the lever 270, the whistle-recording magnet 269 is de-energized by the consequent breaking of its normally closed circuit traceable as follows: from the positive pole of the locomotive battery 153 through the lever stop screw 271, lever 270, wire 270ª and recording magnet 269 to the negative pole of the battery. When the magnet is thus de-energized, its whistle-recording lever swings against the ink ribbon and traces a line on the record-receiving roll as long as the whistle is blowing. In Figure 13, Section C, these lines are designated by the notation "Whistle-cord pulled."

The timing-reservoir 193 and the middle chamber 194 of the monitor main-valve casing are normally filled with air at main reservoir pressure, and the balancing reservoir 201 and the bottom chamber 200 of the monitor main-valve casing are normally filled with air at brake pipe pressure. When the stop solenoid 196 is de-energized, as before explained, to drop its core 195 and the valve-pistons 187 and 188 connected therewith, the main reservoir is cut off from the timing reservoir and the valve chamber 194, and the timing reservoir and this valve chamber are opened to the atmosphere, as before explained, by way of the adjustable pin-valve 192, the pipe 189 and the lower end of the relay valve casing which is now open. Since the air from the timing reservoir and valve chamber 194 cannot flow backward through the check valve 197, the pin-valve controls the efflux of air from this reservoir and valve chamber and determines the rate at which the air pressure therein will be gradually diminished.

The upper end of the piston-valve is always subjected to brake pipe pressure, but since the aggregate of the areas of the middle piston and the lower piston exceed the area of the upper piston, and since the air pressure on the lower piston normally equals that on the upper piston, while the air pressure on the middle piston normally exceeds that on the upper piston, it follows that the total upward pressure on the middle and lower pistons must normally exceed the pressure on the upper piston in a degree sufficient to hold the piston valve firmly in its uppermost normal position as indicated. However, as the air is vented from the timing reservoir 193 and the middle chamber 194 of the valve casing, the pressure therein is gradually reduced until the total upward pressure on the valve piston just equals the downward air pressure thereon plus the gravity of the valve. To vent the pressure of the middle chamber 194 down to this point may occupy several seconds after the stop solenoid 196 is de-energized, but this lapse of time will, in any event, be immaterial in the safeguarding function of the apparatus. At this instant, the piston-valve moves downward, shutting off communication between the piston-port 182 and the pipe 181, and closing the port 200 to shut off communication between the brake pipe and the balancing reservoir 201. The lower side of the port 182 reaches the shoulder between the upper and middle chambers of the valve casing, just as the middle piston of the valve engages the light balancing spring 198.

Now, it must be noted that at this instant no air has been vented from the brake pipe, wherefore the pressure on the upper end of the piston-valve is equal to the full brake pipe pressure trapped in the balancing reservoir 201 and exerted on the bottom piston of the valve having an area considerably smaller than its upper piston; and the difference in total forces exerted by these equal air pressures on the different areas of the upper and lower valve ends, is balanced by the reduced air pressure on the lower side of the middle piston. Hence, from this instant on, the efflux of air from the timing reservoir and middle valve chamber must be accompanied by an efflux of air through the port 182, upper end of the middle chamber and port 199, to the atmosphere, at a rate which will maintain a balanced condition and position of the piston-valve. That is to say, as the air spills out of the timing reservoir and middle valve chamber 194, the consequent reduction of pressure therein tends to lower the piston-valve slightly against the light opposition of the balancing spring 198, thus moving the lower side of the port 182 more or less below the registering shoulder so as to spill the air from the brake pipe to the atmosphere sufficiently to reduce the total brake pipe pressure on the upper end of the piston-valve in substantially exact proportion to the reduction of pressure exerted on the middle piston. To better explain this, it may be stated that if the piston-valve were placed in a position leaving the port 182 wide open to the port 199, the air would spill from the brake pipe much faster than would be necessary to balance the diminution of pressure in the middle valve chamber, whereupon the pressure in the middle chamber would immediately preponderate and raise the piston-valve to restrict the area of the vent port to the aforesaid balancing point or point of proportionate efflux. On the other hand, if it be assumed that the piston-valve be raised slightly above this balancing position, it must be noted that the rate of efflux from the brake pipe will be insufficient to compensate the efflux from the timing reservoir and middle chamber 194, whereupon a more rapid fall of pressure in the middle chamber will cause the brake pipe pressure to preponderate and lower the piston-valve to the aforesaid balancing point.

Also it must be noted that the valve will automatically reduce the pressure in the brake pipe at the definite constant rate determined by the fall of pressure in the timing reservoir and middle valve chamber, regardless of the length of train and brake pipe involved. If the locomotive be running without a train or with but one or two cars, a very small opening of the vent port 182 at the shoulder opposite the port 199 will suffice to reduce the pressure in this short brake pipe (necessarily of small capacity) at the definite rate of pressure reduction occurring in the middle chamber 194, and the valve will automatically restrict the area of the vent port 182 to maintain this definite rate of reduction in the brake pipe. On the other hand, if the locomotive be pulling a very long train of freight cars with a consequently long brake pipe of great capacity, it will require a much larger opening of the vent port 182 to reduce the pressure in this greater brake pipe at the same fixed rate proportionate to the fall of pressure in the middle chamber 194, but the valve will automatically adjust itself to accomplish this same rate of reduction in the long brake pipe, inasmuch as any insufficiency of area at the vent port 182 would immediately result in a preponderance of pressure on the upper end of the piston-valve, tending at once to increase the area of the vent port to the aforesaid balancing point.

Also, if the engine driver should make a manual service reduction through the brake-valve 179 by way of the check-valve 185, concurrently with an automatic service application through the vent ports 182, 199 of the monitor valve, this valve would still operate to maintain the aforesaid definite rate of pressure reduction in the brake pipe as determined by the fall of pressure in the middle valve chamber 194 and regardless of the manual service application, since any reduction of brake pipe pressure in excess of this definite rate, whether resulting from the automatic service vent or the manual service vent, or from both together, would immediately cause a preponderance of pressure in the middle chamber 194 tending to raise the piston-valve and restrict the automatic vent 182 to a point effecting the said proportionate rate of reduction. That is to say, when a manual service application concurs with the automatic service application, the monitor valve automatically diminishes the rate of flow through the automatic vent by an amount exactly equal to the supplemental flow through the manually controlled service vent; and this automatic restriction of the automatic vent will continue as the manual vent is increased until the manual vent alone discharges the brake pipe at a rate equal to the aforesaid definite rate of pressure reduction determined by the fall of pressure in the middle chamber 194, after which the automatic vent will remain entirely closed, and after which the rate of pressure reduction in the brake pipe will be increased if the area of the manual vent is further increased.

But in the practice of my invention, however, the aforesaid definite rate of automatic pressure reduction in the brake pipe as determined by the fall of pressure in the timing reservoir 193 and middle chamber of the monitor valve will be nearly the quickest possible service reduction, that is nearly the greatest rate of venting possible without incurring the emergency application of the brakes. This is necessary in order to operate in the smallest braking distance compatible with safety, so that the engine driver may have the greatest latitude in the control of his train and the exercise of his judgment to meet the varied and complex requirements of commercial schedules. But it would be prohibitory to thus automatically open a maximum-rate service vent with the possibility of a concurrent manual service application, if the effects of the two vents were to be cumulative in their discharge of air from the brake pipe, since any substantial manual vent added to an automatic vent of maximum or nearly maximum service rate would incur an unexpected and unwarranted emergency application of the brakes which would be disastrous in many situations, and objectionable always. An automatic application of the brakes at, or nearly at, the maximum service rate is not objectionable, however, in an automatic train-control system such as the one here under consideration, in which such an automatic service application is an abnormal incident occurring only as a result of the engine driver's negligence after due warning of the necessity of a manual application of the brakes.

Not only is the foregoing balancing function of the monitor main valve necessary to apply the brakes at the maximum service rate without danger of incurring an emergency application through concurrent service manipulation of the engineer's valve, but it is also necessary to obtain the maximum service rate of reduction without liability to incurring an emergency application by a variation in the length of brake pipe. For instance, it will be apparent that if the automatic valve were set to open a definite invariable vent port which would discharge a long brake pipe at the maximum service rate, the same fixed vent would reduce the pressure in a short brake pipe at a greater rate which would inevitably incur the emergency application of the brakes.

Those versed in the air brake art are familiar with the new system of air brakes recently developed by the Westinghouse Air Brake Company to accomplish a substantially uniform pressure reduction and uniform brake application in exceedingly long freight trains, and which accomplishes this result by automatically opening a supplemental vent from the brake pipe at each triple valve throughout the train, in response to an initial service reduction at the engineer's valve. Obviously, to effect a full service reduction at the maximum service rate in a brake pipe of given length equipped with such triple valves, will require a smaller service vent at the locomotive end of the brake pipe, than would be required to accomplish an equivalent reduction in a brake pipe of the same length equipped with the older style triple valves not operating to open individual supplemental vents; but it will be understood that the balancing action of the monitor main valve automatically adapts the automatic service vent to effect the required full service reduction at maximum service rate in a brake pipe equipped with the new style triples, by automatically restricting the vent controlled by the balancing valve so as to compensate for the supplemental vents opened at successive points throughout the brake pipe, practically in the same manner as the before explained compensation for a manual service vent concurrent with the automatic application of the brakes.

It will now be apparent that the balancing monitor valve automatically governs the automatic service vent to effect the maximum service rate of braking regardless of all extraneous incidents and conditions of service.

Although at the present writing I deem it most expedient to apply the brakes at the maximum service rate when the stop speed limit is exceeded, it must be noted that the adjustable pin-valve or timing valve 192 may be set to effect any rate of pressure-reduction in the brake-pipe other than the maximum service rate, and that any other rate thus determined will be constantly effected regardless of extraneous incidents and conditions of service.

The efflux of air from the timing reservoir 193 and middle chamber or timing-chamber 194 of the monitor main valve continues until the pressure therein is reduced to atmospheric value, the monitor valve meanwhile maintaining its above explained balancing position and the proportionate rate of brake-pipe discharge resulting from its balancing action. After the pressure in the timing-chamber 194 has reached the atmospheric value, any further slight discharge of air from the brake pipe through the ports 182, 199 would immediately reduce the pressure on the upper end of the monitor valve in a slight degree sufficient to cause a preponderance of upward thrust from the light balancing spring 198 and the air trapped in the balancing reservoir 201 and lower chamber of the valve at initial or normal brake pipe pressure. This preponderance of upward thrust raises the piston-valve just far enough to close its automatic vent port, and since the pressure exerted by the balancing spring will always be very light, it follows that while the piston-valve is thus balanced with its vent port 182 just above the shoulder leading to the port 199, the pressure in the upper chamber of the valve casing, which is the terminal brake-pipe pressure, must bear a definite ratio to the initial brake-pipe pressure trapped in the balancing-reservoir, which ratio must be the inverse of the ratio of areas of the opposite ends of the valve. That is to say, if the area of the bottom piston is, for instance, three-fourths the area of the upper piston, the terminal pressure or ultimate pressure in the brake pipe after the automatic service reduction must always be three-fourths of its initial or normal pressure trapped in the balancing-reservoir 201, regardless of what that initial pressure may be. The constant percentage of pressure reduction thus effected, will be that which is necessary for a full or maximum service application of the brakes, so that the balancing monitor valve will always effect the full service application of the brakes without any waste of brake pipe air beyond the pressure reduction necessary to effect this result.

The escape of air from the timing-reservoir 193 and timing-chamber 194 will, of course, be less rapid as the pressure therein approaches atmospheric value, so that the rate of pressure reduction therein will be relatively slow during the last moments of the efflux; and, since the balancing action of the valve makes the rate of reduction in the brake pipe always substantially proportionate to the reduction rate in the timing-reservoir and timing-chamber, it is apparent that the rate of pressure reduction in the brake pipe will descrease toward the end of the discharge, or, in other words, will be tapered off gradually as the vent through the ports 182, 199 is gradually closed. This gradual cutting off of the automatic service vent prevents the "kick-off" of the brakes at the front end of the train which is frequently incurred by a too-sudden closing of a large service vent, owing to a rise in the pressure at the head end of the brake pipe due to the momentum of its air flowing forward toward the vent.

It has already been noted that a manual service application of the brakes at the engineer's valve 179, concurrently with the automatic service application, will not affect the definite rate of service application determined by the monitor valve, and will not incur liability to an accidental emergency application. It must, however, be noted that the arrangement in no wise prevents the engine man from making a voluntary emergency application at the engineer's valve, since the air will rush freely from the brake pipe through the check valve 185 and emergency port of the engineer's valve 179, and the automatic closing of the vent port 182 by the balancing action of the monitor valve only serves to compensate the flow of air through the engineer's valve up to the full service rate, after which any greater rate of discharge at the engineer's valve will be cumulative and fully effective on the brake pipe pressure.

After an automatic full service application of the brakes following the de-energization of the stop solenoid 196, the engine driver may raise the manual re-setting handle 114$^a$ against its front stop 139, and, as before explained, the stop solenoid will then be re-energized as soon as the locomotive has been slowed down below the warning limit to permit the warning monitor weight 129 to resume contact with its ring 132. Or, the brakes having been thus automatically set, he may wait until his warning signal 249$^a$ is cleared, indicating that the warning weight has resumed its normal position, and may then grasp the re-setting handle and immediately re-energize the stop solenoid. When the stop solenoid is re-enengized, it restores the valve-pistons 187 and 188 to their normal positions as indicated, thus re-establishing communication between the main reservoir and the pipe 189 and permitting a rapid flow of main reservoir air through the check valve 197 into the timing-reservoir 193 and middle chamber or timing-chamber 194 of the monitor main valve, thus quickly restoring the valve to its normal position as shown, and replacing the port 182 in register with the pipe 181 to permit the flow of brake-releasing and charging air from the engineer's valve 179 through the pipe 181, port 182, and pipe 184 to the brake pipe. Hence, the brakes can only be released when the engine driver is at his post and the locomotive has been slowed down below the warning limit, which, as before noted, is a definite percentage below the maximum safe speed limit as determined by the stopping distance or clear headway.

It will now be apparent, that each time the brakes are automatically applied by de-energization of the stop solenoid 196, the venting of the pipe 189 to the atmosphere releases the pressure in the lower end of the throttling cylinder 191, so as to cut off communication from the steam boiler to the manually controlled throttle 202, and thus discontinue the application of power in the locomotive cylinders. Each time that the stop solenoid is re-energized, the throttling cylinder is re-connected with the main reservoir which thereupon re-charges the throttling cylinder and raises its piston-valve to re-establish power communication from the steam boiler to the locomotive cylinders.

The arcuate slot 119$^b$ in the brake-factor adjusting or limit-adjusting lever 119, will preferably be described about the lower pivotal center of the thrust link 20, that is, the axis of the cam roller 116, when the cam roller is in its low position effecting the zero speed limit, that is to say, effecting such an expansion of the graduating spring 125 as will just balance the gravity moment of the monitor weights. Hence, with the traveller 112 in the position of zero speed limit, this limit will not be altered by any adjustment of the transfer pin in the slot 119$^b$, and the traveller will always have the same zero speed-limit position with any adjustment of the thrust link in the slot. But it will be apparent that the angular displacement of the lever 119 and the upward travel of its forked end and the graduating collars 123, 124 will be greatly increased as the thrust link 20 is moved nearer the fixed pivot of the limit-adjusting lever, so that, with a given re-setting or rise of the traveller 112, the graduating collars will be raised more or less according to the adjustment of the thrust link in the adjusting lever, thereby effecting a higher or lower speed limit when the traveller arm 112 occupies any position above its zero-limit position. But whatever may be the maximum speed limit effected by any adjustment of the transfer pin in the lever slot, it must be noted that with any such adjustment, the traveller arm will move downward through the same angle, (and hence the locomotive will travel the same distance) in gradually reducing said maximum limit to the zero limit. For instance, the parabolic speed-limit curve 272 in section A of Figure 12, plotted on the base line I with ordinates indicating the speed limit at various points of travel along the track, may be taken to represent the speed limit imposed by any adjustment of the thrust link in the adjusting lever, the maximum ordinate or peak of the curve being taken as the maximum speed limit imposed by such adjustment, and all other ordinates being proportionate thereto with the parabolic decrement as they approach the ultimate stopping point or zero speed limit. It must be understood that, with every speed-limit adjustment thus effected, the speed limit will be proportionate to the square root of the distance back from the stopping point.

The maximum safe speed limit for a given braking distance is not the same for all different trains, equipments and conditions, because the braking factor or deceleration is quite different for different equipments and under different conditions. For instance, with signalling blocks or braking distances of a given length, it is not safe to run a free locomotive as fast as a locomotive pulling a long train of cars, because the braking power employed on a locomotive is much less in proportion to its mass than the braking power applied on the cars of a train. Various other conditions which need not be here enumerated, affect the braking factor or deceleration rate, and the object of the braking-factor adjustment just described is to adapt the monitor to the different braking factors thus incurred.

It may be noted that the continuous rotation of the monitor weights, the traveller gears 107 and 109, and their travellers, at a rate proportionate to the travel of the locomotive, would be essential to the safeguarding function of the apparatus if means were not provided to safeguard the locomotive in the event of any failure in the transmission from the locomotive axle to these weights, gears and travellers. This is because a failure in the rotation of the monitor weights might fail to open their respective contacts when the traffic conditions would require them to be opened for the safety of the locomotive and train, and a failure of due movement of the graduating collars 123, 124 or the supplemental traveller arm 141, might fail to reduce the speed limits determined by the centrifugal force of the monitor weights, or might fail to open the contacts 144, 145 when traffic conditions would require the same to be done for considerations of safety. It is to insure against this contingency that I employ two traveller gears 107 and 109 driven by two monitor shafts 104 and 105, in lieu of having the wheels 107 and 109 permanently locked together and driven by the single monitor shaft 105. The employment of the duplex transmission system makes it certain that, should either transmission fail, its corresponding worm wheel 107 or 109 would cease rotating while the other worm wheel would continue, thus breaking the contact between the flat contact spring 115 and the contact boss raised on the gear 109, and thereby opening the circuit leading from the positive pole of the battery through the brush 152, monitor shaft 104, gear 107, contact spring 115, gear 109, supplemental traveller 141, contacts 144, 145, and thence through the wire 250 and the signal and stop solenoids 249 and 196 respectively, and thence through circuit paths already traced, back to the negative pole of the battery. Hence, obviously, any failure of mechanical transmission which would otherwise be dangerous, is rendered safe by incurring a warning signal and an automatic service application of the brakes.

It must be noted that all other safeguarding functions of the monitor and air-brake apparatus shown in Figure 1, also operate on the safe failure principle. For instance, if the contact shoe should fail to make effective contact with the ramp rail, or should the stationary battery 221 become exhausted, or should its circuit leading through the ramp rail and contact shoe to the locomotive relay 222 be in any wise broken or disordered, the worst result which could be incurred would be the mere failure to energize this relay and re-set the monitor, so that the engine man might be called upon to decelerate his train when the traffic conditions would not require him to do so for considerations of safety. Also, any weakening of the graduating spring would be a safe failure for reasons already pointed out in connection with the monitor of Figure 17; and a breakage in the thrust link 20, limit-adjusting lever 119, or elsewhere in the system of transmission from the traveller cam to the monitor weights, would simply cause these weights to fly out and give the usual warning signal and automatically apply the service brakes. Also, if either of the weights should break loose from the monitor shaft, the failure would be a safe failure, inasmuch as the signal and stop-controlling contacts would be broken.

In the practice of my invention, the warning signal 249$^a$ will preferably be located some distance in front of the engine driver or motor man and directly in the line of view of the track in advance, for instance, in the case of a locomotive, it may well be located at the head end of the boiler on the engine driver's side, so that his attention may not be diverted from the track in order to observe the signal. Indeed, with this disposition of the signal, he could not look toward the track without observing any movement or change in the signal indication. The signal will preferably not include a signal light for night indications, after the manner of the ordinary track signals, but will preferably present the same aspect by day and night, to this end being at night sufficiently illuminated by a lamp placed at some point in rear of the signal.

The speed curves represented in Figure 12 above the railway track, relate to the movement of a locomotive equipped with, and controlled by, the train-controlling apparatus such as represented in Figures 1 to 11, inclusive.

$a$, $b$ and $c$ are signalling stations equipped with home-and-distant signalling apparatus and ramp rails connected with local batteries in local circuits controlled by the home and distant semaphores, as before explained, so as to energize the contact shoe of a passing locomotive with positive or negative polarity according as the signals present the home clear or the home-and-distant clear indications. In these graphic speed diagrams, a parabolic curve originates over each ramp rail and thence tapers to a minimum or zero value some distance ahead of the ramp rail, thus indicating the variable speed limit and the headway pre-determined by the train-controlling apparatus as its shoe wipes over the ramp rail. It will be noted that a short flat speed-limit line occurs at the origin of each curve above the ramp rail and is co-extensive with the ramp rail. When the contact shoe engages the ramp rail, the monitor traveller is half-reset or fully-reset, as the case may be, and this setting is necessarily maintained without any downward feeding action so long as the shoe remains in contact with the ramp rail to maintain energization of the setting solenoid, which prevents the traveller from beginning its downward limit-reducing movement until after the shoe has left the ramp rail.

Assume a locomotive to be approaching the signals $a$ at a uniform speed indicated by the flat speed line 274, and suppose the monitor received a full-headway reset at the signal post in rear of $a$, this re-set having been dependent on a clear condition of the track up to $b$, and having pre-determined the variable speed limit 273 reaching its zero value just in rear of the signals $b$. Now the curve 273$^a$ represents the variable speed-limit at which the locomotive may run without swinging the warning weight out of normal position to produce the warning signal, and may, for convenience, be designated as a warning-limit curve. If the home and distant signals at $a$ are both clear, the monitor will be re-set in wiping over the ramp rail at $a$ so as to raise the stop limit from 273 to 272, simultaneously raising the warning limit from 273$^a$ to 272$^a$. A reference to the diagram will show that this re-set or increase in the speed limit occurs before the train in its uniform speed 274 has crossed the warning-limit curve 273$^a$, that is to say, before the engine man receives any warning to apply the brakes. As soon as this re-set occurs, the locomotive is subject only to the warning and stop limits 272$^a$ and 272, so that it may now continue at its uniform speed without incurring a warning signal or an automatic application of the brakes. Arriving at the signals $b$, showing home-and-distant clear, the monitor is again re-set for the warning and stop limits 276$^a$ and 276, so that the limits are again increased before the uniform speed line 274 of the train crosses the warning curve 272$^a$. Thus the locomotive could continue at uniform speed past any number of successive clear signals disposed at the termini of successive equal blocks such as $a$—$b$ and $b$—$c$.

Now, let us assume that the locomotive passes the post $a$ with only its home signal in clear position, and its distant signal at caution. Now, only the half-set solenoid will be energized as the contact shoe wipes over the ramp rail, and will be raised to an elevation which would raise the traveller arm 112 to the stop limit 273$^b$, if the traveller arm were not already slightly above this elevation in the course of its gradual declination along the limit curve 273. Now it will be seen that the uniform locomotive speed 274 crosses the warning-limit curve 273$^a$ just as the locomotive is about to pass the signal $a$, thus indicating that the locomotive is approaching the stop limit, (i. e., the point where its speed will cross the stop-limit curve 273,) and apprising the engine man that the service brakes should be applied. Let us suppose that the engine driver neglects the warning signal and continues at uniform speed, as indicated, until the limit curve 273 is crossed. Thereupon the stop solenoid is deenergized, full service brakes are automatically applied at the maximum service rate, and the locomotive is decelerated as indicated by the deceleration curve 277, being stopped just in rear of the rear end of the block $b$—$c$. If the locomotive were proceeding at the lower uniform speed 278, it could proceed much further into the block $a$—$b$ before crossing the warning and stop curves as indicated, after which the locomotive would be decelerated as shown by the deceleration curve 278$^a$ also coming to a full stop a short distance in rear of the block $b$—$c$. Likewise if the locomotive were proceeding at a still lower speed, such as 279, it could run still further into the block $a$—$b$ before crossing the warning and stop curves 273 and 273$^a$, after which it would likewise be decelerated along the curve 279$^a$, also stopping just in rear of the block $b$—$c$.

Now again assume that the locomotive running at the speed 274 passes home-and-distant clear signals at $a$ but approaches home-clear and distant-caution signals at $b$. The engine driver then receives a warning as his speed line crosses the warning-limit curve 272$^a$ apprising him that he is approaching the point where his speed would cross or exceed the stop-limit curve 272. In this instance let it be assumed that the engine driver duly heeds the warning signal and immediately applies the service brakes. His locomotive and train may thus be decelerated, as indicated by the deceleration curve 280, until the locomotive speed again crosses below the warning-limit curve 272$^a$ as shown at 280$^a$, whereupon his warning signal will again clear, indicating that he may now release or partially release the brakes and drift ahead until he again crosses above the warning limit as at 280$^b$, whereupon his signal will again indicate that he should again apply the brakes and slow down to again cross below the warning curve as indicated.

He may now stop in rear of the signals $a$ and wait for the home signal to clear in order to re-set his monitor to the half-headway stop limit 276$^b$, or he may wait for both home and distant signals in order to re-set the monitor to the full-headway limit curve 281; or, as indicated at 280ᶜ, he may proceed over the ramp rail at c without waiting for either signal to clear, and may continue through the block c—d subject to the flat stop and warning limits 243 and 243ª maintained by manipulation of the manual re-setting lever 114 or the hold-out lever 120 as before explained. Now in proceeding subject to the warning and stop limits 243ª and 243, his signal will call for brakes each time that his speed line crosses above the warning flat limit, and will again clear each time his speed line again goes below this warning limit.

Owing to the arrangement of the co-ordinate warning-limit and stop-limit parabolic curves with a common terminus, the distance which a locomotive will travel at a given uniform speed from the point of crossing the warning curve to the point of crossing the stop curve, will be proportionate to the square of that speed, wherefore the time lapse between such warning and stop points will be directly proportionate to the said speed. Hence, when driving his locomotive at top speed, the engine man will receive an earlier warning of his approach to the stop limit than when he is running at a lower speed. Up to the present writing I have deemed this arrangement most expedient and compatible with standard requirements.

Although the warning and stop limit curves would permit a locomotive and train to proceed from a home-and-distant clear signal at a speed considerably exceeding the safe limit for passing a home-clear signal, it would ordinarily be impossible or impracticable to accelerate a train, after passing a home-and-distant clear signal, quickly enough to take advantage of this greater speed limit which, as the curves indicate, must be immediately tapered down in the approach to the next signal whether the next signal be home-clear or home-and-distant clear, since the home-and-distant clear indication is not effective on the monitor to raise the speed limits until the locomotive reaches the ramp rail at the signal. In the practice of my invention, the safe speed limit for passing a home-clear signal, i. e., the speed limit determined by the declination of the parabolic curves through one block after the full-headway re-set, will be that speed which, under the present régime, is considered the safe maximum running speed of the railway train over the particular railroad under consideration. Hence, the adaption of my system will impose no arbitrary or artificial limitations upon standard schedules. In the case of a locomotive running free, however, the same may be quickly accelerated up to the maximum safe limit immediately after passing a home-and-distant clear signal, and thence the speed may be tapered down as required by the warning signal in the approach to the next signal post, thereby substantially increasing the mean velocity of the locomotive over the track. Since the safe limit for the free locomotive with a given braking distance is considerably less than the safe speed for a train, as before pointed out, this circumstance will be of substantial advantage in getting a free locomotive quickly over the line.

It will be noted that the block c—d is considerably longer than the blocks a—b and b—c. This may be taken to represent a down grade block which has been made longer to afford the greater braking distance necessary for a given speed on a down grade. Here the actual deceleration curve 274ª from full speed 274 to full stop, may be much longer than the parabolic limit curves of the monitor from the speed 274 to the full stop. In this instance, if the locomotive passes the warning-limit curve 276ª at the speed 274, it may be impossible for the engine man to decelerate his train within the stop-limit curve 276. But it must be noted that this digression from the normal action of the apparatus is a safe digression. Even assuming that the engine man neglects the warning given in crossing the limit curve 276ª and proceeds at the full speed 274 until he crosses the stop-limit curve 276, thus automatically applying the brakes, it will be noted that the extra length of the block c—d provides for the over-run of the deceleration curve 274ª beyond the stop-limit curve, without passing the next signal post d. If the post c presents the home-and-distant clear indication, the monitor will be re-set to the stop limit 281 which, however, owing to the extra length of the block c—d, will not afford running headway throughout this block and the ensuing block d—f. The stop-limit curve 281 will require an approach to the signals d somewhat slower than the safe speed of approach toward the unoccupied full-length block d—f, but as soon as the train reaches the signals d, the monitor will be re-set to the half-headway stop curve 282 or the full-headway stop curve 283, according as the signals d are home clear or home-and-distant clear.

f—h represents a block which is made of extraordinary length for any reason other than the provision of an extra braking distance for down grade, as explained with respect to the block c—d. Hence, the air brakes are capable of effecting the regular deceleration of a train moving on the block f—h, and it is therefore desirable to set the monitor of an approaching train for a half-headway speed-limit terminating substantially at the end of this block when the same is unoccupied. Also since the block h—i is of normal length, it is desirable to set the monitor for a stop limit in the block

*f—h* which will permit a train to approach the signals *h* at the maximum safe speed for one-block braking distance when the block *h—i* is clear. However, owing to the excess length of the block *f—h*, the full-headway stop curve 283 initiated by re-setting the monitor traveller in passing over the ramp rail at *d*, terminates at a point considerably in rear of the signals *h*. Likewise, the stop curve determined by a half-headway reset at the signals *f*, coinciding with the curve 283, declines to the full-stop or zero limit at the same point in rear of the signals *h*. Also, owing to the unusual length of the block *f—h*, the full-headway stop curve 284, originating at the signals *f*, does not afford headway throughout the two blocks in advance of *f* but terminates only a short distance in advance of the signals *h*. Hence, providing only the ramp rails at *d* and *f*, the train would be unnecessarily slowed down in the block *f—h* under the stop limit 283 or under the stop limit 284.

To give the approaching train headway entirely through the block *f—h* when the same is clear, I provide a section joint in the block *d—f* at *e*, a distance in rear of *h* equal to two normal blocks, and provide here a ramp rail adapted to energize the contact shoe with negative polarity to accomplish the full-headway re-set of the traveller arm when the section *e—f* and the block *f—h* are both clear. To this end the circuit which energizes the ramp rail is controlled by the track relay 290 at the rear end of the section *e—f*, and also by the home signal at *f*, the circuit being traceable as follows: from the positive pole of the stationary battery 285 through the contacts of the track relay 286 which can only be energized when the block *f—h* is clear, and thence through the contacts 287 closed by clear position of the home signal at *f*, and thence through the wire 288, contacts 289 controlled by the track relay 290, thence to the lower track rail and the locomotive wheel and through the locomotive relay to the contact shoe and thence to the ramp rail at *e* and thence through the wire 291 back to the negative pole of the battery 285. Hence, when a train is passing through the block *d—f* under the stop limit 283, it acquires a new speed limit under the stop curve 292 for which the traveller is set by the ramp rail at *e*, this stop curve 292 declining to the advance end of the block *f—h*. Likewise in the block *f—h* at *g* distant two normal block lengths from *i*, another section joint is provided with another ramp rail which will be energized with either positive or negative polarity to provide a half-headway re-set extending coincident with the stop curve 292 from *g* to *h* (equivalent to one normal block length), or to provide a full-headway re-set initiating the stop curve 293 declining to the zero limit at the signal *i*. The ramp at *g* will be energized whenever the contacts 294 are closed by the track relay 295 of the section *g—h*, and the polarity of the ramp rail will be determined by a pole-changer moved by the home signal at *h*, the circuit for the full-headway re-set with this home signal clear, being traceable as follows: from the positive pole of the stationary battery at *h* through contacts 296 of the pole-changer controlled by the home signal, and thence through the wires 297 and 298, and thence through the track relay contacts 294 and a connecting wire to the lower track rail, and thence through the locomotive wheel, locomotive relay, contact shoe, ramp rail at *g*, wires 299 and 300, contacts 301 of the same pole-changer, and thence through connecting wires back to the negative pole of the battery. The wires 297 and 300 may be utilized to control the distant signal at *f* through a polarized relay 302 which will close its contacts 303 to complete the local circuit of the distant signal at *f* only when the relay 302 is energized with current of that polarity effected by the pole-changer 296, 301 when the home signal at *h* is in clear position.

The stop curve obtained from the half-headway re-set by the ramp rail at *h* coincides with the full-headway stop curve 293 originating at the ramp rail at *g*. The full-headway re-set from the ramp rail at *h* initiates the stop curve 304 giving headway to the signals at *j*. The stop curve of the half-headway re-set at *i* extends through the block *i—j* and coincides with the stop curve 304 of the full-headway re-set at *h*.

The blocks from *j* to *r* are short blocks which may be adopted on some parts of a railway, for instance, in the approach to a large terminal where traffic is exceedingly congested; and I have shown different methods of adapting my invention to such a condition.

Since the blocks *j—k* and *k—l* aggregate about one normal block length, the distance from *i* to *l* will be about two block lengths, wherefore I make the negative energization of the ramp rail at *i* dependent on clear condition of the distant signal at *j* to give the full-headway re-set at *i*. This is accomplished by leading current for the ramp rail at *i* from the stationary battery 305 at *j* through the pole-changer controlled by the distant signal at *j* and thence through the wires 306 and 307 respectively to the ramp rail and lower track rail at *i*, by way of contacts controlled respectively by the home signal at *i* and the track relay of the block *i—j*, all as clearly indicated in the drawing. Also, the ramp rail at *j* is energized only by a positive current to give only the half-headway re-set from *j* to a point just in rear of *l*, only when the distant signal at *j* is clear, indicating a clear condition of the track from $j$ to $l$. This is accomplished by including the contacts 308, governed by the distant signal at $j$, in the local circuit of the battery 305 which energizes the ramp rail at $j$, there being no pole-changer whatever in this local circuit. The ramp rails at $k$, $l$ and $m$ are likewise energized only by positive current and only when the distant signals at these points are clear, so that these ramp rails can give only the half-headway re-set to the monitor traveller. Hence, in running from $j$ to $n$, the train must proceed at a speed lower than the regular safe limit for full length blocks, this being entirely in accordance with standard practice.

Beginning at $n$, however, I have shown a different track equipment adapted to permit any speed compatible with the actual clear headway, regardless of the lengths of blocks. If the blocks $n$—$o$ and $o$—$p$ are both clear, the ramp rail at $n$ will be energized, but the polarity of this energization will be determined by a pole-changer controlled by the distant signal at $p$, so that in passing the signals at $n$, the locomotive monitor will receive a half-headway re-set or a full-headway re-set according as the track is clear from $n$ to $p$ or from $n$ to $r$. The circuit for the ramp rail at $n$ is traceable as follows: from both poles of the stationary battery 309 at $p$ through the fixed pole-changer contacts to respective contact fingers of the pole-changer controlled by the distant signal at $p$ (the polarity thus developed in the contact fingers being determined by the position of this signal, as indicated), and from the upper contact finger through the wires 310 and 311 to the ramp rail at $n$, and thence through the locomotive contact shoe, locomotive relay, locomotive wheel, lower track rail and connecting wire to the contacts controlled by the track relay of the block $n$—$o$, and thence through the contacts controlled by the home signal at $n$ and through the wire 312, contacts controlled by the home signal at $o$, and thence through a connecting wire to the lower contact finger of the pole-changer at $p$. The wires 311 and 312 may be utilized to control the distant signal at $n$ by a neutral relay connected between the wire 311 and the contact finger of the track relay at $n$, since, from the foregoing circuit it will be apparent that the wires 311 and 312 must be energized by one polarity or the other so long as the home signal at $o$ is clear.

The ramp rails at $o$ and $p$ are controlled by similar circuits, each governed by the semaphores at the first and second stations in advance, with this difference respecting the control of the ramp rail at $p$, to wit, the pole-changer at $r$ which reverses the circuit of this ramp rail is governed by the home signal at $r$ instead of the distant signal, since the home signal at $r$ represents a full length clear block equivalent to the clearance represented by the distant signal at $p$ in its control of the pole-changer governing the afore-traced circuit of the ramp rail at $n$.

The ramp rail at $q$ is energized only with positive polarity and only when the home signals at $q$ and $r$ are both cleared. The block $r$—$s$ is a block of normal length, and since the distance $q$—$s$ must therefore be less than two normal blocks, it would be prohibitory to energize the ramp rail at $q$ with negative polarity to give a full-headway re-set conditional only upon a clear distant signal at $r$. When the home signal at $r$ is clear, the ramp rail at $q$ is energized through the following circuit: from the positive pole of the battery 313 through the contacts 314 controlled by the home signal at $r$, thence through the wire 315, contacts 316, controlled by the home signal at $q$, contacts of the track relay at $q$, connecting wire, ramp rail at $q$, locomotive shoe, locomotive relay, locomotive wheel, track rail and wires 317 and 311 to the upper contact finger of the pole-changer controlled by the home signal at $r$, and thence through the lower fixed contact co-operating with this finger to the negative pole of the battery. The ramp rail at $r$ is energized in the ordinary manner with positive or negative polarity to give the half-headway or full-headway re-set, according as the signals at $r$ represent one or two blocks clear.

The ramp rails at $s$, $t$ and $u$ are also energized in the same manner with positive or negative polarity to give the half-headway or full-headway re-set according as the signals at these points represent one or two blocks clear. The blocks $s$—$t$ and $t$—$u$ are normal length blocks. The block $u$—$w$ is slightly greater than normal length, with a siding at $v$. The conductive continuity of the main track rails are interrupted at $v$ by insulating joints normally spanned or shunted over by the contacts 318, 319 controlled by the movement of the switch-locking shaft 320 which locks the siding switch at $v$ in closed position.

Figure 8:
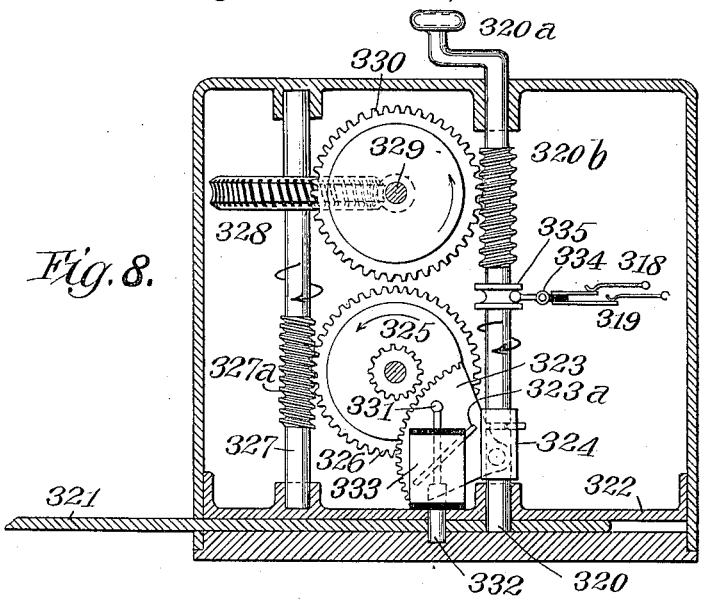
Figure 8 is an enlarged detailed view of the switch locking means represented in Section E of Figure 12.

The details of the switch-locking apparatus at $v$ are shown in Figure 8. The siding switch is operated by an ordinary switch lever connected by a link with the switch-locking bar 321. The switch-locking bar slides between the bottom of the casing containing the switch-locking mechanism and a cross yoke 322 mounted in the casing. The locking shaft 320 is mounted to turn and vertically slide in a journal lug projecting upward from the cross yoke and a journal lug in the upper side of the casing, the bottom of the shaft entering a hole in the switch-locking bar 321 in register with the hole in the shaft's lower bearing lug, whereby the switch-locking bar is normally locked in the position shown, which locks the siding switch in closed position. The shaft 320 may be raised by the handle 320ª at its upper end, until the upper shoulder of its worm 320ᵇ engages the shaft's upper bearing lug. Thus the lower end of the shaft is lifted out of the locking hole in the bar 321. A gear sector 323 is mounted on a stud projecting from the rear side of a collar 324 in which the shaft 320 turns freely, the collar being longitudinally secured on the shaft by a pin entering a circumferential groove in the shaft as indicated. The lower corner of the sector normally rests on the cross yoke 322, the sector gear teeth being normally clear of the pinion 325 mounted on a horizontal shaft and fixedly connected with the worm gear 326 meshing with the worm 327ª formed on the vertical shaft 327, at its upper end carrying the worm wheel 328 meshing with a worm fixed on the shaft 329 and turning with the worm wheel 330 which is driven by the worm 320ᵇ.

When the locking shaft 320 is raised clear of the locking bar 321, its sector 323 comes into mesh with the pinion 325. Now a rotary motion imparted to the shaft 320 in the direction of its arrow by means of the crank 320ª, will drive the worm wheel 330 as indicated, thus turning the worm which impels the worm wheel 328 to rotate the worm 327ª and revolve the worm wheel 326 and pinion 325 in the indicated direction, thereby gradually raising the sector 323 until the rib 323ª projecting from its face engages the lower side of a pin 331 projecting rearward from the upper end of a vertical stem inserted in the top of the vertical solenoid core 332 disposed centrally in the solenoid 333 vertically mounted on the cross yoke. The core 332 normally intersects the cross yoke 322 and switch locking bar 321 and enters a locking hole in the bottom of the casing, thereby normally acting with the locking shaft 320 to lock the switch bar 321 in its switch-closing position. Obviously, after the sector rib 323ª engages the pin 331, a sufficient further upward rotation of the sector will raise the pin and lift the core 332 out of locking engagement with the bar 321.

The gear ratio between the crank and the sector will be so designed that the sector cannot be thus raised to withdraw the locking core 332 in less time than a definite minimum allowance which will insure that any locomotive having obtained a monitor re-set giving headway over the main track up to or beyond the siding, must necessarily pass the siding before the expiration of said minimum switch-unlocking time, or else, if the locomotive consumes a longer time in reaching said siding after having obtained said monitor headway, its speed necessarily must have been reduced below the definite critical minimum limit at which the clutch-releasing monitor weight 148 breaks the circuit of the traveller-releasing clutch 135, so that if the locomotive does not pass the siding before the siding can be unlocked and opened, the locomotive will have lost its monitor headway and will necessarily be approaching "under control," that is to say, within the low flat speed limit determined by the setting or manipulation of the manual re-setting arm 114.

A circuit-breaking lever is mounted on a pivot 334 and has a rounded end entering in the groove of a collar 335 on the switch-locking shaft 320. When the shaft is raised to engage its sector with the pinion 325, the grooved collar raises the rounded end of the lever, thus depressing its insulated contact fingers and breaking the contacts 318, 319, whereby the track circuit of the block $u$—$w$ is broken so as to de-energize its track relay 336 and move both signals at $u$ and the home signal at $t$ to danger positions. Hence any approaching train which did not reach the ramp rail at $t$ before the train man at $v$ raised the handle 320ª to open the siding switch, has not received and cannot receive a monitor re-set at $t$ giving headway up to the siding, and will approach the signals $u$ under control of the stop limit 337 derived at $s$ or $t$; and any train which has derived a full-headway or half-headway re-set at $t$ or at $u$ can only fail to cover the limited distance $t$—$v$ or the shorter distance $u$—$v$ before the siding is opened, by reducing its speed to the critical minimum limit which will release the traveller and relinquish the monitor headway derived at $t$ or at $u$, thus compelling the train to approach the siding $v$ under control.

It must now be apparent that the means for un-setting or releasing the monitor traveller, and the slow-releasing switch lock, co-ordinately afford absolute protection for outlying sidings or other switches, equivalent in safety to what is known as "approach locking," but without the disadvantage of being unable to shift an approach-locked switch while a train is standing on the track within the switch-locking zone.

It will be noted that, given an assurance that no train approaching the siding $v$ has reached the signals $t$ to derive a monitor headway into the block $u$—$w$, it would be perfectly safe to open the siding switch at $v$ immediately without the delay incurred by the slow-release locking means. This assurance is afforded by showing that the blocks $s$—$t$, $t$—$u$, and $u$—$w$ are clear, which is done by the indicator 338 cleared by current in the following circuit: from the battery 339 at $s$ through the contacts 340 closed by clear position of the home signal at $s$, thence through the wire 341, contacts 342 closed by clear position of the home signal at *t*, wire 343, contacts 344 closed by clear position of the home signal at *u*, wire 345, indicator 338, unlocking solenoid 333 and wire 346 back to the battery 339. When the foregoing circuit is energized, the unlocking solenoid 333 raises its core 332 out of locking position, thereby permitting the switch-locking bar 321 to be unlocked immediately by raising the locking shaft 320 and without the necessity of rotating the crank in order to raise the sector. Hence, when the unlocking solenoid is employed, no time need be lost in unlocking and opening the siding switch when the track in rear thereof is clear for a safe distance.

The foregoing safeguarding action of the traveller-releasing clutch is graphically shown in Section E of Figure 12. Here it is assumed that, when one train crew is about to unlock the siding switch at *v*, another train is approaching the signals *t* at a low speed indicated by the curve 347. This train may be voluntarily running at slow speed under a full headway speed limit 337 derived at *s*. Passing *t* just before the locking shaft 320 is raised by one of the advance train crew, the rear train may derive a re-set indicated by the stop speed-limit curve 348, which would ordinarily carry the rear train to *v*. Instead of proceeding at considerable speed, however, the rear train further slows down until it passes below the critical traveller-clutch releasing speed 349 when the train reaches *t'*, thereby instantly relinquishing the monitor headway and reducing the speed limit 348 to zero, or to the low flat limit determined by the manual re-setting arm. Now the train will either be stopped as indicated just in advance of *t'* by an automatic service application, or it may proceed "under control" as indicated, subject to the low flat warning-limit 350 and stop-limit 351. If the rear train had passed the signals at *u* and there derived the half-headway speed limit 348 or the full-headway speed limit 352 just before the raising of the locking shaft 320 by the advance crew, and if the rear train had then slowed down to the clutch-releasing limit 349 before passing the siding, it likewise would have relinquished its monitor headway and become subject to the flat low limits as occurred at *t'*.

After the switch-locking shaft 320 has once been raised to initiate the slow unlocking operation, the contacts 318, 319 which have been opened to throw the signals *u* to stop positions, can only be re-closed to again clear these signals, by dropping the shaft 320 again into the registering locking hole in the bar 321 with the siding switch in closed position, at the same time disengaging the gear sector from the pinion so that the sector will drop to its lower limit to again require the full minimum unlocking time before the siding switch can be opened.

Section F of Figure 12 represents the protection which my invention affords in the approach to, and passing over, a trestle or any other particular section of the track, the situation or condition of which particularly requires a low speed limit, such as a drawbridge, a dangerous down grade curve, a railroad crossing, a cross-over switch, a city street, or the like. At *u* or at *w* the train derives the monitor re-set 352 or 353 which takes the train into the block *w*—*x*, and well up toward the signals *x*. The ramp rail at *w*, however, is energized only with positive polarity and only when the home signal at *w* is cleared, thereby affording no headway beyond that of the limit curve 353 terminating just in rear of *x*. The trestle or other section of the track requiring particularly low speed is located just in advance of the signals at *x*, and the usual ramp rail is entirely omitted at this point so that in no event, can the locomotive derive any headway in passing the signals *x* and approaching the trestle. Hence, in passing over the trestle or other low-speed portion of the railway, the locomotive is subject to the low flat limit 354, which cannot be exceeded. On passing the signals *y* beyond the trestle, however, the locomotive monitor derives a half-headway or full-headway re-set according as these signals show one or two blocks clear, whereupon the locomotive may be accelerated, as indicated.

On passing the signals *a'*, the locomotive monitor will derive the half-headway or full-headway re-set in the usual manner, as indicated by the half-headway and full-headway stop curves 427 and 426 respectively leading up toward, or beyond, the signals *c'*. The block *c'*—*f'* is the last block in the approach to the interlocking point *f'* which is the junction of three routes indicated by respective signals on the post at *f'*. The top semaphore and second semaphore are the usual home and distant signals for the high speed route along the "main line." The third semaphore, below the distant signal, indicates the medium speed route from the main line on to the "spur." The bottom semaphore indicates the low speed route on to the "siding." The bottom semaphore on the post at *c'* is an extra distant signal indicating the position of the spur signal or medium speed signal at *f'*.

In taking the main line route, the locomotive may pass the signals at *f'* at full speed; these signals may be passed at medium speed when they are set for the route over the spur track; and they may be passed at low speed when set for the route on to the siding. It is desirable to selectively set the monitor for this proper limit speed in passing the signals at *f'*, according to the route set up at this point, and, in the present instance, this is accomplished by effecting a half-headway or full-headway re-set of the monitor by extra ramp rails at different points in rear of $f'$, according to the route selected.

If the locomotive is to take the main line or high speed route, the spur and siding signals at $f'$ and the spur signal at $c'$ are all in their horizontal positions, so that the circuit controllers actuated by these semaphores are opened, thereby preventing energization of the extra ramp rails at $b'$, $d'$, $e'$, as will be explained. Now the ramp rails at $c'$ and $f'$ will be controlled in the usual manner by the main line home and distant signals on their respective posts, thereby effecting at $c'$ the half-headway and full-headway monitor re-sets indicated by the stop curves 428 and 431, and at $f'$ the half-headway and full-headway re-sets 431 and 432.

If the signals at $f'$ indicate the route on to the spur track, the main line signals at this point and the main line distant signal at $c'$, will all be in stop or caution positions, wherefore the ramp rail at $f'$ will be entirely de-energized and the ramp rail at $c'$ will be energized only with positive polarity as a result of the clear position of the home signal at that point indicating clear headway over the block $c'$—$f'$. Now, in passing the ramp rail at $b'$ some distance in rear of the signal at $c'$, the locomotive will derive the full-headway re-set 430 which will permit the locomotive to pass the signals at $f'$ at medium speed as indicated, the ramp rail at $b'$ being energized with negative polarity through the following circuit: from the negative pole of the battery 441 through the circuit controller governed by the spur distant signal at $c'$, and thence through the wire 442, contacts 443 closed by the track relay of the track section $b'$—$c'$, thence by a connecting wire to the ramp rail at $b'$, and thence through the locomotive shoe, relay, axle and wheel, track rail and wire 444 back to the opposite pole of the battery. If the signals at $f'$ were all in stop positions when the locomotive passed $d'$, the spur route having been set up, however, and cleared before the locomotive passed $e'$, then the ramp rail at $e'$ would effect the half-headway re-set of the locomotive monitor to the half-headway continuance of the same limiting curve 430, having its full-headway origin at $b'$, the ramp rail at $e'$ being energized with positive polarity through the following circuit: from the positive pole of the battery 445 through the contacts controlled by the spur signal at $f'$, and thence through the wire 446, contacts 447 controlled by the track relay of the track section $e'$—$f'$, and thence through a connecting wire, the ramp rail at $e'$, locomotive shoe, relay, axle and wheel to the track rail, and thence through the wire 448 back to the battery.

If the siding route is set up at $f'$, the ramp rails designed to give the main line speed limit and the spur line speed limit past the point $f'$, will all be de-energized, and the locomotive can only derive the half-headway re-set 428 in passing the home clear signal at $c'$, and another later half-headway re-set 429 derived from the contact rail at $d'$ which will be energized with positive polarity through the following circuit: from the positive pole of the battery 449 through the contacts controlled by the siding signal at $f'$, and thence through the wire 450, contacts controlled by the track relay of the track section $d'$—$e'$, and thence through a connecting wire, ramp rail at $d'$, locomotive shoe, relay, axle and wheel to the track rail, and thence through the wire 451 back to the negative pole of the battery. The limiting curve 429 will permit the locomotive to pass the signals $f'$ and take the siding switch at a low speed, as indicated.

Although for convenience of illustration I have shown a record-receiving paper roll of considerable width in Figure 1, with the recording devices widely separated, it will be understood that, in practice, the parts will be most compactly arranged so as to operate on a relatively narrow paper ribbon, such as shown in Figure 13.

Since all the record-marking devices, except the pressure recorders, are disposed on a common horizontal line or elevation with the time-recording wheels 204, it follows that the time of marking any record (except the pressure records) at a given point on the paper ribbon, will correspond to the time record on an imaginary horizontal or transverse line passing through said point, or to the time indicated by the position of such line between the two adjacent time records. For instance, observing Section A of Figure 13, it must be noted that, however much the feeding speed of the paper tape may vary from hour to hour owing to variations in friction, atmospheric conditions, or the like, the speed cannot in any event vary appreciably during any one minute, and hence the paper must have been fed uniformly from the time record 12 20 to the time record 12 21, that is to say, one-sixtieth of this distance for each second. Wherever a number appears on the record tape, the dash following the number is taken as the absolute reference point or position of the record, and if the distance between the dashes following the records 12 20 and 12 21 be divided into sixty equal spaces, the imaginary transverse lines demarcating these spaces will be in fact the transverse lines on the tape which pass the horizontal line of the record-marking devices at each of the consecutive sixty seconds of the minute. Hence, if the dash at the end of the record, D H 129—, occurs on the sixteenth transverse line demarcating the seconds of the minute between 12 20— and 12 21—, it is thereby indicated that the home and distant clear signals at ramp rail 129 were passed at sixteen seconds after 12 20. The exact second of each record is thereby indicated.

The brake-pipe pressure and steam pressure records are marked by points a definite distance below the time-recording wheels. This distance is indicated in Figure 13 by the arrows $z$. Hence, the instant of any variation in either pressure record is indicated by a transverse line located above the point of such variation a distance equal to $z$.

The " reference line," so designated in Figure 13, is a straight continuous printed or ruled line serving the purpose of a reference line or base line for measuring the ordinates of the steam pressure and brake-pipe pressure curves. The distance of the " steam pressure " curve from this reference line increases with the steam pressure; but the distance of the " brake-pipe pressure " curve from the reference line decreases as the brake-pipe pressure is increased.

The speed marks on the record-tape will occur at regular intervals of travel, for instance 100 feet. These marks are designated as " speed marks " because, in correlation with the time record, they show the exact speed of the locomotive at each instant and point of its travel. Obviously, they will also show the point and duration of each stop.

As an instance of the utility of the tape-record, it may be assumed that the section of tape represented in Figure 13 tells the following hypothetical story of a portion of the trip, terminating in a serious accident.

At 12 20 the locomotive, running at a speed somewhat exceeding one mile per minute, (which, if necessary, can be exactly determined by correlation of the speed marks and time record,) was distant 1600 feet in rear of the ramp rail 129. Continuing at this speed, the train passed this ramp rail at about fifteen seconds after 12 20, receiving a home-and-distant clear indication at that point. Thence the locomotive proceeded at about the same speed to the next signal post at the ramp rail 130 just about one mile further, where the engine man received a home clear and distant caution indication, passing the signal about eleven seconds after 12 21. This signal was passed at about the same speed, somewhat over one mile per minute, and a warning signal was given about 200 feet beyond the signal, from which it appears that the brake-factor or limit-adjusting lever of the monitor was adjusted for a speed limit slightly exceeding one mile per minute with a mile clear headway, the distance up to the next ramp rail 131 being about a mile, as shown by the speed marks.

It appears that the engine man did not heed the warning signal given immediately after passing the ramp rail 130, but proceeded substantially at full speed for about seven seconds, covering a distance of about 600 feet, whereupon the stop solenoid was de-energized. Apparently it required about two seconds after de-energizing the stop solenoid, to vent the timing-chamber of the monitor main-valve sufficiently to begin the service application of the brakes which is indicated by the fall in brake-pipe pressure. The locomotive continued for about one minute, covering about one-half a mile with the stop solenoid de-energized and the service brakes fully applied, after which time and travel the locomotive was brought almost to a stop at thirty seconds after 12 22. It is apparent that the engine man was not at his post, else he would have grasped the manual re-setting lever and re-energized the stop solenoid as soon as the locomotive speed had been reduced to the warning limit, whereupon he would have immediately released the brakes instead of permitting his train to come almost to a full stop. The record clearly shows that he did not manipulate the manual re-setting lever to re-energize the solenoid until a full minute had elapsed after the automatic setting of the brakes. When he had returned to his post and re-energized the stop solenoid, however, he immediately released the brakes, as indicated, at about thirty seconds after 12 22, thereupon immediately opening the throttle and accelerating his train for about 1100 feet of its travel, when he received another warning signal and immediately thereafter made a manual service application of the brakes, slowing down his train during a travel of about 800 feet in approaching the signal at the ramp rail 131.

Since he received only the home clear indication at the ramp rail 130, the signals at 131 must have been in danger position when he passed the signals 130. Hence in passing the ramp rail 130, his monitor had only a half-headway limit which compelled him to slow down in approaching the ramp rail 131. The time-record, however, shows that there was no delay in waiting for the signals at 131 to clear. Apparently he merely slowed down until his contact shoe engaged the ramp rail 131 imparting a full-headway re-set to the monitor, as indicated by the home-and-distant clear indication received at that point. He passed the signals 131 at about fifteen seconds before 12 25, thereafter immediately accelerating his train throughout the ensuing block up to the ramp rail 132, which he passed at full speed, with home-and-distant clear indication, at about twenty-four seconds after 12 26. The distance of about one mile up to the next signal at ramp rail 133 was covered in about fortyfive seconds, which we may presume to have been about the top speed of the train in an effort to make up time for the preceding delay. The warning speed limit was exceeded and another warning signal given about 3300 feet in rear of the signals 133, and the speed thereafter was slightly decelerated, although not by an application of the brakes, from which we may assume that the travel was slightly up-grade or for some other reason the train could be sufficiently decelerated merely by closing the throttle.

2300 feet in advance of the ramp rail 133 is a grade crossing which, in this hypothetical instance, we may assume to have been the scene of a serious accident on the trip here recorded. The record shows that the engine man began to blow the crossing whistle at a distance 1400 feet in rear of the signal, that is to say, when he was 3700 feet from the crossing. The signals at the ramp rail 133 gave the home-in-distant clear indication, and the engine man proceeded substantially at full speed up to a point 900 feet beyond the signal, or 1400 feet in rear of the crossing, at which point he suddenly threw on the emergency brakes, and again pulled the whistle cord. The train, however, which was then running at almost full speed, proceeded on to and perhaps slightly beyond the crossing, coming to a full stop at about 12 28. Seven seconds later the engine man blew a long blast on the whistle which, we may assume, was a call for assistance. Since the record shows that the crossing whistle was duly given, and the emergency brakes applied and a second whistle sounded 1400 feet in rear of the crossing, it remains only to inquire if this was the point at which the engine man, with all diligence, could first observe the situation at the crossing.

Incidentally, it will be noted that the diligence of the fireman in keeping up the proper steam pressure is fully indicated by the steam-pressure line.

In Figures 14 and 15, I have illustrated the adaptation of my invention to a single track railroad; and have shown a monitor mechanism with means for variably setting the traveller for a clear headway of any distance up to the maximum or full-headway, thereby adapting the train-control system to signalling blocks of any length whatever up to the maximum limit and without incurring additional section joints and ramp rails between the termini of the blocks. As a part of the system shown in Figures 14 and 15, I have devised a condensed recorder adapted to record any desired incident occurring on a locomtive trip without the necessity of continuously feeding the record-receiving roll, thereby effecting a saving in paper and enabling the recorder to operate for a longer time with a paper roll of a given size.

In this instance, the paper is fed one step for each record marked thereon, so that the comparatively short length of paper used to record the incidents of each trip may be cut off from the end of the tape in the form of a card, such as represented in Figure 16.

A train, represented by the wheel U, is moving eastbound over the single track. J and L are eastbound signals. M and K are westbound signals. The locomotive or car wheel U is geared to the vertical monitor shaft 355, extending upward through a bearing-lug formed in the bottom of the monitor casing. This shaft terminates flush with the upper surface of the disc 356 secured on the upper end of this shaft and fixedly inserted into the hollow hub of the bevel gear 503 and acting as a closing plate to retain the clutch balls disposed within the hub and surrounding the lower end of the monitor main shaft 358, turning freely in the gear 503 in one direction, but clutched thereto in the other direction by the clutching action of the balls, in the manner of the directional clutch shown in Figure 18. The lower end of the monitor main shaft 358 rests on the upper end of the monitor shaft 355, the two shafts being free to rotate in opposite directions. The monitor main shaft 358 carries another similar bevel gear above the gear 503 also turning freely on the shaft 358 in one direction but clutched to the shaft in the other direction by the action of similar clutch balls, as indicated. Between these gears and meshing with both of them is an intermediate bevel gear mounted on a horizontal shaft extending through a bearing formed in the side of the casing and transmitting rotation to the flexible shaft 357 connected with the recorder shaft 358 enlarged in Figure 15. This intermediate gear transmits rotation from the lower bevel gear 503 to the upper bevel gear mounted on the monitor main shaft. Hence, no matter which way the shaft 355 turns as the locomotive or car travels in one direction or the other, the upper and lower bevel gears mounted on the shaft 358 will always turn in opposite directions, one of them always transmitting rotation to the monitor main shaft in the direction of its indicating arrow, while the other gear turns freely on the shaft in the opposite direction.

Mounted on the monitor main shaft 358 just above the bevel gears is a worm transmitting rotation to a worm wheel mounted on a horizontal shaft extending across the casing and also carrying a worm located behind and meshing with the worm wheel 359 mounted on the vertical traveller shaft 360. Thereby the traveller shaft is always rotated slowly in the direction of its arrow in exact proportion to the travel of the train in either direction.

Above the aforesaid worm on the main shaft 358 is formed a V-worm 361. A re-setting traveller 362 mounted on the main shaft consists in a sleeve surrounding the worm 361 with a clearance hole and having a slot into which enters the vertical longer arm of an L-shaped clutch lever, the short horizontal arm of which constitutes an armature 363 co-acting with a clutch magnet disposed above the armature and mounted on the under side of a horizontal arm extending from the sleeve 362. A similar arm 362$^a$ extends horizontally from the upper end of the sleeve in the opposite direction and is bored with a clearance hole surrounding the traveller shaft 360 and normally rests on a collar 364 formed on this shaft to act as a lower stop for the re-setting traveller. The edge of the L-shaped resetting clutch-lever is notched to fit the V-worm 361. The clutch magnet is normally de-energized, but when its armature 363 is attracted, the notched edge of the upper arm of the clutch lever is held in mesh with the V-worm 361 so that the traveller will be gradually raised by the rotation of the worm while the clutch magnet is energized.

The regular monitor traveller 365 consists in a sleeve mounted with sliding clearance on the V-worm 366 cut on the upper end of the traveller shaft 360. This sleeve also has a slot into which enters the notched edge of the clutch dog 367 pivoted between lugs projecting horizontally from the upper end of the sleeve, and having its notched edge held normally in mesh with the V-worm by a flat spring secured on the lower end of the sleeve. A horizontal arm 368 projects from the traveller sleeve and surrounds the monitor main shaft with a clearance hole. The graduating collar 369 is splined on the main shaft and supported by the traveller arm 368 and bears the lower end of the graduating spring, the upper end of which delivers its thrust on a distributing collar, and thence by an equalizing lever and vertical thrust links to the warning and stop monitor weights 370 and 371, all as before described with respect to the monitor weights of Figures 1 and 2.

The warning and stop weights make contact with rings connected respectively with the wires 372 and 373, the contact rings being mounted like those of the monitor of Figures 1 and 2 on an insulating sleeve slipped over the upper bearing of the monitor main shaft.

A manual re-setting lever 452 is pivoted on a shaft 454 and extends through a slot 453 formed in the casing, the projecting end of the lever constituting a handle. The lever carries a pin $n'$ which, when the handle is raised to the upper limit of the slot, will engage the traveller arm 368 and raise the traveller through a limited distance, thus effecting a partial reset and maintaining a low flat speed limit while the handle is thus held.

An insulating collar 374 is mounted on the outer end of the horizontal shaft of the intermediate bevel gear, and is circumferentially grooved to receive a metallic flat ring from which protrudes the radial contact arm 375. As the insulating collar turns with the shaft, the ring slips in the circumferential groove but is subjected to sufficient friction drag to hold the contact arm 375 in engagement with one or the other of the diametrically opposite stop pins 376 and 377 mounted on the casing but suitably insulated therefrom, as indicated. Hence, the arm 375 will contact with one of the stop pins continuously during the movement of the locomotive in one direction, and will be transferred to contact with the opposite pin whenever the direction of locomotive travel is reversed.

The flexible shaft 357 drives the recorder shaft 504 in one direction or the other according to the direction of locomotive travel. This recorder shaft horizontally enters the recorder casing through an inwardly projecting bearing lug, and just inside this lug the shaft carries an insulating collar 378, in the circumferential groove of which is mounted another flat ring carrying a radial contact arm 379 like the contact-maker 375. While the recorder shaft turns in either direction, the contact maker 379 will be arrested by the insulated stop pin 380 mounted on the wall of the casing, but each time the rotation of the recorder shaft is reversed when the locomotive travel is reversed, the contact maker 379 will be dragged around by the friction of its integral ring in the collar 378 until the arm is arrested by engagement with the opposite side of the stop pin 380, the contact-maker 379 being thus caused to wipe over and make momentary contact with the short contact pin 381 each time that the locomotive travel is reversed, this contact pin 381 being mounted opposite the pin 380 on an insulating button secured to the casing.

A worm 358$^a$ is formed on the inner end of the recorder shaft and meshes with a small worm wheel 382 mounted on a horizontal type-lever shaft 383. On this type-lever shaft in front of the worm wheel is pivotally mounted a type lever 384. One end of this type lever is pivotally connected with the pull rod 385, and the opposite end carries a stud 386 upon which are mounted a gear 387 and a group of four number-printing wheels 388, suitably geared together and each adapted to print a numerical series from 0 to 9. The gear 387 meshes with the worm wheel 382 and drives the type wheels 388, so that the uppermost type of the wheels located just underneath the ink ribbon 389 will indicate the mileage of the locomotive travel in miles and tenths. Projecting upward from the end of the type lever which carries the number-wheels, is a type bar 384$^a$, the upper end of which carries a type indicating the number of the locomotive upon which the recorder is installed. Projecting upward from the middle or fulcrum point of the lever 384, is a paper-feeding arm 384$^b$ bent into a horizontal extension or lip 384$^c$ at its upper end, and carrying a paper-feeding spring 394, the upper end of which presses upward against the paper tape interposed between this spring and the underside of the paper-feeding lip 384$^c$.

The record-receiving paper 390 is fed from the underside of a roll V (mounted in the recorder casing) horizontally under a guide roll 391, and thence between the paper-feeding lip 384$^c$ and paper-feeding spring 394, and thence between the ink ribbon 389 and the upper horizontal wall of the casing which acts as a platen to support the paper against the pressure of the type in receiving a record, and thence underneath the vertical knife 392, and thence downward through the delivery channel 393. The cutting edge of the knife co-acts with a cutting edge formed on the lower side of the delivery channel, as is clearly indicated. The knife will be pressed down at the end of the trip to cut off, in the form of a card, such as Figure 16, so much of the record-receiving tape as has been printed on the trip.

Each time the rod 385 is pulled down, the type wheels 388 and type carrier 384$^a$ are struck up against the ribbon 389 to print upon the paper 390 a record indicating the number of the locomotive and its mileage position on the track. Each time the lever 384 thus strikes a record, its paper-feeding arm 384$^b$ is swung leftward along the paper ribbon, its paper-clutching spring 394 slipping freely under the paper when moving in this direction; but during the return movement of the lever and paper-feeding arm, the spring 394 acts as a directional clutch to grip the paper tape against the feeding lip 384$^c$ and pull the paper one step forward.

The lower end of the pull rod 385 is connected with the free or swinging end of an arm 395 extending horizontally from the pivoted armature of the mileage-recording magnet M. This magnet is normally de-energized and a retractile spring connected with its armature tends normally to hold the armature away from the magnet and raise the arm 395 and the pull rod 385, thus holding the record-marking lever 384 normally in the position represented with its type withdrawn from the ink position. When the magnet is energized, it attracts its armature, rotates the arm 395 and pulls down the rod 385, thus impelling the type lever 384 to strike a record on the paper. When the magnet is de-energized, its armature is withdrawn by the retractile spring which restores the parts to normal position and feeds the paper one step, as before explained.

Upon the type-lever shaft 383 behind the worm wheel 382, are mounted three type levers formed like the lever 384, excepting that they have no paper-feeding arm such as 384$^b$ and do not carry studs such as 386. Their type-carrying ends correspond to the type bar 384$^a$ and carry type respectively marking the records A, O and I. Their ends opposite the type bars are pivotally connected with depending pull rods, the lower ends of which are pivotally connected to horizontal arms extending from the armatures of the magnets A, O and I respectively, each armature having a retractile spring, and the entire arrangement for each type lever being the same as already explained with respect to the type lever 384, excepting only that the different pull rods are of different lengths, and the horizontal arms connected with the armatures of the three latter magnets, A, O and I, are continued beyond their pivotal connections with the pull rods to form contact-making ends adapted to co-act with the contact springs 396, 397 and 398, all connected through suitable wires with the contact maker 379 and with one terminal of the mileage-recording magnet M. The contact-making ends of the armature arms are normally out of contact with their respective springs, but make contact therewith when the armatures are attracted.

The eastbound home signal at J is governed by the block J—L extending up to the next eastbound signals at L. The locomotive carries two contact shoes 399 and 400, connected respectively with the contact pins 376 and 377. When the locomotive is moving eastward, the contact pin 377 is out of connection with the contact arm 375, whereby this pin and the contact shoe 400 are entirely disconnected from the monitor apparatus so that no effect whatever can result from energizing the contact shoe 400, for instance, in passing over any westbound ramp rails, such as T, S, R, K'. When the shoe 399 rides on to the eastbound ramp rail L', the following re-setting circuit is closed: from the stationary battery 401, through the contacts controlled by the home signal at J, and thence through the wire 402, ramp rail L', contact shoe 399, connecting wire, contact pin 376, contact arm 375, connecting wire, clutch magnet of the re-setting traveller, and thence through a wire grounded on the monitor casing and through the metallic parts of the apparatus to the wheel U, and thence through the upper track rail to the wire 403 and back to the opposite pole of the battery. The instant the foregoing circuit is closed, the clutch magnet raises the armature 363 of the L-shaped clutch-lever, thereby clutching the re-setting traveller to the re-setting worm 361 and beginning an upward movement of this traveller which must be proportionate to the distance travelled by the train during the period of energization of the clutch magnet, that is to say, proportionate to the length of the ramp rail L'. When the shoe 399 leaves the ramp rail L', the foregoing crcuit is, of course, immediately broken, and the re-setting traveller falls back against its bottom stop 364.

The diagram represents the regular speed-graduating monitor traveller 365 near its maximum elevation at the instant the re-setting traveller is beginning its rise in response to the ramp rail L', since it is assumed that the regular traveller has been priorly re-set at a point further back on the railroad to give the locomotive high speed headway past the signals J. If we suppose, however, that the locomotive approached the signals J with its regular traveller 365 in its lowest position resting on the re-setting arm 362ª of the re-setting traveller, we may note that this re-setting arm would raise the regular traveller a definite distance equal to the rise of the re-setting traveller and hence proportionate to the length of the ramp rail L', the clutch dog 367 of the regular traveller meanwhile slipping over its V-worm owing to the yielding of its retaining spring.

Now, if the graduating spring be so designed that it will be expanded to the minimum or zero speed limit when the regular traveller 365 stops in its lowest position against the re-setting arm 362ª, it will be noted that the clear headway afforded by the rise of the regular traveller will be exactly proportionate to the length of the ramp rail L', so that to re-set the traveller at successive signal posts for any clear headway whatever, it is only necessary to energize the contact shoe at each signal post by a ramp rail proportionate to the clear headway indicated by the signals on that post. Hence, the clearing of the distant signal at J may serve to include an extension ramp rail N' in connection with the wire 402, as indicated, the length of the ramp N' being such that the total length of the ramps L' and N' will be proportionate to the total clear head-way from J to N corresponding to the home-and-distant clear indication of the signals at J.

The parabolic speed-limit curves 404 and 405 indicate respectively the headways derived from the home clear and the home-and-distant clear indications of the signals at J. The parabolic curve 406 represents the gradual rise of the speed limit from zero to the limit 404 or to the limit 405 as the traveller 365 is raised while the contact shoe wipes over the ramps L' and N'. Likewise the parabolic curve 407 represents the rise of the speed limit derived from the ramps P and Q at the signals L, and the parabolic curve 408 represents the clear headway thus derived. The length of the ramp P is proportionate to the block L—N and the total length of the ramps P, Q is proportionate to the clear headway indicated by the distant signal at L. If when the locomotive approaches the signals L, the traveller is falling in correspondence with either limit curve 404 or 405, it will not have reached its lowest position when the contact shoe rides over the ramps P, Q, and hence will not be engaged by the re-setting traveller until the re-setting traveller has risen to the elevation at which its rising limit-curve 407 intersects either of the declining limit curves 404 or 405. If the locomotive passed home and distant clear signals at J, it will be proceeding under the stop limit 405 up to the intersection of this limit curve with the rising limit 407, after which the train will proceed subject to the rising limit-curve 407 to the end of the ramp rail Q, and thence will be subject to the declining limit curve 408.

When the locomotive is moving in the reverse direction over the track, the contact arm 375 will be out of contact with the stop pin 376, thus leaving the eastbound contact shoe 399 entirely disconnected, while the westbound contact shoe 400 will be connected with the resetting clutch magnet through the stop pin 377, thereby imparting to the monitor at each westbound signal a re-set proportionate to the length of the ramp rail energized at that signal, the westbound ramp rails, of course, being proportionate in their lengths to the clear headways indicated by their respective signals.

At Z is an interlocking point where the "main line" divides into "high speed," "medium speed," and "low speed" routes. At Z', some distance in rear of Z, is a signal post carrying three distant signals respectively indicating the high speed, medium speed and low speed routes set up at Z. A ramp rail at Z' is divided by insulating joints into three sections, Y, X and W.

If the high speed route is cleared when the locomotive passes Z', all sections of the ramp rail will be energized so that the locomotive monitor will derive a rise in speed limit, as indicated by the rising curve 434ª, co-extensive with the entire ramp rail Y X W, thereby acquiring the headway indicated by the declining speed-limit curve 434, which will permit the train to pass Z at high speed over the high speed route. The three sections of the ramp rail are energized through the following connections with the battery 455 which has its positive pole grounded on the track rails: from the negative pole of the battery 455 through the wire 437 and thence through three contacts controlled by the high speed signal to the three wires 438, 439 and 440, and through these wires respectively to the ramp sections W, X and Y.

If the medium speed route is cleared when the locomotive passes Z', only the sections X and W of the ramp rail will be energized, so that the rise in the speed limit as the locomotive wipes over the ramp will be only coextensive with these sections, as indicated by the rising curve 435$^a$, which imparts the headway shown by the declining speed limit 435, permitting the train to pass Z at a medium speed to take the medium speed route. In this instance, the ramp sections X and W will be energized through contacts closed by the medium speed signal and serving to connect the wire 437 with the wires 439 and 438 leading respectively to these ramp sections.

If the low speed route is cleared when the train passes Z', only the ramp section W will be energized, and the consequent rise in speed limit will be only co-extensive with this ramp section, as indicated by the rising limit-curve 436$^a$, which results in a headway limit 436, permitting the locomotive to pass Z at a low speed to take the low speed route. In this instance, the ramp section W is energized by the contact controlled by the low speed semaphore which connects the wire 437 with the wire 438 leading to this ramp section.

The warning and stop weights are bored with transverse holes 370$^a$ and 371$^a$ equidistant from the monitor main shaft so as to have no effect on the gravity moment of the weights about their pivotal centers, but located at different elevations above their pivotal centers, so that the weight 370 with the lower bore will develop a greater centrifugal moment about its pivotal center than the weight 371 with the higher bore. Obviously, the effect is the same as that of the differentially adjusted limit-adjusting screws and monitor weights of Figures 1 and 2. Hence, the weight 370 will fly outward at a definite percentage of the greater speed which would be necessary to throw out the weight 371 with the same setting of the graduating spring. The speed-limit curves 404, 405, 408, 434, 435 and 436, may be taken to represent the speed limits imposed by the stop weight 371, it being understood that a warning limit curve, which has not been shown, exists in fact underneath each of these stop-limit curves, so that the engine man will always receive a warning before the speed of his vehicle exceeds the stop limit.

When the warning weight 370 is thrown out, it opens the following circuit: from one pole of the locomotive battery 409 through the wire 410, monitor casing, main shaft and warning weight 370, and thence through the upper contact ring, wire 372, signal magnet 411 and connecting wire back to the opposite pole of the battery. When the magnet 411 is de-energized, it gives the warning signal. When the stop weight is thrown out, it opens the following circuit: from one pole of the locomotive battery 409 through the wire 410, monitor casing and main shaft, stop weight 371, lower contact ring, wire 373, stop magnet 412 and connecting wire back to the opposite pole of the battery. When the magnet 412 is de-energized, it releases its armature to open the service vent-valve connected therewith, thus venting the brake pipe, and at the same time the armature makes contact with its back stop 413.

It may frequently be necessary to run the locomotive over a division or line of track not equipped with the train-controlling ramp rails. Also, it will frequently be necessary to run the locomotive over one of the tracks of a double track railroad in the direction reverse to the normal traffic thereon, the track being not equipped with ramp rails to control the monitor during such a reverse movement of the locomotive. Also, the locomotive may frequently be called upon to push in the middle or at the rear end of a long train, so that the portion of the train in advance of the locomotive will throw all signals to stop positions before the locomotive reaches their respective ramp rails. While the locomotive is running under any one of these conditions, the monitor traveller cannot be re-set, but will remain always in its low speed-limiting position.

In order to make full speed under such conditions, the cut-out valve 414 may be closed to prevent the escape of air from the brake pipe through the stop vent when the magnet 412 is de-energized. Upon the stem of the valve proper is fixed an insulating block 415 carrying contact plates connected with the wires 416 and 417. The valve handle 414 is mounted loosely on the stem and carries a lower insulated finger 418 which engages the contact plate on either side to transmit rotary movement to the block 415 and thence to the valve stem and valve proper. With the handle in the position marked "In," the valve is open so that the stop apparatus is in service. With the handle in the position marked "Out," the valve is closed and the apparatus is out of service. Below the valve is a fixed contact segment 419. With the valve handle in either extreme position, its contact finger 418 stands clear of the segment 419, but as the handle is thrown from one position to the other, the finger momentarily wipes over the segment, while the finger is in contact with one or the other of the contact plates mounted on the block 415, depending on which way the valve handle is being moved.

In order to enforce a rule against the use of the manual valve 414 to cut out the automatic speed control when the locomotive is running over a track equipped with the automatic train-control system, it is important to record every use of this manual cut-out valve. When the handle is swung from "In" to "Out," the finger 418 first makes contact with the segment 419, the valve handle turning freely on the valve stem until the finger 418 engages the contact plate connected with the wire 416, thus shifting the block 415 and the valve proper and momentarily closing a circuit leading from the segment 419 through the finger 418 to the recording magnet O, this circuit being broken when the finger leaves the segment as the valve handle approaches the extreme "out" position, and this circuit being traceable as follows: from one pole of the locomotive battery 420 through a connecting wire, contact segment 419, contact finger 418, its left contact plate, wire 416, recording magnet O, and wires 422, 421 back to the opposite pole of the battery. The momentary closing of the foregoing circuit momentarily energizes the magnet O and strikes the record O on the recorder tape, as appearing in Figure 16. Simultaneously the horizontal arm of the armature of this magnet makes contact with its contact spring 397 and energizes the mileage-recording magnet M through the following circuit: from the positive pole of the battery 420 through the wires 421 and 422, contact arm of the armature of magnet O, contact spring 397, connecting wire, magnet M and wire 423 back to the negative pole of the battery. Thus the mileage-recording magnet M is momentarily energized with the recording magnet O so that a mileage record appears on the tape on a horizontal line with the character O, as shown in Figure 16.

Likewise, each energization of either of the magnets A or I closes the same circuit of the mileage recording-magnet M by connecting the same wire 422 with either contact spring 396 or 398, and thence with the same terminal of the mileage-recording magnet. Therefore, a mileage record always occurs on the same horizontal line with the record printed by either of the three magnets A, O or I.

The magnet I is momentarily energized when the valve handle 414 is thrown from its "out" position to its "in" position, this circuit being traceable as follows: from the negative pole of the battery 420 through a connecting wire to the segment 419, and thence through the finger 418, its right contact plate, wire 417, magnet I and wires 422 and 421 back to the positive pole of the battery. This momentary energization of the magnet I prints the character I on the record tape with a corresponding mileage record, as appearing in Figure 16.

Whenever the stop magnet 412 is de-energized, it momentarily closes a circuit through the recording magnet A to mark the character A on the tape with a corresponding mileage record showing the point at which the locomotive speed exceeded the stop limit, this circuit of the magnet A being traceable as follows: from the negative terminal of the battery 420 through the armature of the stop magnet 412, its back contact 413, wire 424, normally closed contacts 425, 426 controlled by the "slow magnet," wire 427, recording magnet A and wires 422 and 421 back to the opposite pole of the battery. Simultaneously the armature of the stop magnet closes the following circuit of the "slow magnet": from the negative pole of the battery 420 through the armature of the stop magnet 412, its back stop 413, wire 424, "slow magnet" and connecting wire back to the opposite pole of the battery. The "slow magnet" has a copper sleeve surrounding its core, or in any other well known manner is rendered slow acting, so that a moment will elapse before the "slow magnet" raises its armature 425 to break contact with its stop 426 and open the circuit of the recording magnet A, whereupon this recording magnet will be de-energized and its armature will assume normal position to break the circuit of the mileage-recording magnet M and restore the recorder to normal condition to receive any subsequent records while the stop magnet 412 remains de-energized.

Each time that the direction of the locomotive travel is reversed, the contact-maker 379 wipes over the contact pin 381, as before explained, and momentarily energizes the mileage-recording magnet M to indicate the mileage point at which the travel was reversed, the circuit thus closed being traceable as follows: from the positive pole of the battery 420, through the wire 421, contact pin 381, wiper 379, connecting wire, magnet M and wire 423 back to the negative pole of the battery.

As an instance of the utility of the recorder of Figures 14 and 15, it may be assumed that the record card of Figure 16, cut off from the end of the record-receiving tape, tells the following hypothetical story of one trip. The line "276 138 O" is the first line of the record, and beginning at this line the record lines will be read consecutively to the opposite end of the car.

The handle 414 of the manual cut-out valve will normally rest in its "in" position which maintains the monitor in service to automatically apply the service brakes. The hostler, when about to deliver the locomotive to the engine driver, swung the cut-out valve handle to "out" position and thence back to "in" position, to test the recorder and make an initial record for the trip, this test being required by the regulations. This test is shown by the first two lines on the card which identify the locomotive as No. 276 and indicate the initial mileage of the monitor at the beginning of the trip was 138.4. The third line, being only a mileage recod with the locomotive number and without either character A, O or I on the same line, can only have been made by a stroke of the mileage-recording lever 384 alone, and since the mileage-recording magnet M can be energized separately only when its circuit is closed by the contacts 379, 381, it follows that this line of the record can only have been produced by a reversal of the direction of travel. A comparison of the mileage indication with the preceding or initial mileage-record shows that the locomotive moved forward .2 of a mile before its travel was reversed. In this instance the .2 of a mile forward travel represents the movement of the locomotive from the round house out on to the main track.

Since the locomotive was moving forward from the second record to the third record, and was reversed at the instant of the third record, it follows that the locomotive must have moved backward from the third record to the fourth record, and, indeed, this is shown by a comparison of the mileage indications of the third and fourth lines, since the mileage record of the fourth line is less than that of the third, the difference being 1.6 miles, which, of course, is the amount of the backward travel from the round house into the station or terminal where the locomotive was connected with the train. The fourth line was made when the locomotive travel was again reversed in starting forward. Thence the locomotive ran forward from the mileage indication 137.0 to the mileage indication 140.2 on the fifth line, or a distance of 3.2 miles, when the speed limit imposed by the monitor stop weight was exceeded, as indicated by the character A on this line with the mileage record 140.2. Obviously, in this instance the mileage record was printed as a result of the energization of the stop-recording magnet A. The card shows that the manual cut-out valve had not been moved to "out" position since it was thrown to "in" position, as shown by the second line of the card, wherefore we know that the brakes must have been automatically applied when the record A was struck upon the card. Since the engine man necessarily received a warning from his warning signal, he will be required to explain his negligence in permitting the automatic stop to go into action at this point in his trip.

From the point of printing the fifth record, the locomotive proceeded forward 16.5 miles to the point where the monitor was thrown out of control by moving the cut-out valve handle to "out" position, as indicated by the character O on the sixth line with the mileage record 156.7. Thence the locomotive proceeded forward 3.3 miles to the point of the seventh record, where the monitor was again thrown into service by swinging the manual cut-out valve to its "in" position, as shown by the character I occurring on the seventh line with the mileage record 160.0. This distance of 3.3 miles, covered without the protection of the stop apparatus, may have represented a short section of track not equipped for this service. Otherwise the engine driver will be required to explain this use of his manual cut-out.

The locomotive ran 41.3 miles from the point of the seventh record to the point of making the eighth record where the automatic brakes were again applied with the mileage indication 201.3. Here, then, is another instance of negligence on the part of the engine driver.

After this the locomotive proceeded forward 29.2 miles, where it was reversed, as shown by the ninth mileage record 230.5, and backed up a half mile, as indicated by the tenth mileage record 230.0, presumably to take a siding. From the point of making the tenth record, the locomotive ran forward 11.1 miles to the point of making the eleventh mileage record 241.1. Here the locomotive was again reversed and backed .1 of a mile to a point where the monitor was again thrown out of service, as indicated by the twelfth mileage record 241.0 O. The thirteenth record " 239.4 I " shows that the locomotive continued backward 1.6 miles further to a point where the monitor was again thrown into control, and it might be shown that the monitor service was legitimately cut out during this last 1.6 miles of reverse movement for the purpose of making a speed exceeding a too low limit imposed by the monitor with the traveller near the bottom position, when it was necessary to avoid undue delay in reaching another siding; but if this were the initial intention, it is apparent that the engine man did not follow it up, for the character A, indicating an operation of the stop limit-weight, does not occur during this backward run.

The mileage record 239.4 appearing alone on the fourteenth line and being the same mileage indication as the thirteenth line, shows that at this point of restoring the monitor service, the locomotive was reversed and again started forward. It ran 99 miles ahead to the end of the trip, where the engine man again threw out the control, as indicated by the fifteenth record 338.4 O. Apparently the monitor service was here thrown out for the purpose of backing into the round house, since the same mileage record, 338.4, appearing on the next line shows that the locomotive was here reversed and ran backwards 3.4 miles to the point of making the seventeenth record, 335.0 I, which must have been made by the receiving hostler in the round house, since this line and the two following are the last lines of the record and all have the same mileage indication occurring respectively with the characters I, O and I, indicating that here the final test was made by throwing the handle of the cut-out valve " in," " out " and " in."

After printing the final test lines on the record card, the hostler pressed down the knife 392, cut off the card from the continuous paper tape, and passed it through the regular channels for inspection and filing.

Although I have represented several train-controlling systems embodying my invention in conjunction with railway signalling systems employing fixed signalling semaphores at various points along the railway, it should be noted that these fixed signals, as such, are in no wise essential in the practice of my invention. In so far as the functions of my train-controlling systems are involved, the devices represented as signal semaphores might, in fact, be entirely invisible arms or equivalent devices, serving only to operate such contact makers as are necessary to control the circuits of the monitor-controlling ramp rails. Whether or not the visual signals be employed at points along the track, the warning signal at the head end of the locomotive will present an ever-visible unfailing indication of the clear headway and safe speed at all times during the travel of the locomotive and in approach to all stopping or interlocking points where the train should be arrested or its speed decelerated. Hence, this warning signal, ever before the engine man as he looks forward along the track, is a single indication for all points and routes, without incurring any possibility of such uncertainty or confusion as frequently arises from the difficulty or impossibility of viewing a track signal in a fog or snow storm or located around a curve, and the difficulty of making a quick visual selection and interpretation of the right signal among a confusing plurality of different signals for different tracks and routes.

I claim:

1. In combination, a railway vehicle; a centrifugal device operatively connected with a wheel of the vehicle, a traveller movable in accordance with the progress of the vehicle along the railway for exerting an effort on said centrifugal device tending to hold said device closed, said effort gradually decreasing as the traveller moves in accordance with the progress of the vehicle, means controlled by said centrifugal device for governing the vehicle; and extraneous controlling means disposed at intervals along the railway for resetting said traveller to increase the effort exerted thereby on said centrifugal device.

2. In combination, a railway vehicle; a centrifugal device operatively connected with a wheel of the vehicle, a traveller movable in accordance with the progress of the vehicle along the trackway, a spring interposed between said traveller and said centrifugal device for exerting an effort on said centrifugal device tending to hold said device closed, said effort gradually decreasing as the traveller moves in accordance with the progress of the vehicle, means controlled by said centrifugal device for governing the vehicle; and means located in the trackway for causing said traveller to be reset to increase the effort exerted on said centrifugal device by said spring.

3. In combination, a railway vehicle, governing means thereon controlled by the speed of the vehicle and by the progress of the vehicle along the track for imposing a progressively decreasing speed limit, and means for varying the minimum speed limit imposed by said governing means.

4. In combination, a railway vehicle, governing means thereon controlled by the speed of the vehicle and by the progress of the vehicle along the track for imposing a progressively decreasing speed limit, means located at intervals along the trackway for causing said governing means to be restored to increase the speed limit imposed thereby, said governing means being arranged to automatically resume its imposition of the progressively decreasing speed limit after each restoration, and means for varying the minimum speed limit imposed by said governing means.

5. In combination, a railway vehicle, governing means thereon controlled by the speed of the vehicle and by its progress along the railway for imposing a progressively decreasing speed limit, and means located at intervals along the railway for causing said means to be restored to increase the speed limit imposed thereby, said governing means being arranged to automatically resume its imposition of the progressively decreasing speed limit after each restoration.

6. In combination, a railway vehicle, a device responsive to the speed of the vehicle and a device variable in accordance with the progress of the vehicle along the railway, means controlled by the coaction of said two devices for imposing a progressively decreasing speed limit in accordance with the progress of the vehicle along the railway, and extraneous controlling means disposed at intervals along the railway for causing said second device to be restored to increase the speed limit imposed by said two devices, said second device being arranged to automatically resume its variation in accordance with the progress of the vehicle after each restoration.

7. In combination, a railway vehicle, a centrifugal device operatively connected with the running gear of the vehicle, a pivotally mounted traveller arm also operatively connected with the running gear of the vehicle and arranged to swing progressively in accordance with the progress of the vehicle along the track, a pivotally mounted lever, a link operatively connected with said lever, a cam on said traveller arm arranged to coact with said link to cause movement of the lever in accordance with the movement of the arm, and means controlled by said lever and said centrifugal device for governing the vehicle.

8. In combination, a railway vehicle, a centrifugal device operatively connected with the running gear of the vehicle, a traveller arm also operatively connected with the running gear of the vehicle and arranged to move progressively in accordance with the progress of the vehicle along the track, a movable member, a cam on the traveller arm for causing movement of the movable member in accordance with the movement of the traveller arm, and means controlled by said movable member and by said centrifugal device for governing the vehicle.

9. In combination, a railway vehicle, automatic traffic controlling means carried thereon and comprising a device responsive to the speed of the vehicle and a device movable in accordance with the progress of the vehicle along the railway, means controlled by the coaction of said two devices for governing the vehicle and for imposing a progressively decreasing speed limit in accordance with the progress of the vehicle along the railway, means for varying the extent of movement of said second device with relation to the progress of the vehicle, and means located in the trackway for causing said second device to be restored to increase the speed limit imposed by said devices.

10. In combination, a railway vehicle, automatic traffic controlling means carried thereon and comprising governing means controlled by the speed of the vehicle and by its progress along the railway for imposing a progressively decreasing speed limit, means located in the trackway for restoring said governing means to increase the speed limit imposed thereby, and means for varying the maximum speed limit imposed by said governing means to suit the brake factor of the vehicle or train.

11. In combination, a railway vehicle; automatic controlling means carried thereon and comprising a speed-responsive device and means carried by the vehicle and varying in accordance with the progress of the vehicle along the track for exerting an influence on said speed-responsive device in opposition to the tendency of the latter due to the speed of the vehicle, said influence progressively decreasing in accordance with the variation in said means due to the progress of the vehicle; and extraneous controlling means disposed at intervals along the railway for causing resetting of said means to increase the influence exerted thereby on the speed-responsive device.

12. In combination, a railway vehicle; automatic controlling means carried thereon and comprising a speed-responsive device and means carried by the vehicle and varying in accordance with the progress of the vehicle along the track for exerting an influence on said speed-responsive device in opposition to the tendency of the latter due to the speed of the vehicle, said influence progressively decreasing in accordance with the variation in said means due to the progress of the vehicle; and extraneous controlling means disposed at intervals along the railway for causing resetting of said means to increase the influence exerted thereby on the speed-responsive device, said first-named means being arranged to automatically resume its variation in accordance with progress of the vehicle after each reset.

13. In combination, a railway vehicle, a device thereon responsive to variations in the speed of the vehicle, means carried by the vehicle for exerting an influence on said speed-responsive device in opposition to the tendency of the latter due to the speed of the vehicle, said influence progressively decreasing in accordance with the progress of the vehicle along the track, and vehicle governing means controlled by said speed-responsive device.

14. In combination, a railway vehicle, a device thereon responsive to variations in speed of the vehicle for governing the vehicle, means responsive to progress of the vehicle along the track for constantly reducing the speed value at which said speed-responsive device becomes effective to govern the vehicle, means located at intervals along the trackway for restoring said progress-responsive means, said progress-responsive means being arranged to automatically resume its operation after each restoration.

15. In combination, a railway vehicle, a centrifugal device operatively connected with the running gear of the vehicle, and means for exerting on said device an effort in opposition to the centrifugal tendency of the device which effort decreases in proportion to the distance travelled by the vehicle, and means responsive to the opening of said centrifugal device for governing the vehicle, whereby the limit speed imposed by said centrifugal device decreases in proportion to the square root of the distance of the vehicle from a fixed position in advance.

16. In combination, a railway vehicle, a centrifugal device operatively connected with the running gear of the vehicle, and means for exerting on said device an effort in opposition to the centrifugal tendency of the device which effort decreases in proportion to the distance travelled by the vehicle, and means responsive to the opening of said centrifugal device for governing the vehicle, whereby the limit speed imposed by said centrifugal device decreases in proportion to the square root of the distance of the vehicle from a fixed position in advance, and means located in the trackway for restoring said first-mentioned means to increase the limit speed, said first-mentioned means being so arranged that the effort exerted thereby resumes its decrease after such restoration.

17. In combination, a railway vehicle, a centrifugal device operatively connected with the running gear of the vehicle, a traveller movable in accordance with the progress of the vehicle along the track for exerting an effort on the centrifugal device tending to hold the latter closed, said effort progressively decreasing as the traveller moves in accordance with the progress of the vehicle, and vehicle governing means controlled by said centrifugal device.

18. In combination, a railway vehicle, means thereon responsive to progress of the vehicle along the track and constantly approaching an operative condition, means responsive to the speed of the vehicle and coacting with said first-mentioned means for determining the amount of travel of the vehicle at a given speed before the first-mentioned means reaches operative condition, means located at intervals in the trackway for restoring said first-mentioned means away from operative condition, said first-mentioned means tending automatically to resume its progress towards operative condition after each restoration, and vehicle-governing means controlled by said first-mentioned means.

19. In combination, a railway vehicle, a traveller carried thereon and biased to move in one direction, means for restraining said traveller to move progressively in response to its bias in accordance with progress of the vehicle along the track, said traveller being movable in opposition to its bias without restraint, a device responsive to variations in the speed of the vehicle, means controlled by the coaction of said traveller and said speed-responsive means for governing the vehicle, and means located in the trackway for causing said traveller to be restored in opposition to its bias.

20. In combination, a railway vehicle, means thereon having a tendency to assume an ultimate condition, mechanism for restraining said means to change progressively towards said ultimate condition in accordance with progress of the vehicle along the track, said means being capable of change in opposition to its normal tendency without restraint, a device responsive to variations in speed of the vehicle, means controlled by the coaction of said means and of said speed-responsive device for governing the vehicle, and means located in the trackway for causing said first-mentioned means to be restored in opposition to its normal tendency.

21. In combination, a railway vehicle, a speed responsive device operatively connected with the running gear of the vehicle, a traveller arm also operatively connected with the running gear of the vehicle and arranged to move progressively in accordance with the progress of the vehicle along the track, a movable member, a cam on the traveller arm for causing movement of the movable member in accordance with the movement of the traveller arm, means for varying the relation between the extent of movement of the traveller arm and the extent of movement of the said movable member, and means controlled by said movable member and by said speed responsive device for governing the vehicle.

22. In combination, a railway vehicle, a speed responsive device operatively connected with the running gear of the vehicle, a traveller arm also operatively connected with the running gear of the vehicle and arranged to move progressively in accordance with the progress of the vehicle along the track, a cam on said traveller arm, a pivotally mounted lever, a link operatively connected with said lever and arranged to coact with the cam to swing the lever in accordance with movement of the traveller arm, and means for attaching said link to said lever at different points in an arc of a circle whose center is the position occupied by the cam end of the link when the link is at one extreme end of its stroke, and means controlled by said lever and said speed responsive device for governing the vehicle.

23. In combination, a railway vehicle, a centrifugal device thereon operatively connected with the running gear of the vehicle and comprising two weights having different moments, a traveller movable in accordance with the progress of the vehicle along the trackway for exerting an effort on said weights tending to prevent them from opening, said effort progressively decreasing as the traveller moves in accordance with the progress of the vehicle, a warning signal controlled by the weight having the greater moment, and automatic means controlled by the other weight for arresting the movement of the vehicle.

24. In combination, a railway vehicle, a centrifugal device thereon operatively connected with the running gear of the vehicle and comprising two weights having different moments, a warning signal controlled by the weight having the greater moment, and means controlled by the other weight for arresting the movement of the vehicle.

25. In combination, a railway vehicle, a centrifugal device thereon operatively connected with the running gear of the vehicle and comprising two weights having different moments, fixed contacts one for each weight, against which said weights are adapted to rub while the weights are in closed position, a warning signal and a circuit therefor controlled by the weight having the greater moment and the fixed contact against which said weight rubs, and vehicle-stopping means and a circuit therefor controlled by the other weight and the fixed contact against which it rubs.

26. In combination, a railway vehicle, a toothed wheel carried thereon and operatively connected with the running gear thereof, a pivotally mounted arm biased to swing in one direction, a pawl carried by said arm and arranged to coact with said toothed wheel to prevent said arm from swinging in the direction of its bias with relation to said wheel, said pawl permitting the arm to swing freely in the other direction with relation to the wheel, means for holding said arm in opposition to its bias, a fixed contact member, a flexible contact spring carried by said arm and arranged to engage said fixed member when the latter is held by said means, whereby when said arm is released by said holding means the arm is constrained to swing with the toothed wheel and the contact spring, owing to its flexure, maintains its engagement with the fixed member until the vehicle has proceeded a predetermined distance, means responsive to the speed of the vehicle and its progress along the track for controlling said arm holding means, and means controlled by said contact device for governing the vehicle.

27. In combination, a railway vehicle, an arm carried thereby, means operatively connected with the running gear of the vehicle for permitting said arm to move progressively in accordance with the movement of the vehicle along the track, means for restraining said arm from said movement, a contact device controlled by said arm and arranged to be closed when the arm is restrained and to remain closed while the arm moves a predetermined distance after being released, means responsive to the speed of the vehicle and its progress along the track for controlling said restraining means and means controlled by said contact for governing the vehicle.

28. In combination, a railway vehicle, a movable member carried thereby and biased in one direction, means connected with the running gear of the vehicle for permitting said member to move progressively in response to its bias in accordance with the progress of the vehicle along the track, means for restraining said member from said movement, means responsive to the speed of the vehicle and its progress along the track for controlling said restraining means, and means for governing the vehicle controlled by said member and operative after said member has been released and has moved a predetermined distance.

29. In combination, a railway vehicle, automatic traffic controlling means carried thereon and comprising two shafts operatively connected with the running gear of the vehicle, means controlled by said shafts for controlling the vehicle, a rotatable member driven by one of said shafts, a rotatable member driven by the other of said shafts, said rotatable members being driven at equal angular velocities, a projection on one of said members, a contact spring carried by the other member and adapted to make contact with said projection, and a vehicle-controlling circuit including said contact spring and said projection, whereby said circuit is affected to control the vehicle if one of said shafts breaks or becomes disengaged from the running gear of the vehicle.

30. In combination, a railway vehicle, two movable members operatively connected with the running gear of the vehicle by separate and distinct means, said members being normally driven in synchronism by the movement of the vehicle, and means controlled by said members for controlling the vehicle when the members are not in synchronism whereby said vehicle-controlling means becomes operative if one or the other of said members becomes dis-arranged or broken or disconnected from the vehicle running gear.

31. In combination, a vehicle, two shafts thereon each operatively connected with the running gear of the vehicle, a speed-responsive device operated by one of said shafts, a traveller controlled by the other shaft and movable in accordance with the progress of the vehicle along the track, two movable members operatively connected respectively with said shafts, said members being normally driven in synchronism, means controlled by said speed-responsive device and by said traveller for governing the vehicle, and means for setting said vehicle-governing means into operation when said two members are not in synchronism.

32. In combination, a railway vehicle, controlling means thereon normally constrained to gradually approach a given condition in accordance with progress of the vehicle along the track, and means for at times causing said controlling means to approach said given condition independently of progress of the vehicle.

33. In combination, a railway vehicle, vehicle-controlling means thereon having a normal tendency to change progressively towards a predetermined condition in accordance with the progress of the vehicle along the track, and means responsive to the speed of the vehicle for preventing said controlling means from approaching said predetermined condition more rapidly than said progressive change, or for permitting it to assume said condition in response to its tendency more rapidly than said progressive change.

34. In combination, a railway vehicle, a member carried thereby and movable in accordance with the progress of the vehicle along the trackway, a traveller arm biased in one direction, means responsive to the speed of the vehicle for constraining said arm to move in response to its bias in accordance with the movement of said member or for releasing said arm to permit it to move in response to its bias independently of said member, and means controlled by said arm for governing the vehicle.

35. In combination, a railway vehicle, a toothed wheel operatively connected with the running gear thereof, a pivotally mounted traveller biased towards one position, a pawl mounted on said traveller and movable with relation thereto, electromagnetic means for clutching said pawl to the teeth of said wheel or permitting it to be freed therefrom whereby the arm is constrained to move with the wheel or is free to move independently thereof in response to its bias, means responsive to the speed of the vehicle for controlling said electromagnetic means, and means controlled by said traveller arm for governing the vehicle.

36. In combination, a railway vehicle, a toothed wheel operatively connected with the running gear thereof, a pivotally mounted traveller biased towards one position, a pawl mounted on said traveller and movable with relation thereto, electromagnetic means for clutching said pawl to the teeth of said wheel or permitting it to be freed therefrom whereby the arm is constrained to move with the wheel or is free to move independently thereof in response to its bias, said pawl being arranged to permit movement of the traveller arm in opposition to its bias independently of said toothed wheel, means for causing movement of the arm, in the last mentioned direction, means responsive to the speed of the vehicle for controlling said electromagnetic means and means controlled by said traveller arm for governing the vehicle.

37. In combination, a railway vehicle, a member thereon arranged to move progressively through a limited stroke in accordance with the progress of the vehicle along the track, means for resetting said member through a portion of its stroke, means for resetting said member through the remainder of its stroke, means located in the trackway for causing operation of the first of said resetting means or of both of said resetting means, and means controlled by said member for governing the vehicle.

38. In combination, a railway vehicle, a traveller arm thereon arranged to move progressively through a limited stroke in accordance with the progress of the vehicle along the track, a half-resetting arm arranged to cause resetting of the first-mentioned arm through a portion of its stroke, means for causing resetting of the first-mentioned arm through the remainder of its stroke, means located in the trackway for causing operation of said half-resetting or of both of said resetting devices, and means controlled by said first-mentioned traveller arm for governing the vehicle.

39. In combination, a railway vehicle, a traveller arm thereon arranged to move progressively through a limited stroke in accordance with the progress of the vehicle along the track, a half-resetting solenoid for resetting said arm through a portion of its stroke, and a full-resetting solenoid for resetting said arm through the remainder of its stroke, a polarized relay on the vehicle, means controlled by said relay when energized in one direction for energizing the half-resetting solenoid, and means controlled by said relay when energized in the other direction for energizing both of said solenoids, means located in the trackway for causing energization of said relay in one direction or the other, and means controlled by said traveller arm for governing the vehicle.

40. In combination, a railway vehicle, a traveller arm thereon arranged to move progressively through a limited stroke in accordance with the progress of the vehicle along the trackway, manually operable means for resetting said arm through a portion of its stroke, a device responsive to variations in the speed of the vehicle, vehicle-governing means on the vehicle, an electromagnetic device for controlling said governing means and arranged to hold said means inoperative while the electromagnetic device is energized, a circuit for said electromagnetic device, including a contact closed only when the electromagnetic device is energized, means controlled by said traveller arm and by said speed-responsive device for controlling said circuit, a shunt around said contact, and a contact closed by said manual resetting means when the latter is operated for closing said shunt.

41. In combination, a block of a railway track, a vehicle adapted to travel thereon, a traveller arm carried by said vehicle and operatively connected with the running gear of the vehicle to move through a limited stroke to an ultimate position in accordance with progress of the vehicle through a limited distance, said distance being less than the length of said block, means located adjacent the entrance end of the block and responsive to clear traffic conditions in advance of said end for causing said traveller to be reset away from said ultimate position, means located in said block at a distance from the exit end thereof substantially equal to the said distance within which said traveller arm makes a complete stroke for causing said traveller arm to be reset through its full stroke away from said ultimate position, and means controlled by said traveller arm for governing the vehicle.

42. In combination, a railway track divided into a plurality of blocks, some of which are of one length and some of which are substantially half said length, a railway vehicle, a traveller arm on said vehicle and operatively connected with the running gear thereof to move through a limited stroke to an ultimate position in accordance with progress of the vehicle through a given distance substantially equal to twice the length of each of said first-mentioned blocks, means on the vehicle for resetting said arm from its ultimate position through a portion of its stroke corresponding substantially to the length of each of the first-mentioned blocks, means on the vehicle for resetting said arm through its entire stroke, means located adjacent the entrance end of each of the shorter blocks for causing operation of said first-mentioned resetting means, means located adjacent the entrance end of each of the longer blocks for causing operation of the second-mentioned resetting means, and means controlled by said arm for governing the vehicle.

43. Apparatus for the control of railway vehicles, comprising a speed-responsive device on the vehicle, and means on the vehicle varying in accordance with the progress of the vehicle along the tracks for exerting a progressively decreasing influence on said speed-responsive device in opposition to the normal tendency of the latter due to the speed of the vehicle.

44. Apparatus for the control of railway vehicles, comprising a speed-responsive device on the vehicle, and means on the vehicle for exerting a progressively descreasing influence on said speed-responsive device in opposition to the normal tendency of the latter due to the speed of the vehicle.

45. In combination, a railway vehicle, a centrifugal device operatively connected with a wheel of the vehicle, means acting upon said centrifugal device and tending to prevent the latter from opening, means for gradually varying said first mentioned means, and vehicle governing means controlled by said centrifugal device.

46. In combination, a railway vehicle, a centrifugal device operatively connected with a wheel of the vehicle, a spring acting upon said centrifugal device and tending to prevent the latter from opening, means for varying the pressure exerted by the spring in accordance with the progress of the vehicle along the track, and vehicle-governing means controlled by said centrifugal device.

47. In combination, a railway vehicle, two speed-responsive devices thereon operatively connected with the running gear of the vehicle, said devices being operative at different speeds of the vehicle, means controlled by the device which is operative at the lower speed for giving a warning signal, and means controlled by the other device for arresting the movement of the vehicle.

48. Apparatus for the control of railway vehicles, comprising a speed-responsive device on the vehicle, and means on the vehicle for exerting a progressively varying influence on said speed-responsive device in opposition to the normal tendency of the latter due to the speed of the vehicle.

49. Apparatus for the control of railway vehicles, comprising a speed-responsive device on the vehicle, means on the vehicle for exerting a progressively varying force in opposition to the force produced by the speed-responsive device, and means for controlling the vehicle when the force exerted by the speed-responsive device exceeds the force produced by the said means.

50. In combination, a railway vehicle, means thereon arranged to change gradually toward an ultimate condition, vehicle-governing apparatus controlled by said means, and devices located in the trackway for causing said means to be restored away from said ultimate condition to a variable degree dependent upon the interval which it is desired shall elapse before said means shall reach its ultimate condition.

51. In combination, a railway vehicle, means thereon arranged to change gradually towards an ultimate condition in accordance with the progress of the vehicle along the track, vehicle-governing apparatus controlled by said means, and devices located in the trackway for causing said means to be restored away from said ultimate condition to a variable degree dependent upon the distance which it is desired that the vehicle shall travel before said means shall reach the ultimate condition.

52. In combination, a railway vehicle, a member thereon connected with a wheel of the vehicle and arranged to move gradually towards an ultimate position in accordance with the progress of the vehicle along the track, vehicle-governing apparatus controlled by said means, and devices located in the trackway for causing said member to be restored a variable distance away from said ultimate position depending upon the distance which it is desired that the vehicle shall travel before said member shall reach the ultimate position.

53. In combination, a railway vehicle, a speed responsive device thereon, means on the vehicle arranged to change gradually towards an ultimate condition, vehicle-governing apparatus controlled by said device and by said means, and devices located in the trackway for causing said means to be restored away from said ultimate condition to a variable degree dependent upon the interval which it is desired shall elapse before said means shall reach its ultimate condition.

54. In combination, a railway track divided into blocks of different lengths, a railway vehicle, means on the vehicle arranged to change gradually toward an ultimate condition, vehicle governing apparatus controlled by said means, and a device located adjacent the entrance of each block for causing said means to be restored away from said ultimate condition to such degree that it will reach the ultimate condition when the vehicle reaches substantially the exit end of the block.

55. In a train speed control system, the combination with a speed governor operated according to the speed of the train for effecting an application of the brakes and resilient means for opposing the effect of the train speed on the governor, of means controlled from a distant point for increasing the resistance of said resilient means.

56. In a system for automatically controlling the speed of railway vehicles, in combination: a warning signal carried by said vehicle; means for establishing a permissive speed for said vehicle for different points in its travel; means for modifying the action of said means, whereby said first-mentioned means is caused to establish a different permissive speed according to the controlling influence produced on it by said second means; and means for operating said warning signal when the actual speed of said vehicle exceeds the permissive speed prescribed by said first means.

57. A railway traffic controlling system comprising automatic traffic controlling means carried on a railway vehicle and having a retarding and a non-retarding condition, the said means being constructed and arranged to assume retarding condition within a limited interval and means located in the trackway and constructed and arranged to restore the traffic controlling means away from retarding condition, together with means for causing the restoration of the traffic controlling means to be reduced to a certain degree whereby to cause said traffic controlling means to assume retarding condition within a shorter interval than said limited interval.

58. A railway traffic controlling system comprising automatic traffic controlling means carried on a railway vehicle and having a retarding and a non-retarding condition, the said means being constructed and arranged to assume retarding condition within a limited interval and means located in the trackway and responsive to clear traffic conditions of the track in advance of the vehicle to restore the traffic controlling means away from retarding condition, said second named means being also adapted to limit the restoration of the traffic controlling means whereby to cause the traffic controlling means to assume retarding condition within a shorter interval than said limited interval when so desired.

59. In combination, a railway vehicle, means thereon arranged to change gradually towards an ultimate condition, apparatus controlled by said means for governing the vehicle, mechanism on the vehicle for restoring said means away from said ultimate condition, said means being adapted to automatically resume its change towards said ultimate condition after such restoration, and devices located in the trackway for causing operation of said restoring mechanism, and for controlling the degree of restoration of said first mentioned means.

60. In an automatic train control system, in combination: a vehicle and a track therefor divided into blocks of different lengths; means carried by the vehicle and having an initial condition for establishing permissive speeds for the vehicle at different points in its travel, and means controlled by impulse devices associated with each block for adjusting the initial condition of said means to conform to a predetermined interval of distance corresponding to that block.

61. A railway traffic controlling system, comprising automatic traffic controlling means carried on a railway vehicle, and having a retarding and non-retarding condition, the said means being constructed and arranged to assume a retarding condition within the limited interval and means located in the trackway and constructed and arranged to restore the traffic controlling means away from retarding condition together with means for causing the restoration of the traffic controlling means to be reduced to a certain degree whereby to cause said traffic controlling means to assume retarding condition within a shorter interval than said limited interval.

62. A railway traffic controlling system comprising automatic traffic controlling means carried on a railway vehicle and having a retarding and non-retarding condition, the said means being constructed and arranged to assume retarding condition within a limited interval, and means located in the trackway and responsive to clear traffic conditions of the track in advance of the vehicle to restore the traffic controlling means away from retarding condition, said second named means being also adapted to limit the restoration of the traffic controlling means whereby to cause the traffic controlling means to assume retarding condition within a shorter interval than said limited interval when so desired.

63. A railway traffic controlling system comprising an automatic train stop carried on a railway vehicle and having a retarding and non-retarding condition and arranged when in retarding condition to automatically apply the brakes and retard the vehicle, the train stop being constructed and arranged to assume retarding condition within a predetermined interval, and means located in the trackway and responsive to the clear traffic conditions of the track to restore the train stop away from retarding condition, said means being also adapted to limit the restoration of the train stop whereby to cause the train stop to assume retarding condition within an interval less than said predetermined interval.

64. In a train control system, in combination: a vehicle; train control apparatus thereon; means operatively connected to the wheels of the vehicle for governing said apparatus; a circuit; a circuit controlling device actuated by said means and periodically interrupting said circuit; and an indicating device included in said circuit.

65. In an automatic train control system, in combination; automatic train control apparatus on a vehicle including a movable part operatively connected to the wheels of the vehicle; traffic controlled means partly on the vehicle and partly along the track for governing the operation of said apparatus; an indicating device on the vehicle responsive to the movement of said part; and another indicating device governed by said traffic controlled means.

66. In a train control system, in combination: a track; a vehicle adapted to travel on said track; train control apparatus on the vehicle; means operatively connected to the wheels of the vehicle for governing said apparatus; means for automatically controlling said apparatus; a circuit; a circuit controlling device actuated by said first mentioned means for periodically interrupting said circuit; and an indicating device included in said circuit.

67. In a train control system, in combination: a track divided into track circuit blocks; a vehicle adapted to travel over the track; train control apparatus on the vehicle; means operatively connected to the wheels of the vehicle for governing said apparatus; means for communicating between the track and said vehicle; a relay governed by said last mentioned means for automatically controlling said apparatus; a circuit; circuit controlling means actuated by said apparatus for periodically interrupting said circuit; indicating means included in said circuit; and other indicating means governed by said communicating means.

68. In a train control system, in combination: a track divided into track circuit blocks; a vehicle adapted to travel over said track; train control apparatus on the vehicle; means operatively connected to the wheels of the vehicle for governing said apparatus; means for communicating between the vehicle and the track; and means governed by said last mentioned means for indicating the operative condition of said communicating means and of said apparatus.

69. In a train control system, in combination: a vehicle and a track therefor; a contact shoe carried by the vehicle and comprising a circuit controller having a plurality of circuit controlling positions; train control apparatus on the vehicle; means operatively connected to the wheels of the vehicle for governing said apparatus; controlling circuits for said apparatus governed by said shoe; ramps located at intervals along the track for operating said shoe having their electrical controlling condition dependent on the extent of occupied track in advance thereof; and indicating devices responsive to the operation and electrical condition of said shoe.

70. In combination, a railway vehicle, a run-down device thereon arranged to change from an initial to an ultimate condition in a fixed distance of vehicle travel, speed-responsive means on said vehicle, vehicle governing apparatus on the vehicle controlled by said device and by said means, a railway track provided with a block longer than said fixed distance, traffic-controlled trackway means located adjacent the entrance end of said block for causing said run-down device to be restored to its initial condition, and other traffic-controlled trackway means located in said block at a distance from the exit end substantially equal to said fixed distance of vehicle travel for also causing said run-down device to be restored to its initial condition.

71. In combination, a railway vehicle, a run-down device thereon arranged to change from an initial to an ultimate condition in a fixed distance of vehicle travel, vehicle governing apparatus controlled by said device, a railway track provided with a block longer than said fixed distance, traffic-controlled trackway means located adjacent the entrance end of said block for causing said run-down device to be restored to its initial condition, and other traffic-controlled trackway means located in said block at a distance from the exit end substantially equal to said fixed distance of vehicle travel for also causing said run-down device to be restored to its initial condition.

72. In combination, a railway vehicle, a run-down device thereon arranged to change from an initial to an ultimate condition in a fixed distance of vehicle travel, vehicle governing apparatus controlled by said device, a railway track provided with a block longer than said fixed distance, traffic-controlled trackway means located in said block at a distance from the exit end substantially equal to said fixed distance for restoring said run-down device to its initial condition, and other traffic-controlled trackway means located in said block in advance of said first-mentioned trackway means for also restoring said run-down device to initial condition.

73. In combination, a railway vehicle, a run-down device thereon arranged to change from an initial to an ultimate condition in a fixed distance of vehicle travel, speed-responsive means on said vehicle, vehicle governing apparatus on the vehicle controlled by said device and by said means, a railway track provided with a block longer than said fixed distance, traffic-controlled trackway means located in said block at a distance from the exit end substantially equal to said fixed distance for restoring said run-down device to its initial condition, and other traffic-controlled trackway means located in said block in advance of said first-mentioned trackway means for also restoring said run-down device to initial condition.

74. In combination, a railway vehicle, a run-down device thereon arranged to change from an initial to an ultimate condition in a fixed distance of vehicle travel, a railway track divided into blocks some of which are longer than said fixed distance, and traffic-controlled trackway means located along said track and spaced at distances not exceeding said fixed distance of vehicle travel for restoring said run-down device to its initial condition.

75. In combination, a railway vehicle, a run-down device thereon arranged to change from an initial to an ultimate condition in a fixed distance of vehicle travel, speed-responsive means on said vehicle, vehicle governing apparatus on the vehicle controlled by said device and by said means, a railway track divided into blocks some of which are longer than said fixed distance, and traffic-controlled trackway means located along said track and spaced at distances not exceeding said fixed distance of vehicle travel for restoring said run-down device to its initial condition.

76. In combination, a railway vehicle, means thereon for establishing a gradually decreasing permissive speed limit, a warning signal operated when the actual speed of the vehicle approaches the permissive speed, a second warning signal and a slow-acting device set into operation when the actual speed reaches the permissive speed, and retarding means set into operation when the operation of said slow-acting device is completed.

77. In combination, a railway vehicle, a slow-acting device thereon having a determinate period of operation, means responsive to the speed of the vehicle and its progress along the track for initiating the operation of said device, a signal for indicating when the operation of said device has been initiated, and means for retarding the speed of the vehicle when the operation of said device is completed.

78. In combination, a railway vehicle, a slow-acting device operatively connected with a wheel of the vehicle and having for its period of operation a fixed distance of vehicle travel, means responsive to the speed of the vehicle and its progress along the track for initiating the operation of said device, a signal for indicating when the operation of said device has been initiated, and means for retarding the speed of the vehicle when the operation of said device is completed.

79. In combination, a railway vehicle, means thereon adapted to vary in accordance with the permissive speed of the vehicle, speed-responsive means controlled by the actual speed of the vehicle, a signal and a slow-acting device on the vehicle, said first two means co-acting to cause actuation of said signal at a predetermined permissive speed for a given actual speed and to set said slow-acting device into operation at a higher permissive speed for said given actual speed, and vehicle governing apparatus rendered operative when the operation of said slow-acting device is completed.

80. In combination, a railway vehicle, means thereon adapted to vary in accordance with the permissive speed of the vehicle, speed-responsive means controlled by the actual speed of the vehicle, a signal and a slow-acting device on the vehicle, said first two means co-acting to cause actuation of said signal at a predetermined actual speed for a given permissive speed, and to set said slow-acting device into operation at a higher actual speed for said given permissive speed, and vehicle retarding apparatus rendered operative when the operation of said slow-acting device is completed.

81. In combination, a railway vehicle, a speed-responsive device thereon, means on the vehicle arranged to change gradually toward an ultimate condition, vehicle-governing apparatus controlled jointly and continuously by said device and by said means, and devices located in the trackway and arranged to restore said means away from said ultimate condition, said means being adapted to automatically resume its change toward said ultimate condition after each restoration.

82. Railway traffic governing apparatus comprising controlling means on a vehicle normally constrained to gradually approach an ultimate condition in accordance with the progress of the vehicle along the track, and means for removing such constraint if the speed of the vehicle falls below a given value.

83. Railway traffic governing apparatus comprising controlling means on a vehicle normally constrained to gradually approach an ultimate condition in accordance with the progress of the vehicle along the track, and means for permitting said controlling means to assume such ultimate condition immediately if the speed of the vehicle falls below a given value.

84. Railway traffic controlling apparatus comprising controlling means on a vehicle, and mechanism dependent upon the speed of the vehicle remaining above a given value for restraining said controlling means to gradually approach an ultimate condition in accordance with the progress of the vehicle along the track.

85. Railway traffic controlling apparatus comprising controlling means on a vehicle adapted to gradually approach an ultimate condition in accordance with the progress of the vehicle along the track, and devices located at intervals in the trackway and each operating when energized to restore said controlling means away from its ultimate condition, and means for causing said controlling means to immediately assume its ultimate condition if said trackway device becomes de-energized while the vehicle is in communication therewith.

86. Railway traffic controlling apparatus comprising trackway devices for transmitting proceed indications to a vehicle, and means on the vehicle for imposing a low speed limit unless the actual speed is above a given value or the vehicle is receiving a proceed indication from one of said trackway devices.

87. Railway traffic controlling apparatus comprising controlling means on a vehicle having a tendency to assume an ultimate condition, devices located at intervals in the trackway for restoring said means away from ultimate condition, and mechanism operatively connected with a wheel of said vehicle for restraining said means to gradually approach its ultimate condition in accordance with the progress of the vehicle along the track if the speed of the vehicle is above a given value and releasing said means if the speed falls below such value.

88. Railway traffic controlling apparatus comprising controlling means on a vehicle having a tendency to assume an ultimate condition, devices located at intervals in the trackway for restoring said means away from ultimate condition, a speed responsive device operatively connected with a wheel of the vehicle, a contact controlled by said speed responsive device, a magnet governed by said contact, and mechanism controlled by said magnet for restraining said means to gradually approach its ultimate condition in accordance with the progress of the vehicle along the track if the speed of the vehicle is above a given value and releasing said means if the speed falls below such value.

ALBERT V. T. DAY.

Witnesses:
VICTOR D. BORST,
WM. S. PRITCHARD.